Oct. 30, 1962

G. I. ROBERTS 3,061,212

AUTOMATIC APPARATUS FOR WINDING FIELD COILS

Filed June 20, 1960

INVENTOR.
GEORGE I. ROBERTS
BY
Herbert L. Davis
ATTORNEY

INVENTOR.
GEORGE I. ROBERTS

INVENTOR.
GEORGE I. ROBERTS
BY
Herbert L. Davis
ATTORNEY

Oct. 30, 1962 G. I. ROBERTS 3,061,212
AUTOMATIC APPARATUS FOR WINDING FIELD COILS
Filed June 20, 1960 32 Sheets-Sheet 4

INVENTOR.
GEORGE I. ROBERTS
BY
*Herbert L. Davis*
ATTORNEY

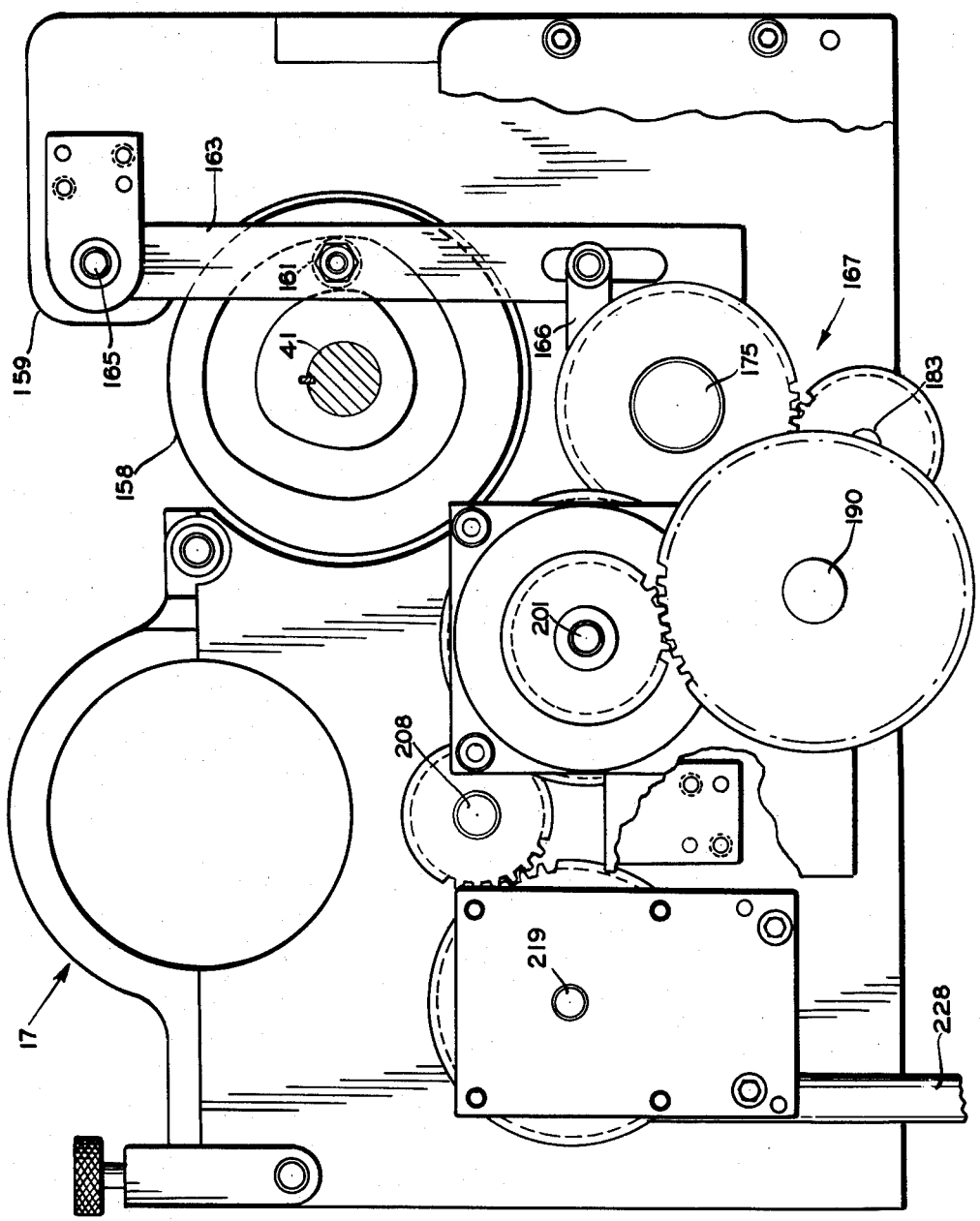

Oct. 30, 1962 G. I. ROBERTS 3,061,212
AUTOMATIC APPARATUS FOR WINDING FIELD COILS
Filed June 20, 1960 32 Sheets-Sheet 7

INVENTOR.
GEORGE I. ROBERTS
BY Herbert L. Davis
ATTORNEY

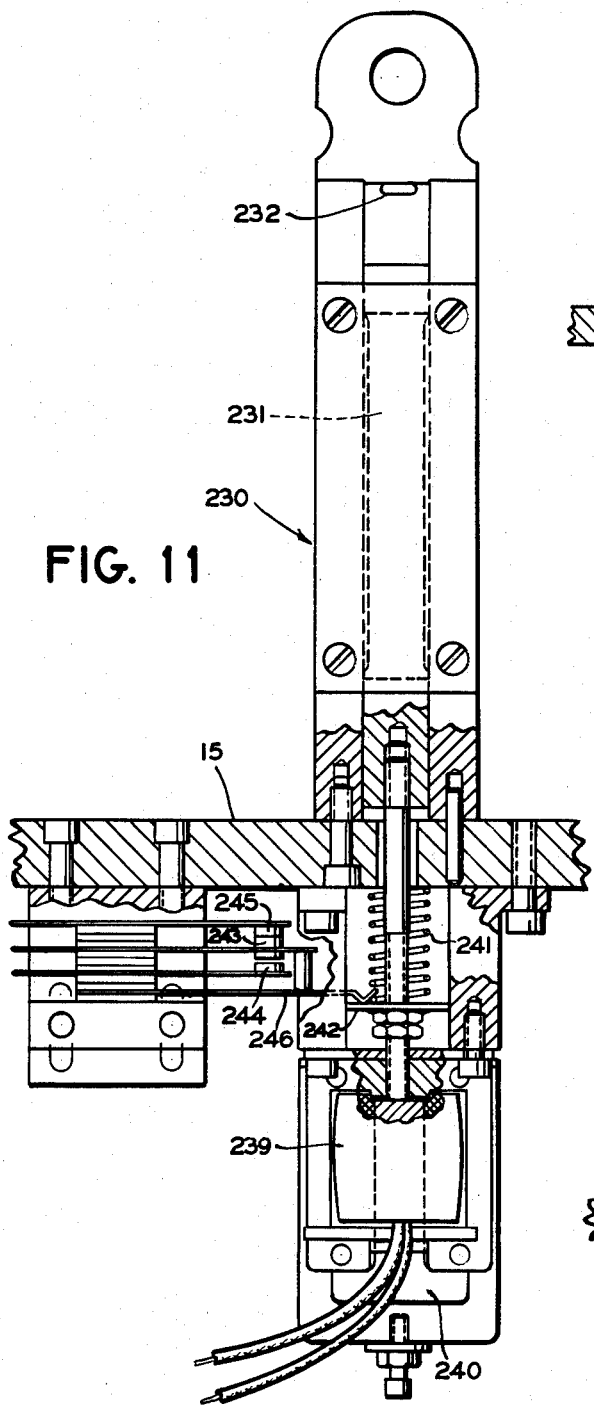
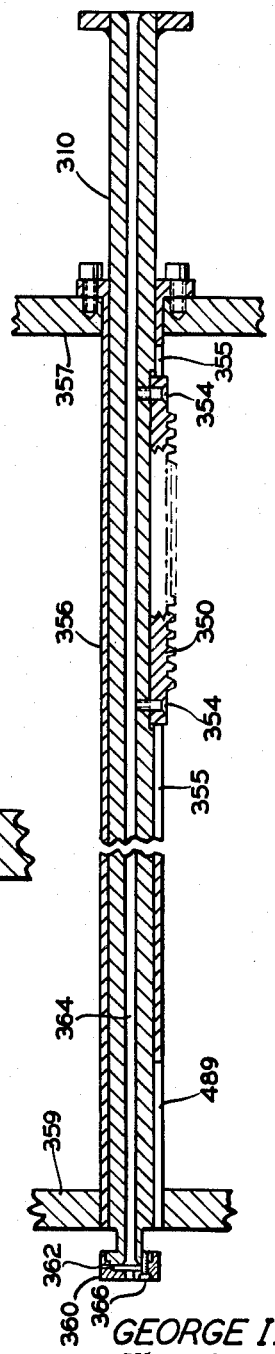

INVENTOR.
GEORGE I. ROBERTS
BY
ATTORNEY

INVENTOR.
GEORGE I. ROBERTS
BY
ATTORNEY

Oct. 30, 1962      G. I. ROBERTS      3,061,212
AUTOMATIC APPARATUS FOR WINDING FIELD COILS
Filed June 20, 1960      32 Sheets-Sheet 12

INVENTOR.
GEORGE I. ROBERTS
BY
ATTORNEY

Oct. 30, 1962   G. I. ROBERTS   3,061,212
AUTOMATIC APPARATUS FOR WINDING FIELD COILS
Filed June 20, 1960   32 Sheets-Sheet 14

INVENTOR.
GEORGE I. ROBERTS
BY
ATTORNEY

Oct. 30, 1962 G. I. ROBERTS 3,061,212
AUTOMATIC APPARATUS FOR WINDING FIELD COILS
Filed June 20, 1960 32 Sheets-Sheet 16

INVENTOR.
GEORGE I. ROBERTS
BY
ATTORNEY

Oct. 30, 1962   G. I. ROBERTS   3,061,212
AUTOMATIC APPARATUS FOR WINDING FIELD COILS
Filed June 20, 1960   32 Sheets-Sheet 17
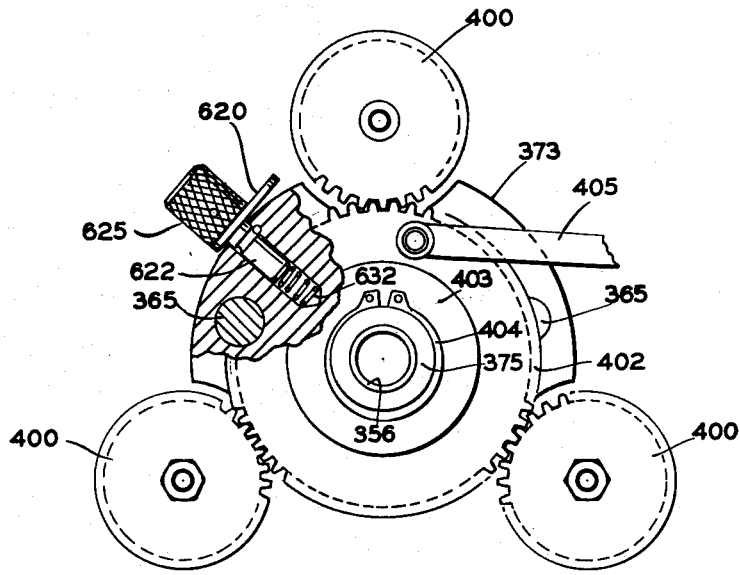
FIG. 24
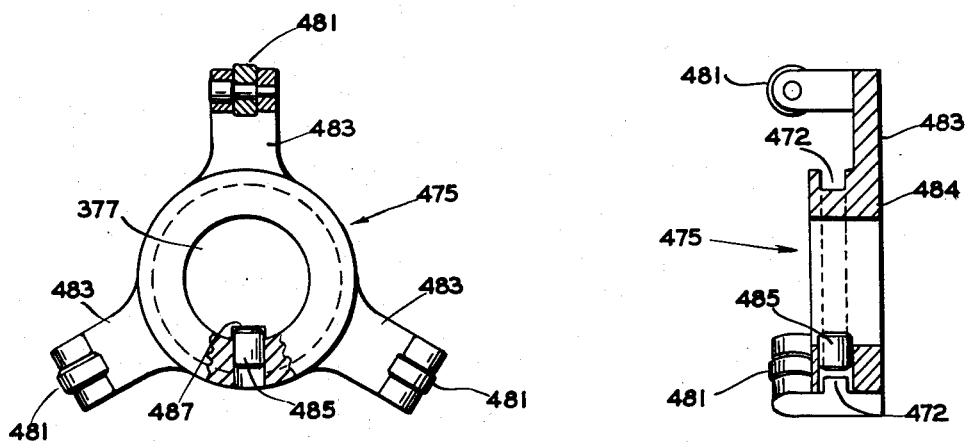
FIG. 25
FIG. 26
INVENTOR.
GEORGE I. ROBERTS
BY
ATTORNEY Oct. 30, 1962 G. I. ROBERTS 3,061,212
AUTOMATIC APPARATUS FOR WINDING FIELD COILS
Filed June 20, 1960 32 Sheets-Sheet 18

INVENTOR.
GEORGE I. ROBERTS
BY
ATTORNEY

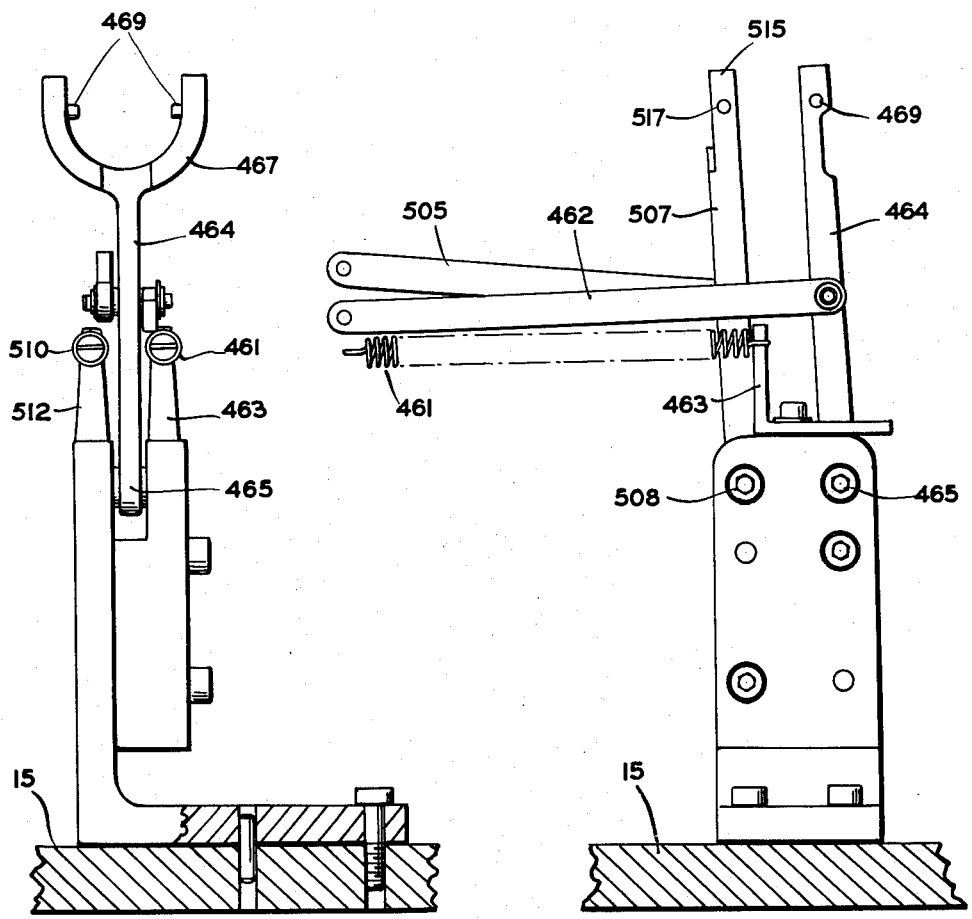

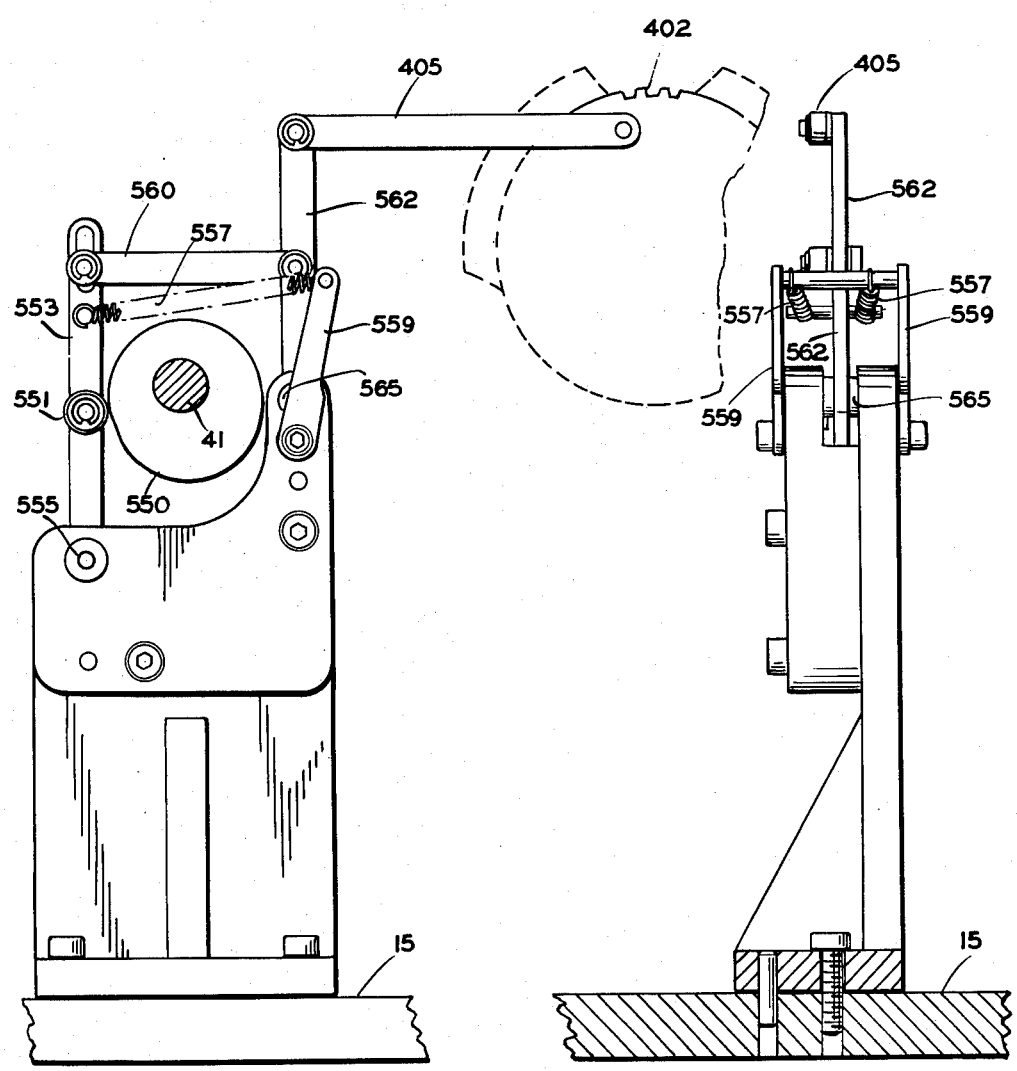

Oct. 30, 1962 G. I. ROBERTS 3,061,212
AUTOMATIC APPARATUS FOR WINDING FIELD COILS
Filed June 20, 1960 32 Sheets-Sheet 22

INVENTOR.
GEORGE I. ROBERTS
BY
ATTORNEY

Oct. 30, 1962 G. I. ROBERTS 3,061,212
AUTOMATIC APPARATUS FOR WINDING FIELD COILS
Filed June 20, 1960 32 Sheets-Sheet 23
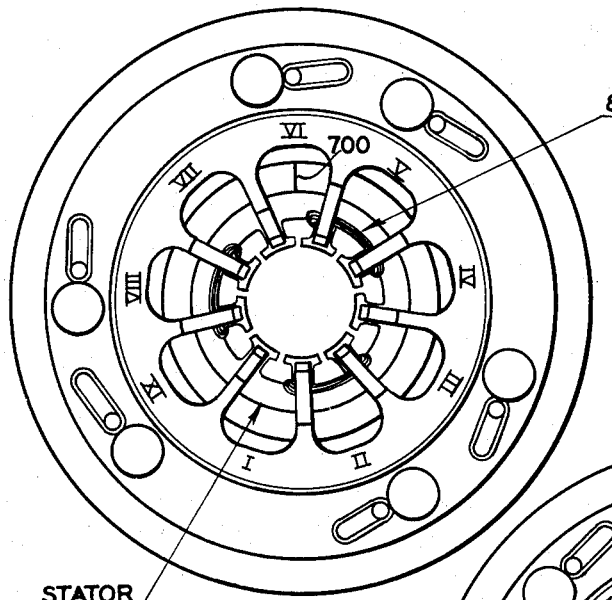
FIG. 38 — STATOR, 80° PITCH COILS
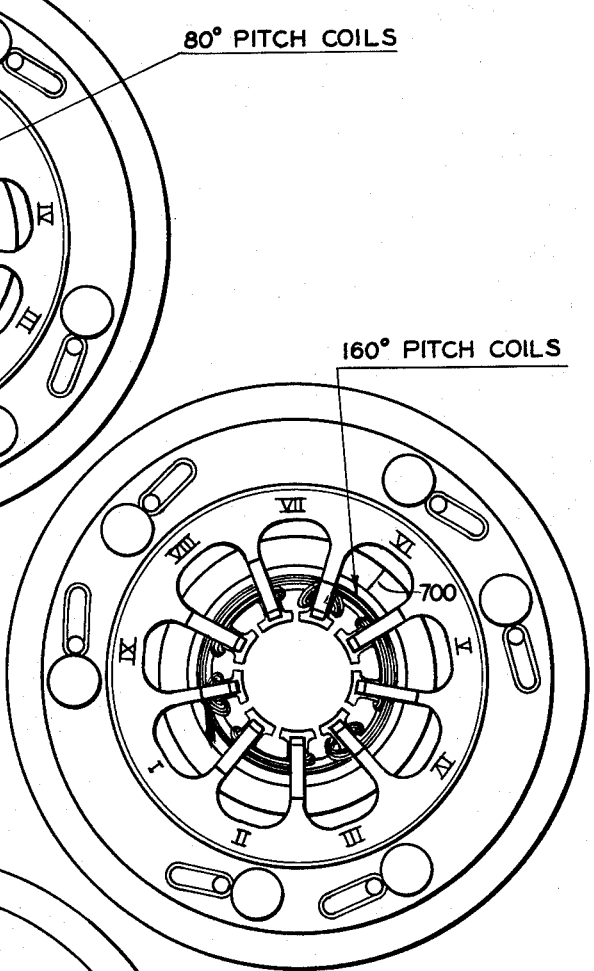
FIG. 39 — 160° PITCH COILS
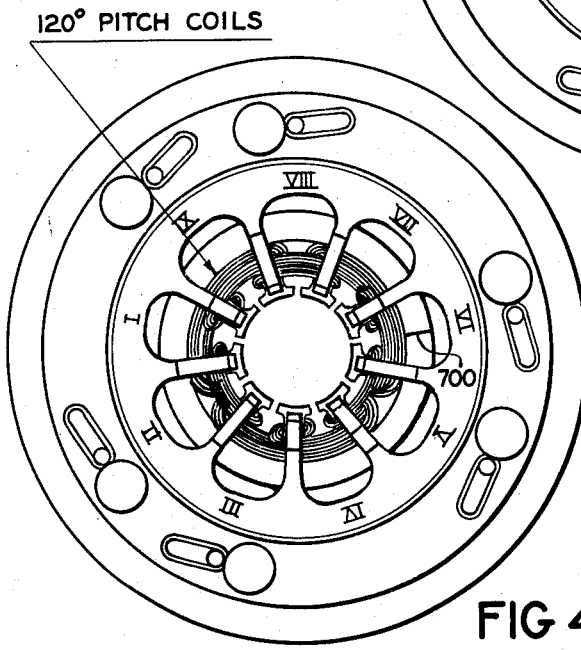
FIG 40 — 120° PITCH COILS
INVENTOR.
GEORGE I. ROBERTS
BY
ATTORNEY

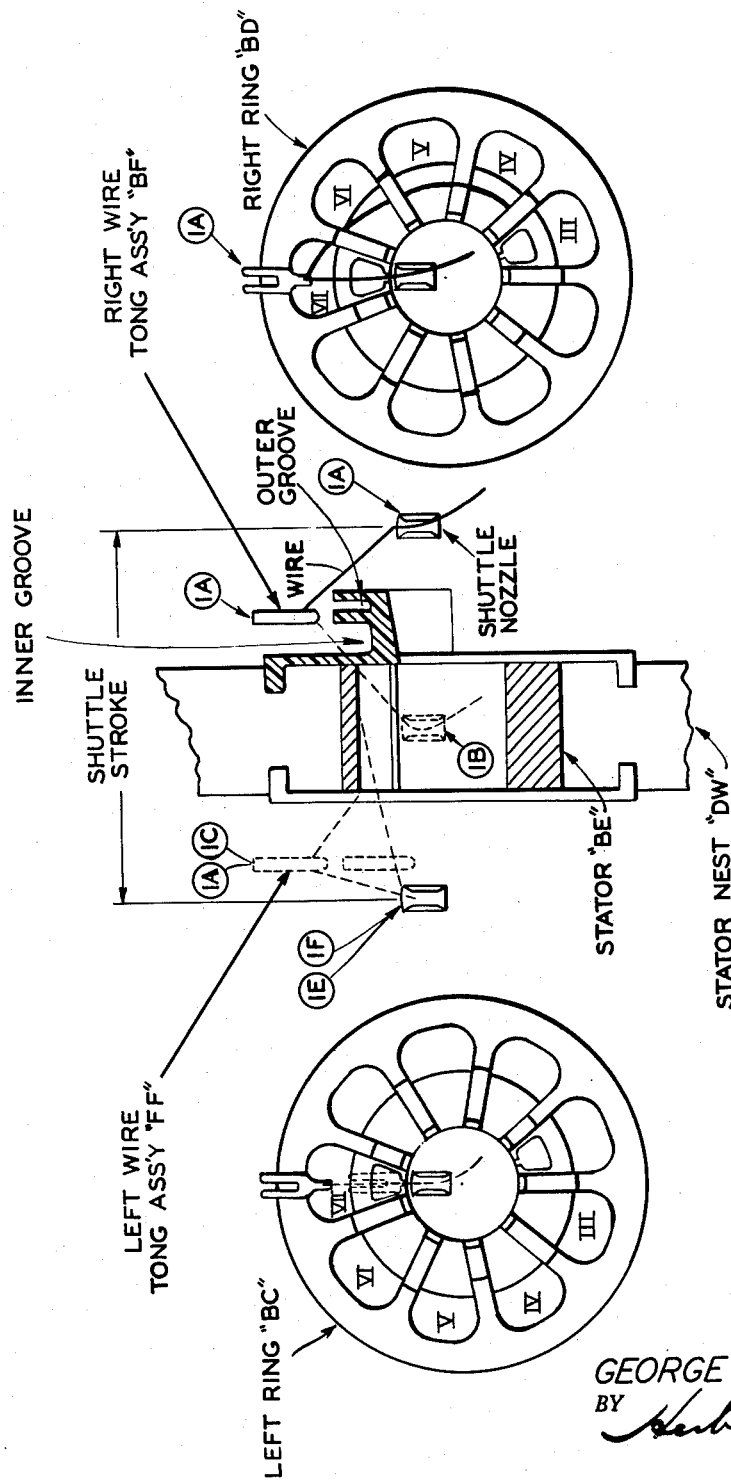

Oct. 30, 1962 G. I. ROBERTS 3,061,212
AUTOMATIC APPARATUS FOR WINDING FIELD COILS
Filed June 20, 1960 32 Sheets-Sheet 25

INVENTOR.
GEORGE I. ROBERTS
BY
ATTORNEY

Oct. 30, 1962 G. I. ROBERTS 3,061,212
AUTOMATIC APPARATUS FOR WINDING FIELD COILS
Filed June 20, 1960 32 Sheets-Sheet 26

INVENTOR.
GEORGE I. ROBERTS
BY
ATTORNEY

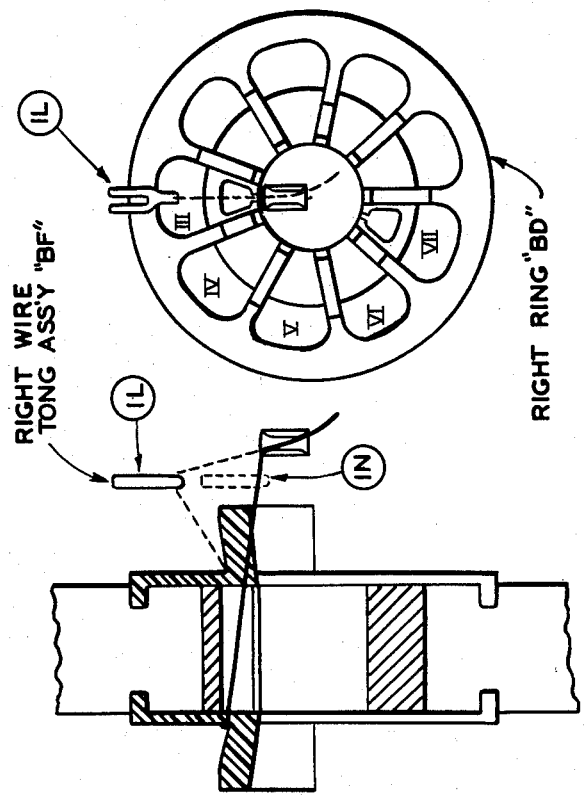
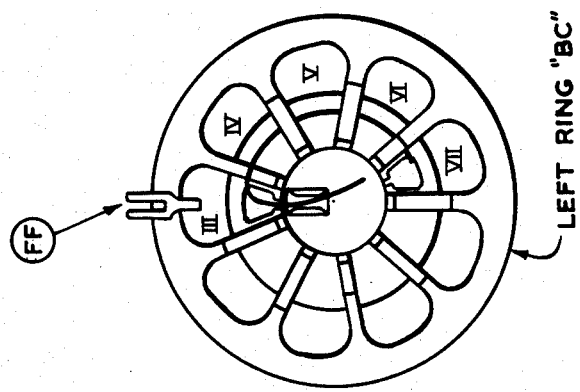
FIG. 45

Oct. 30, 1962     G. I. ROBERTS     3,061,212
AUTOMATIC APPARATUS FOR WINDING FIELD COILS
Filed June 20, 1960     32 Sheets-Sheet 28

INVENTOR.
GEORGE I. ROBERTS
BY
ATTORNEY

INVENTOR.
GEORGE I. ROBERTS
BY Herbert L. Davis
ATTORNEY

INVENTOR.
GEORGE I. ROBERTS
BY
ATTORNEY

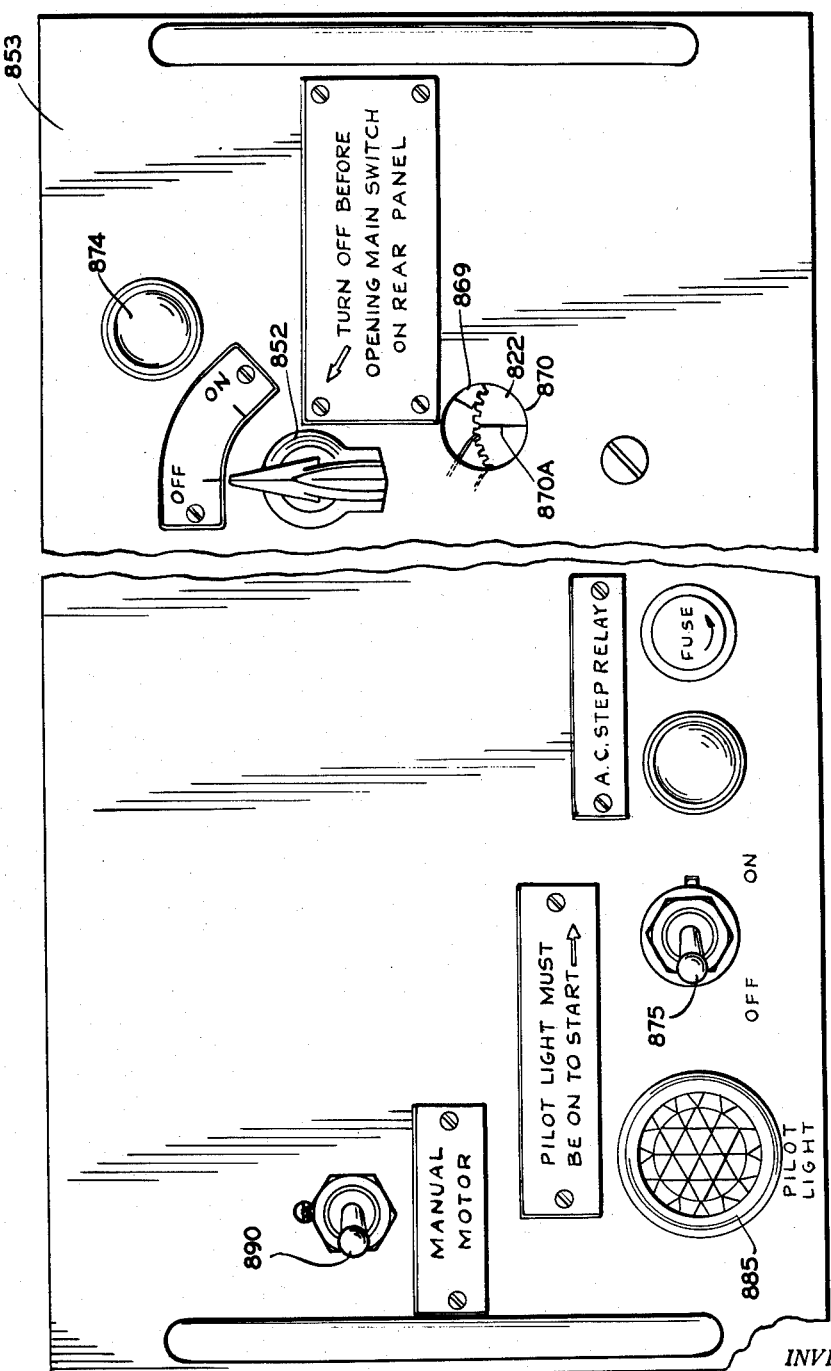

United States Patent Office 3,061,212
Patented Oct. 30, 1962

1

3,061,212
AUTOMATIC APPARATUS FOR WINDING
FIELD COILS
George I. Roberts, Maywood, N.J., assignor to The Bendix Corporation, Teterboro, N.J., a corporation of Delaware
Filed June 20, 1960, Ser. No. 37,142
15 Claims. (Cl. 242—1.1)

This invention relates to novel improvements in a coil winding apparatus and process such as disclosed and claimed in U.S. application Serial No. 746,437, filed July 3, 1958, by George I. Roberts, and assigned to Bendix Aviation Corporation, and more particularly to a novel means and method for winding field coils directly in slots of stator or rotor units for motors, generators, synchros or the like. The subject matter of the herein disclosed process for winding field coils is claimed in U.S. patent application Serial No. 45,119, filed July 25, 1960, by George I. Roberts, as a division of the U.S. application Serial No. 746,437 and assigned to The Bendix Corporation.

An object of the invention is to provide a novel coil winding machine including a reciprocating shuttle arranged to carry wire through the bore of a stator or rotor unit; novel means for oscillating the unit relative to the shuttle so as to effect the necessary wire end turns on the unit; and novel tong-type finger means for picking up the wire from the reciprocating shuttle and depositing the wire on end turn forming rings which may be integral with the unit or which may be of an expendable type such as disclosed and claimed in U.S. Patent No. 2,810,848, granted October 22, 1957, to George I. Roberts, and assigned to Bendix Aviation Corporation.

Another object of the invention is to provide a novel means and method for automatically winding at the same time multiple field coils in the slots of the unit of a predetermined pitch and sequentially other multiple field coils of a different predetermined pitch in other slots of the unit.

Another object of the invention is to provide novel tong-type pick-up lever assemblies, including means operated in timing sequence with a stator nest oscillation means to wind and form coils in preselected grooves of end turn forming rings.

Another object of the invention is to provide novel tong-type pick-up lever assemblies, including means operated in timing sequence with shuttle reciprocating movement to wind turns of coils in the slots of a device on which coils are to be formed.

Another object of the invention is to provide novel tong-type pick-up assemblies including operating means to open and close the tongs at proper time to pick up wires and release wires for winding in the slots of a device such as a rotor or stator and on end turn forming rings, together with other means to effectively move the pick-up lever assemblies in a lateral direction to preselected positions at the proper time to wind and form coils on end turn forming rings and additional means cooperating therewith to effectively raise and lower the tong-type wire pick-up levers at the proper time for picking up the wire from the shuttle.

Another object of the invention is to provide novel tong-type levers arranged to hold the wire so that aforenoted device may be oscillated in either direction to thereby provide means for winding coils in the stator in opposite directions.

Another object of the invention is to provide in such apparatus novel means for oscillation of a stator nest between variable stops so that coils of different predetermined pitch may be wound thereon.

Another object of the invention is to provide in such

2 apparatus a magnetic clutch drive and gear train so arranged as to permit the use of a cam follower lever cooperating with a track cam having a rise more than sufficient to oscillate the nest through the required number of degrees and in which apparatus the stator nest may be oscillated through the clutch and between positive stops in an arrangement in which the clutch slips at the extreme limits of the driving relation of the cam so as to eliminate any problems of back-lash in the gear train or spring resilience in the cooperating cam follower lever due to load.

Another object of the invention is to include in such apparatus novel means (grooves machined in stator nest and releasable stop means cooperating therein) to provide a positive stop means for limiting the oscillation of the stator nest in the effective winding of coils of different pitch.

Another object of the invention is to provide a solenoid relay operated stop selectively positioned in the grooves of the stator nest so as to cooperate therein as a stop to limit the stator nest oscillations, and including means to selectively energize and de-energize this relay means so as to provide for indexing the stator nest to preselected positions in the effective winding of coils of different pitch.

Another object of the invention is to provide novel means for oscillating a stator nest, together with positive stops for the stator nest to limit the oscillation thereof so as to effectively position the stator slot openings at the limits of oscillation of the stator nest in exact alignment with the wire pick-up tong levers and the shuttle cap nozzle in effecting a predetermined winding pattern while eliminating the necessity of the shuttle nozzle entering the openings to the stator slots.

Another object of the invention is to provide novel means for indexing and winding wire in preselected slots of a stator or rotor unit, including means to register in exact alignment the openings of the stator slots, the tongtype wire pick-up levers and the shuttle nozzle so that wire may be wound in the stator slots, together with means for holding the wire in the tongs of wire pick-up levers in line with the stator slot openings until the wire has definitely entered the stator slots due to movement of the shuttle into the bore of the stator so that such units even with relatively small slot openings may be effectively machine wound thereby.

Another object of the invention is to provide novel means for stopping the machine at a predetermined unloading position, including a solenoid operated relay for positioning a lever to open and close a jaw tooth clutch through which the machine may be driven and in which the solenoid is jointly controlled from contacts operated by a counter mechanism and contacts operated by cam means on a control shaft driven through the machine.

Another object of the invention is to provide novel means for automatically winding a complete stator unit, including multiple coils in which certain of the coils are of a different pitch than other of the coils.

Another object of the invention is to provide in such a coil winding apparatus an improved friction driven shuttle system, including novel means in which the problem of back-lash in gears and spring resilience of levers under load is overcome by a track cam with an operating rise more than sufficient to move the shuttle the required distance and a drive clutch cooperating with the cam rise so as to effectively drive the shuttle while permitting slippage when the stroke of the shuttle reaches the limit of its travel.

Another object of the invention is to provide novel means for opening and closing the wire pick-up levers in timed relation with movement of the levers in lateral and radial directions so as to place the wire as required in grooves of end turn forming rings to effectively wind coils of a different predetermined pitch, including coils which may cross over each other at the ends thereof in a predetermined pattern.

Another object of the invention is to provide novel means, including the combination of a reciprocating shuttle, oscillating stator and wire pick-up finger assembly operating in proper timing sequence to wind and form the end turns of the coils on end turn forming rings so as to meet the requirements of a plurality of predetermined winding patterns.

Another object of the invention is to provide novel means cooperating with end turn forming rings on the unit to be wound in such a manner that end turns of a plurality of coils may be formed thereon in different predetermined patterns.

Another object of the invention is to provide novel means for automatically winding a complete stator or rotor unit having different pitch coils without need of removal of the unit from the winding apparatus or manual manipulation of the operating parts for effecting the winding operation.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In th drawings:

FIGURE 7 is a fragmentary side view of the stator nest oscillating gear train assembly of the coil winding machine of FIGURE 1.

FIGURE 11 is a side view of the oscillating stop assembly of the coil winding machine of FIGURE 1 with certain of the operative parts thereof shown in section to better illustrate the structure thereof.

FIGURE 21 (drawing sheet 8) is a fragmentary sectional view of the shuttle assembly of the coil winding machine of FIGURE 1.

FIGURE 24 is an end view of the toggle lever assembly taken at an end opposite from that of FIGURE 22.

FIGURE 25 is an end view of the roller slide assembly shown in operative relation in the toggle lever assembly of FIGURE 23.

FIGURE 26 is a fragmentary sectional view of the roller slide assembly of FIGURE 25.

FIGURE 31 is a fragmentary end view of the yoke and bracket assembly for effecting radial and lateral movement of the toggle levers at the left hand side of the coil winding machine of FIGURE 1.

FIGURE 32 is a side view of the yoke and bracket assembly of FIGURE 31.

FIGURE 33 is a fragmentary end view of the cam follower assembly for controlling the opening and closing of the tong-type pick-up levers of the toggle lever assembly at the left hand side of the coil winding machine of FIGURE 1.

FIGURE 34 is a side view of the cam follower assembly of FIGURE 33.

FIGURE 38 is a view of the side of the stator nest assembly of FIGURE 10B showing 80° pitch coils wound on the stator thereon.

FIGURE 39 is a view of the stator nest assembly of FIGURE 38 showing both 80° and 160° pitch coils wound on the stator thereon.

FIGURE 40 is a view of the stator nest assembly of FIGURE 38 showing the complete stator wound with 80°, 160° and 120° pitch coils.

Figure 1:
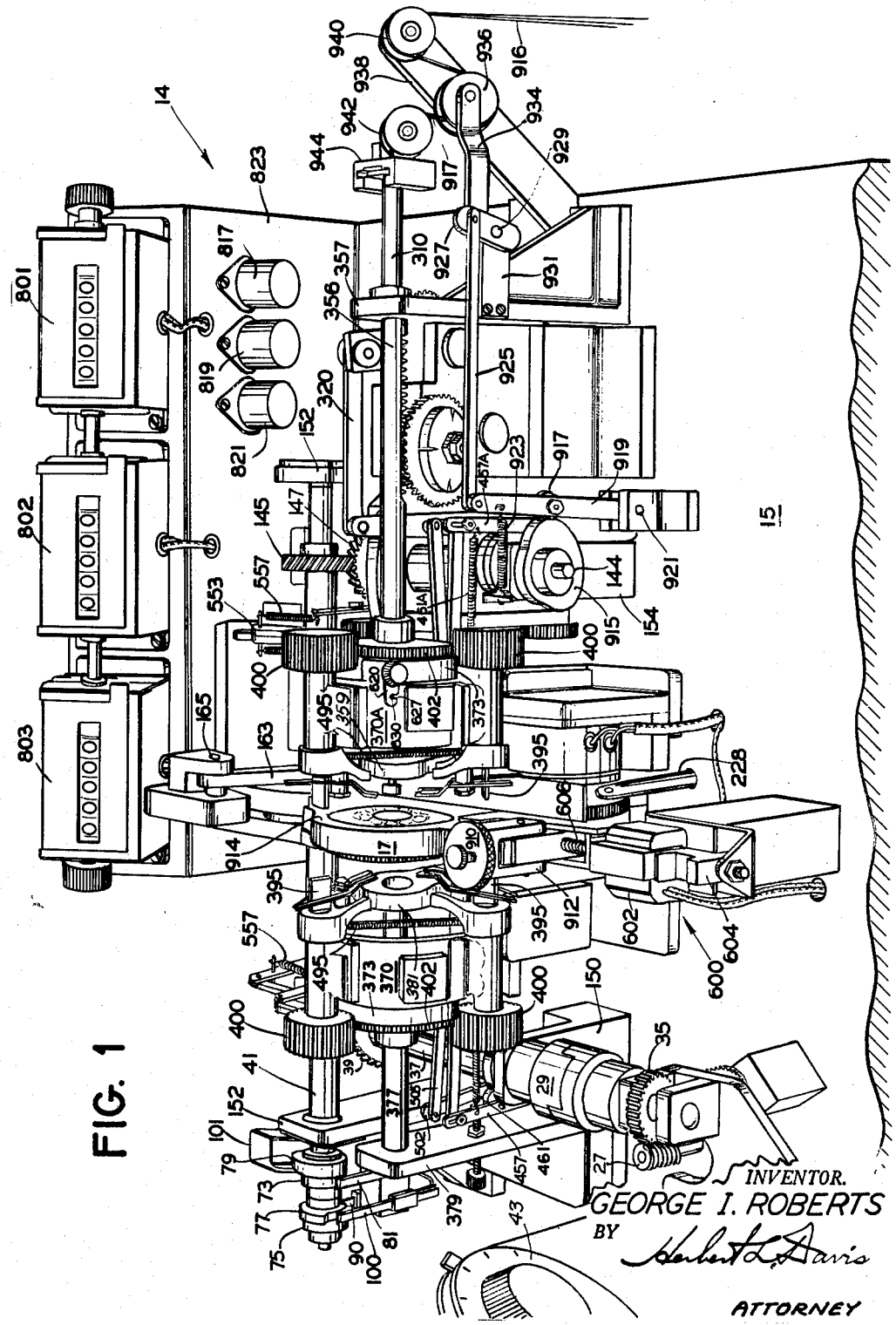
FIGURE 1 is a perspective plan view of the coil winding machine in assembled relation.

FIGURES 41 through 48 inclusive are a schematic diagrammatic showing of the steps in the winding operation of one turn of a 160° pitch coil by the coil winding machine of FIGURE 1.

Figure 49:

FIGURE 49 is a drawing of a timing chart showing graphically the timed relation between the several steps in the operation of the wire pick-up lever assemblies at the left and right hand sides of the coil winding machine of FIGURE 1.

Figure 50:
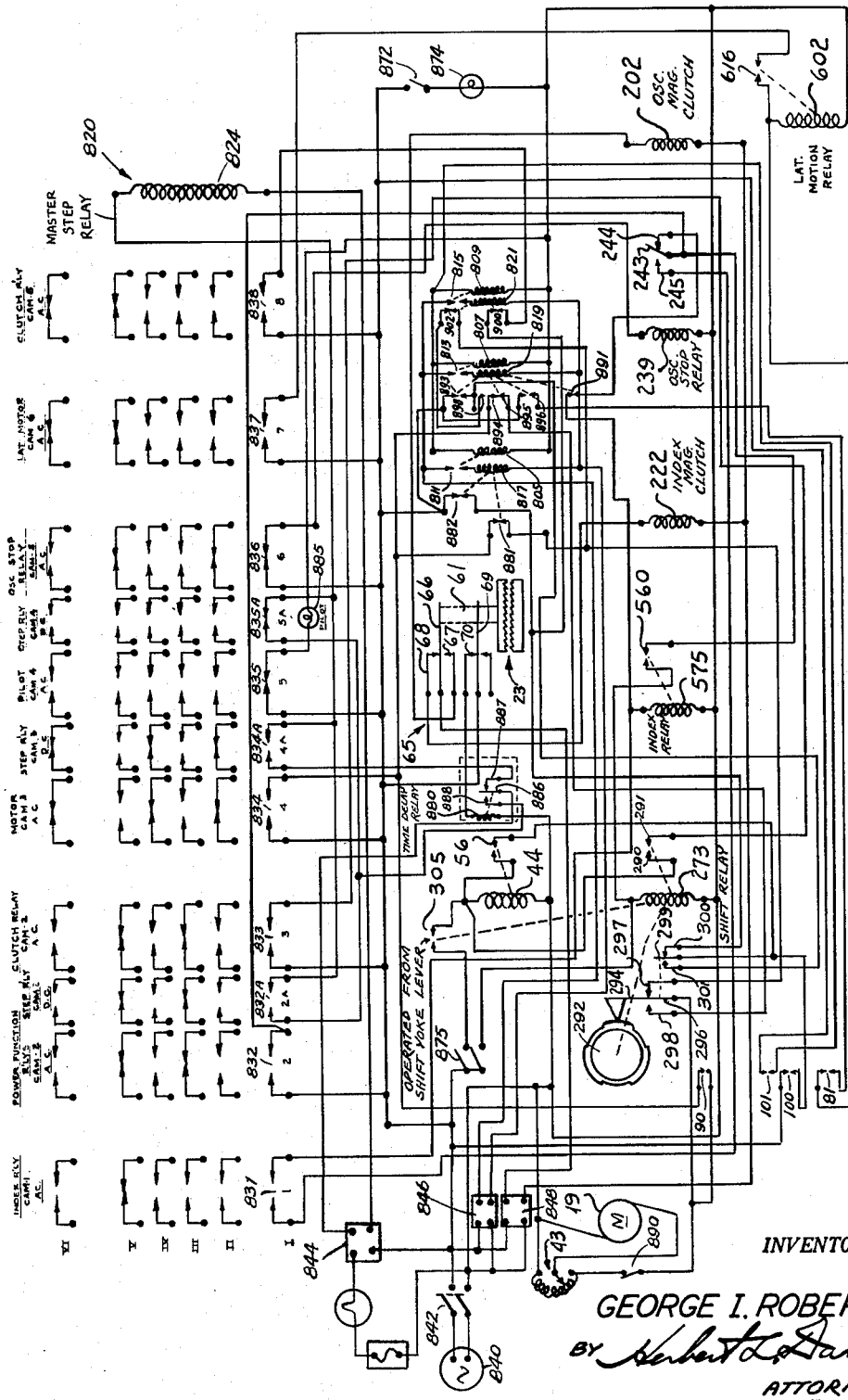

FIGURE 50 is a schematic wiring diagram of the electrical control system for the coil winding machine of FIGURE 1.

Figure 51:
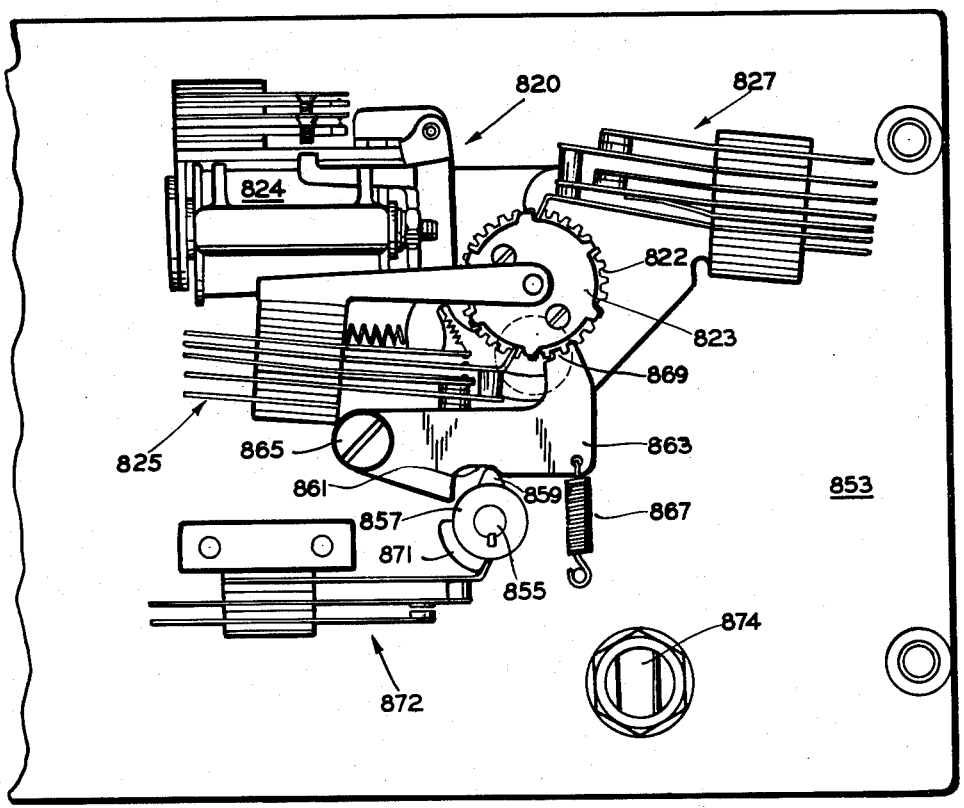

FIGURE 51 is a view of the reverse side of the control panel of FIGURE 53 showing the structure of the master step relay and manually operable means to lock the master step relay.

Figure 52:
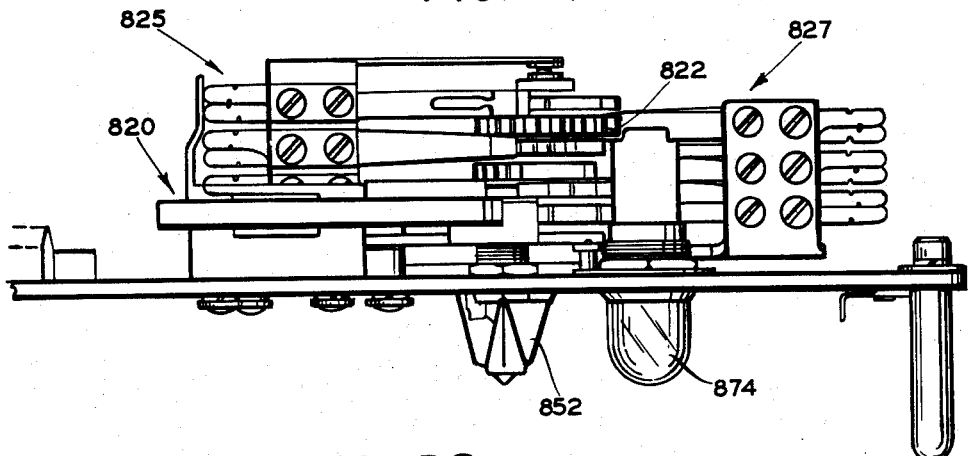

FIGURE 52 is a top view of the structure of FIGURE 51.

FIGURE 53 is a front plan view of the control panel for the coil winding machine of FIGURE 1.

Figure 2:
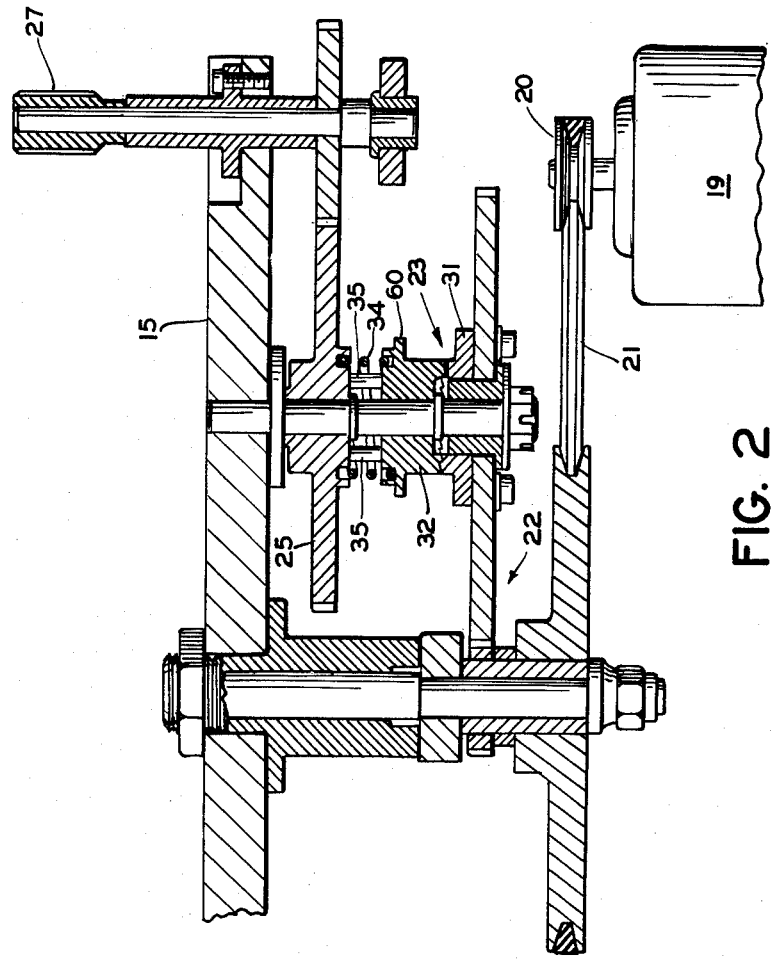
FIGURE 2 is a fragmentary sectional view of a driving gear train assembly and clutch mechanism for operably connecting a driving motor to the winding machine.

Referring to the drawings of FIGURES 1 through 5, a coil winding machine 14 including a base plate 15 on which are mounted the necessary structures for operation of the functional parts of the machine, including a stator nest assembly 17 having a split bearing for facilitating the loading and unloading of the stator units for the coil winding process and a motor 19, shown in FIGURE 2, for driving through pulleys 20 and belt 21, gearing 22, clutch 23, gearing 25 and worm gear 27, a coupling 29 which drives the coil winding machine 14, shown in FIGURE 1 the electrical components of which are also shown in the wiring diagram of FIGURE 50 in operative relation.

As shown in FIGURE 2, the motor 19 drives one toothed portion 31 of the clutch 23, while another jaw toothed portion 32 of the clutch 23 is biased by a spring 34 into engaging relation with the toothed portion 31. The toothed portion 32 is slidably mounted on pins 35 drivingly connecting the toothed portion 32 to the gear 25 so that when the toothed portion 31 of the clutch 23 is engaged by the jawtoothed portion 32, the motor 19 drives the winding machine through the gearing 22, clutch 23, gearing 25 and the worm 27. As shown in FIGURE 1, the worm 27 drives the worm gear 35 which is fastened to a shaft drivingly connected to the coupling 29 so as to in turn drive through a shaft 37 and gearing 39 and 40 a main cam shaft 41 shown in greater detail in FIGURE 6. An operator-operative control, such as a Variac indicated generally by the numeral 43 of FIGURES 1 and 50 and of conventional type, is provided for speed adjustment of the motor 19.

Figure 3:
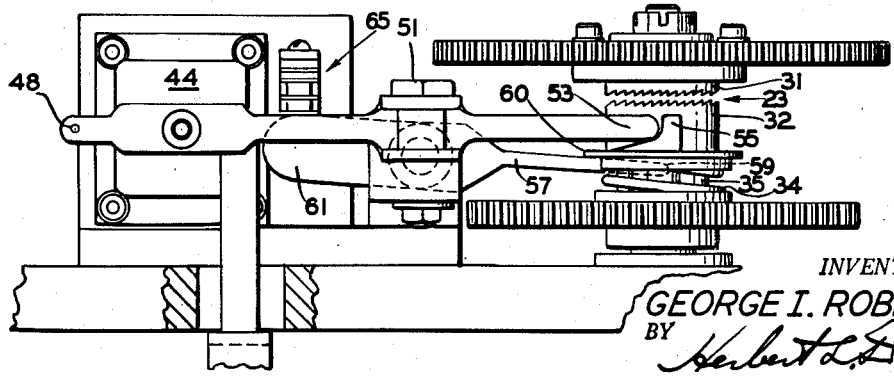
FIGURE 3 is a side view of the clutch mechanism and relay assembly for operating the same.

A clutch solenoid relay assembly, shown in FIGURE 3, provides means for starting and stopping rotation of the winding machine 14 through operation of the jaw tooth clutch 23. This solenoid assembly, shown in greater detail in FIGURES 4 and 5, includes a solenoid 44 for operating a plunger 45 operatively connected to a clutch control lever 47 which is spring loaded at an end 48 thereof by a biasing spring 49 so as to turn the lever 47 about a pivot pin 51. An opposite end portion 53 of the clutch lever 47 is biased by the spring 49 into contacting relation with a cam surface 55 carried by the clutch portion 32 to in turn bias the clutch portion 32 out of toothed engagement with the clutch portion 31.

Figure 4:
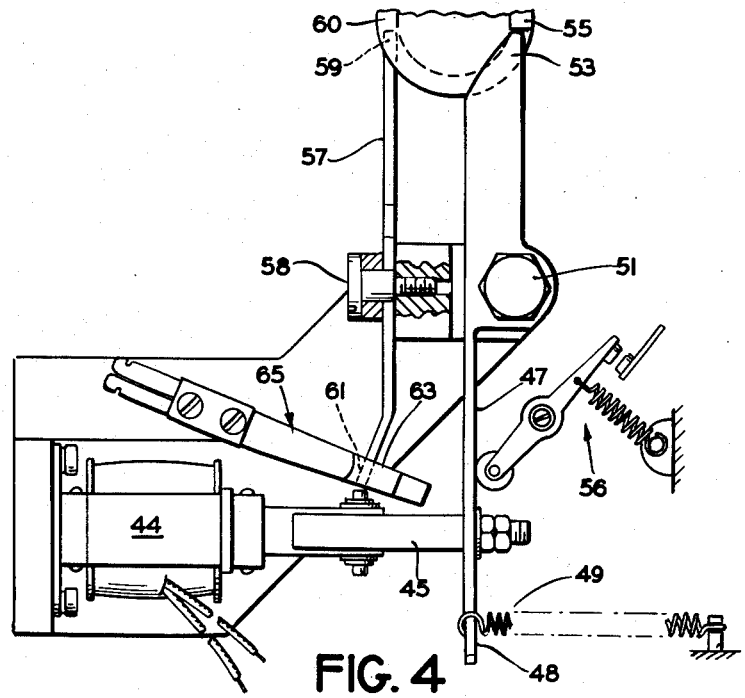
FIGURE 4 is a top plan view of the clutch and switch operating leverage in association with the relay assembly of FIGURE 3.
Figure 5:
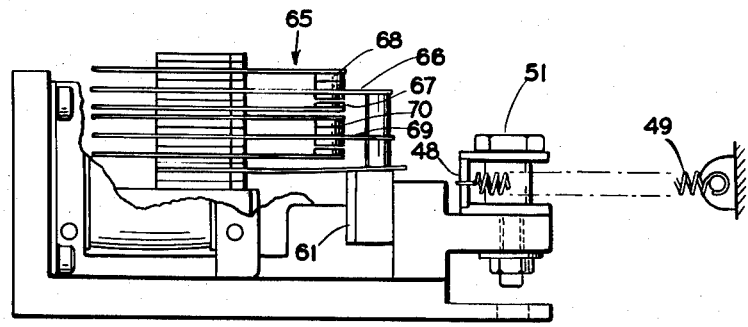
FIGURE 5 is an end view of FIGURE 4 showing a switch mechanism in association with the switch operating leverage of FIGURE 4.

The arrangement is such that when the solenoid 44 is energized the clutch lever portion 53 is rotated about the pivot pin 51 in a clockwise direction as viewed in FIGURE 4 and away from the cam surface 55 allowing the jaw tooth clutch portion 32 to engage the clutch portion 31 under the biasing force of the spring 34 so as to drivingly connect the motor 19 to the winding machine 14 and cause clutch lever 47 to be simultaneously actuated to a position to close a suitable switch mechanism 56 to effect a holding circuit for the solenoid 44, as hereinafter explained with reference to FIGURE 50.

Moreover, when the solenoid 44 is de-energized, clutch lever 47 engages the cam portion 55 carried by the jaw portion 32 so as to cause the clutch portion 32 under the biasing force of spring 49 to disengage the jaw tooth clutch portion 31, as shown in FIGURE 3, and thereby disconnect the motor 19 from driving relation with the winding machine 14. Moreover, the high portion of the cam 55 under the momentum of the rotation of the winding mechanism is driven into engaging relation with the portion 53 of the level 47 so that the lever 47 serves to stop the rotation of the winding machine 14 at the same point by engaging the portion 55 of the driven portion 32 each time the portion 32 of the clutch 23 is disengaged from the portion 31 of the clutch 23 driven by the motor 19.

A second switch actuating lever 57 pivotally mounted at 58 has an end portion 59 operatively engaging a flange 60 projecting from the jaw toothed clutch portion 32. An opposite end portion 61 of the lever 57 operatively engages an end portion 63 of a suitable switching mechanism 65 so as to effect upon movement of the clutch portion 32 to a clutch disengaging position an automatic switching operation of the switch mechanism 65 in causing a switch contact blade 66 to open a contact 67 and close a contact 68 while a second switch contact blade 69 closes a contact 70. Actuation of the clutch portion 32 to a clutch engaging position will in turn cause blade 66 to close contact 67 and open contact 68 and blade 69 to open contact 70, as explained hereinafter with reference to the wiring diagram of FIGURE 50.

*Stator Nest Oscillation*

The coil winding machine of the present invention is described hereinafter as applicable to the winding of variable pitch coils of, for example, 80°, 160° and 120° and having for example ten, fifty-six and eighty-six turns respectively. The apparatus, of course, may be modified within the scope of the invention to provide coils of different pitch and number of turns. The specific design of the apparatus, for effecting the pitch of the coil, number of turns and direction of oscillation, is described hereinafter.

As shown in FIGURE 1, the shaft 37 driven by the motor 19 drives the main shaft 41 to which there is affixed cams 73, 75, 77 and 79 for effectively opening and closing in predetermined timed relation with the operation of the winding machine 14 suitable control switches 81, 90, 100 and 101 respectively, as shown in FIGURE 1 and in the wiring diagram of FIGURE 50, for effecting automatic operation of the winding machine 14 as explained hereinafter in greater detail. The shaft 41 driven through shaft 37 by the motor 19 is further drivingly connected to a shaft 144 through helical gears 145 and 147. The three shafts 37, 41, and 144 are journaled in suitable roller bearings carried by supporting members 150, 152 and 154, as shown in FIGURE 1. Functional component assemblies operated from the driven shafts 37, 41 and 144 include an improved stator nest oscillation mechanism, improved shuttle reciprocation mechanism and improved tong-type wire pick-up lever assemblies located at opposite sides of the stator nest assembly, as will be described hereinafter.

Figure 6:
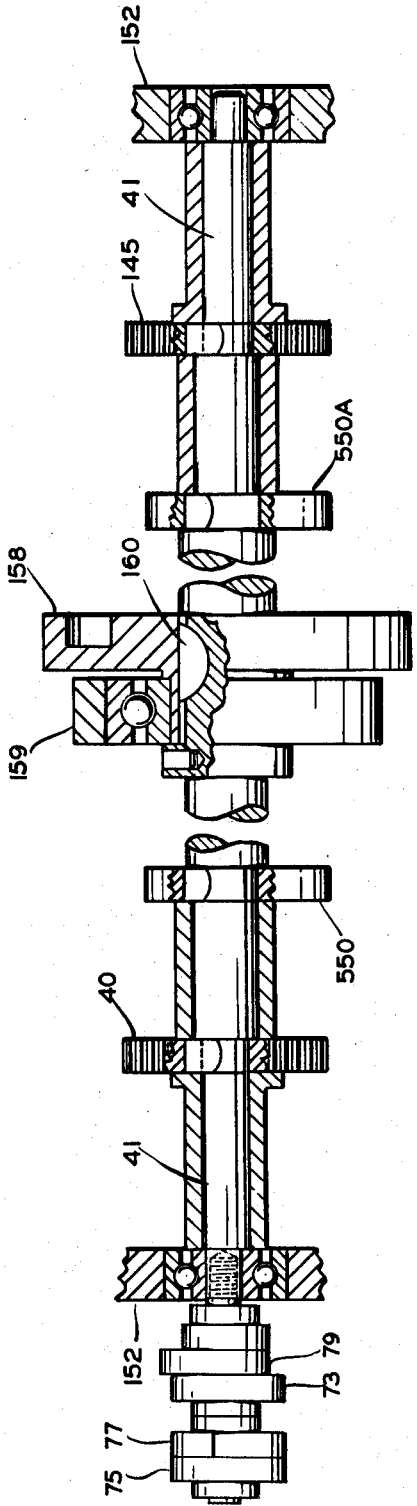
FIGURE 6 is a fragmentary view of the rear main drive shaft assembly of FIGURE 1 with certain parts broken away and shown in section to better illustrate the construction thereof.

Further, mounted on the main cam shaft 41, as shown in FIGURE 6, is a track cam 158 rotatable in roller bearings carried by a central supporting member 159 and secured to the shaft 41 in correct timing position by a key 160. In contact with the track cam 158 is a roller 161, shown in FIGURE 7, carried by a lever 163 pivoted at 165. Connected to lever 163 is a connecting link 166 operatively connected to a gear assembly 167 so that rotation of the track cam 158 oscillates the gear assembly 167 to a constant angular pitch or number of degrees for each revolution of the main cam shaft 41 through the levers 163 and 166.

Figure 8:
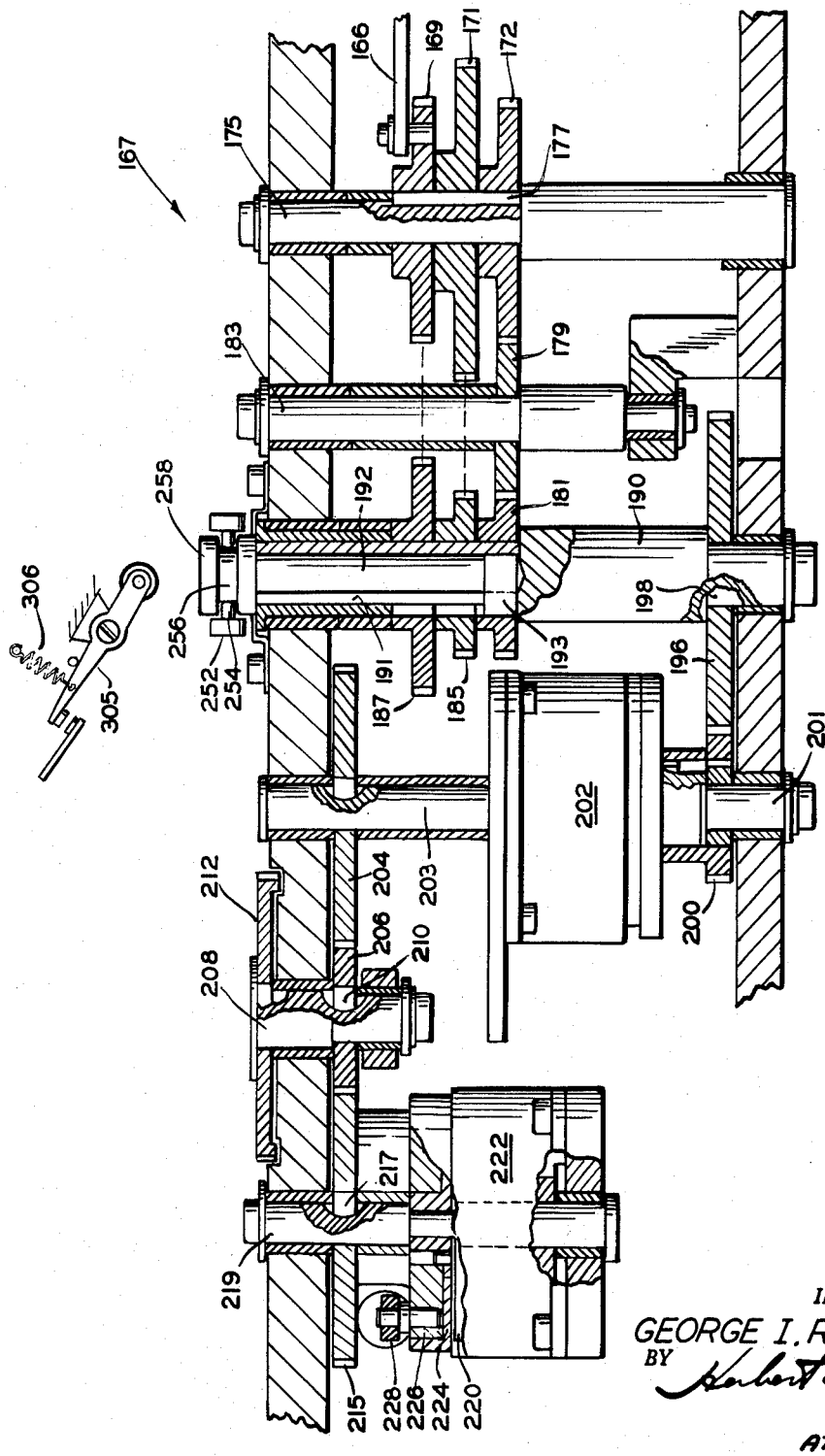
FIGURE 8 is an exploded sectional view of the stator nest oscillating gear train assembly of FIGURE 7 to better illustrate the operative relation of the several parts thereof.

As shown in FIGURE 8, the stator oscillating gear train assembly 167 including gears 169, 171 and 172 keyed to a shaft 175 by means of key 177 oscillate together when track cam 158 is rotated. Gear 172 meshes with a gear 179, which is an intermediate gear, in turn meshing with a gear 181 and free to rotate on a shaft 183, as shown in the drawing of FIGURE 8. Gears 171 and 185 are always in mesh as are also gears 169 and 187, although in the exploded view of FIGURE 8 the gears are shown out of mesh in order to better show the relationship of the several parts.

Figures 9, 10A:
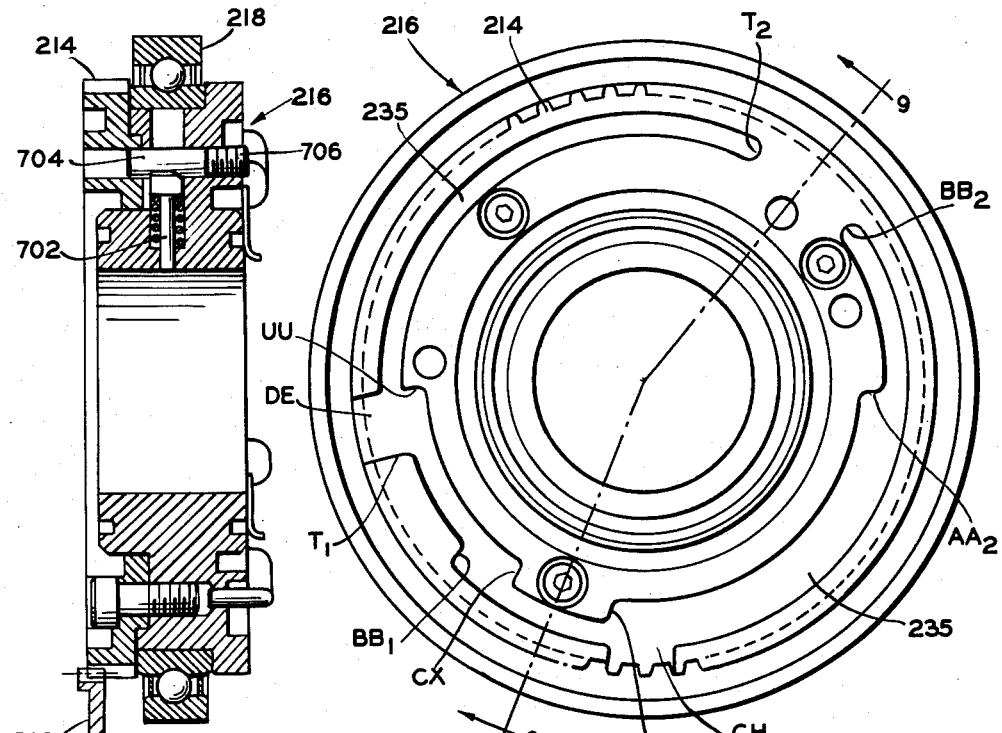
FIGURE 9 is a sectional view of the stator nest assembly of the coil winding machine of FIGURE 1.
FIGURE 10A is a view of one side of the stator nest assembly of FIGURE 9.

The gears 181, 185 and 187 are freely rotatable on a shaft 190 having a bore 191 within which is longitudinally adjustable a keyer shaft 192 carrying a member 193 adapted to be positioned by the shaft 192 so as to selectively key connect one of the gears 181, 185 and 187 to the shaft 190 to drive the shaft 190 and thereby a gear 196 affixed thereto. The gear 196 is attached to shaft 190 by a key 198 and enmeshed with a gear 200 affixed to a shaft 201 and drives therethrough a clutch portion of a magnetic clutch 202. The arrangement is such that when the magnetic clutch 202 is energized the gear 200 effectively drives through the clutch 202 a shaft 203 having affixed thereto a gear 204 which is enmeshed with a second gear 206 fastened to a shaft 208 by a key 210. A gear 212 also attached to shaft 208 is enmeshed with a gear 214 attached to a stator nest assembly 216 rotatably mounted in bearings 218, as shown in FIGURE 9. Thus upon energization of the magnetic clutch 202 and with the gears in mesh, as shown in FIGURE 8, the stator nest assembly 216 may be oscillated over a pitch angle corresponding to the angular distance between three slots of a nine slot stator so as to effect the winding of the 120° pitch coils, as hereinafter explained.

A gear 215 also in mesh with the gear 206 rotates when the gear 204 is oscillated. The gear 215 is connected by a key 217 to a shaft 219 which is in turn connected with a clutch portion 220 of an electromagnetic clutch 222 and arranged to be drivingly connected to a second clutch portion 224 upon energization of the magnetic clutch 222. The clutch portion 224 is in turn fastened to a plate portion 226 drivingly connected to a rod 228.

Upon de-energization of the magnetic clutch 222 the gear 215 is disconnected from driving relation with the rod 228 and upon energization of the magnetic clutch 222 the gear 215 is drivingly connected to the rod 228.

Normally the magnetic clutch 222 is de-energized and the clutch 202 is energized to oscillate the stator nest 216 during the winding operation of the machine while the magnetic clutch 202 is de-energized and the clutch 222 is energized to operatively connect the gear 215 to the rod 228 to effect a stator nest indexing action as hereinafter explained with reference to the index solenoid relay of FIGURE 35.

The amount of the indexing action and oscillation of the stator nest assembly 216, as shown in FIGURES 9 and 10A, affected by rotation of the gear 212 is controlled by a solenoid operated stop assembly 230, shown in detail in FIGURE 11, and including a longitudinally movable stop rod 231 having a projecting portion 232 cooperating in a novel groove 235 of predetermined contour provided in a face of the stator nest assembly 216, as shown in FIGURE 10A. The groove 235 is machined in the face of the gear 214 of the stator nest assembly 216 of predetermined length and contour arrangement, while the projection 232 of the stop rod 231 is so arranged as to fit selectively into portions of the groove 235 of the gear 214 so as to cooperate therein as a stop to limit the extent of oscillation of the stator nest 216 over predetermined angular ranges of, for example, 80°, 160° and 120° as aforesaid.

Thus, in the case of a predetermined 120° pitch oscillation, the projecting stop 232 of FIGURE 11 in the groove 235 of FIGURE 10A limits oscillation of the gear 214 at points $T_1$ and $T_2$, as indicated in FIGURE 10A, so as to allow a range of oscillation over exactly 120°. Similarly, the positioning of the projection 232 in the groove 235 between points $AA_1$ and $AA_2$ will limit oscillation of the gear 214 over a range of exactly 80° between such points, while the positioning of the projecting portion 232 of FIGURE 11 in the groove 235 of FIGURE 10A between the points $BB_1$ and $BB_2$ will limit oscillation of the gear 214 and stator nest assembly over a range of exactly 160°.

In the aforenoted arrangement, energization of a solenoid 239 causes an armature 240 to move the stop rod 231 and the projecting portion 232 into the upper position shown in FIGURE 11 in which the projecting portion 232 is effective in the groove 235 to limit rotation of the gear 214 to the angular extent permitted between points $AA_1$ and $AA_2$ or between the points UU and CX, as hereinafter described, while upon de-energization of the solenoid 239 a spring 241 acts upon a plate 242 affixed to the stop rod 231 to bias the armature 240 and thereby the projecting portion 232 downwardly so as to limit rotation of the gear 214 between points $BB_1$ and $BB_2$ or the points $T_1$ and $T_2$.

The actuation of the stop rod 231 to the upper position by the energization of the solenoid 239 is also effective to cause, as shown in FIGURE 11, a switch contact arm 243 to open a contact 244 and close a contact 245 under control of a switch control arm 246 bearing on a plate 242 affixed to stop arm 231, while upon de-energization of the solenoid 240 the switch contacts 243 and 245 are opened and the two contacts 243 and 244 are closed to provide an automatic switch operation to effect a control function, as hereinafter described, with reference to the wiring diagram of FIGURE 50.

There is further provided a novel gear shaft mechanism 250 shown in FIGURES 12–15 for automatically controlling the longitudinal position of the key shaft 192 and key member 193 of FIGURE 8 and thereby the motion imparted to the gear 212 and therethrough to the stator nest assembly 216 of FIGURES 9 and 10A subject to the limiting action of the stop 232 and resulting slippage at clutch 202. In the aforenoted control mechanism, there is provided a yoke lever 252 having pins 254 operatively engaged in a slot 256 of an operating head 258 of the keyer shaft 192 of FIGURE 8. The lever 252 is pivoted at 260 and has a cam roller 262 attached to the yoke lever 252 and operatively contacting the cam 264 affixed to rotatable shaft 265. The lever 252 and roller 262 is biased by a spring 266 into contacting relation with the effective surface of the cam 264.

Figure 12:
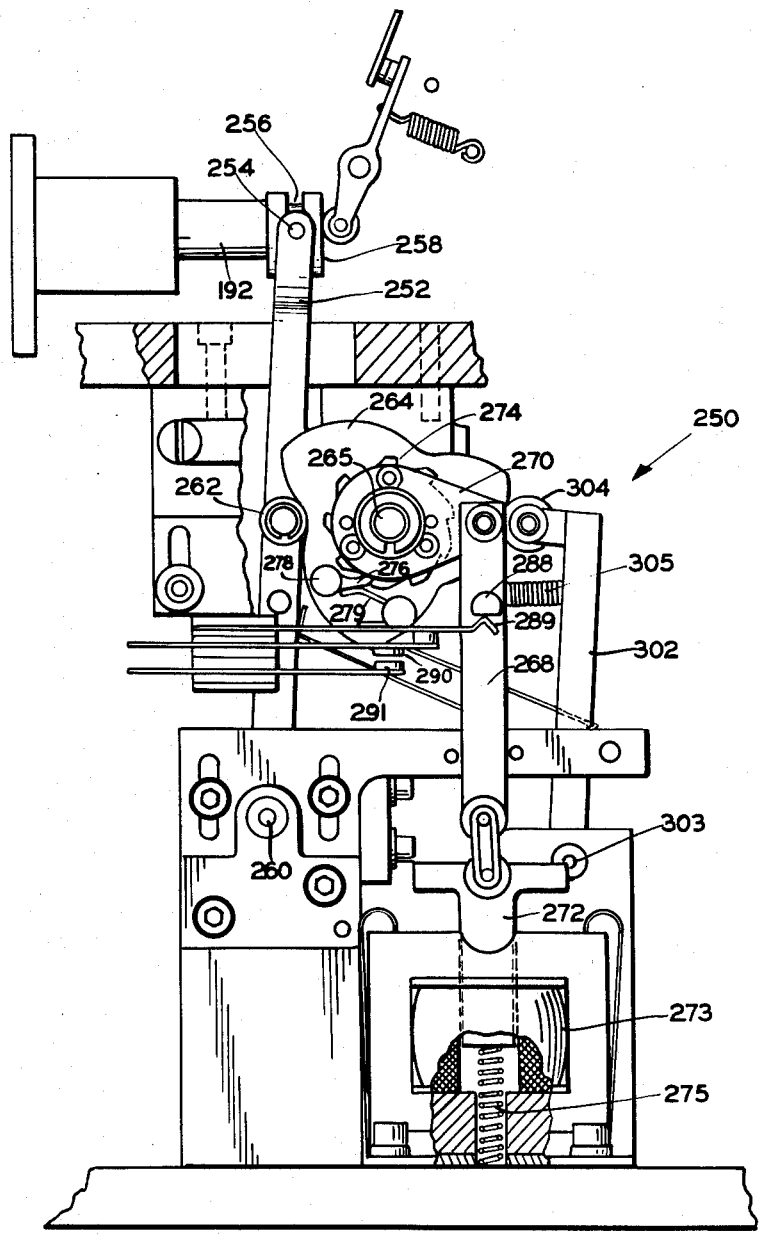
FIGURE 12 is a side view of the change gear yoke and cam assembly of the coil winding machine of FIGURE 1, with certain parts shown in section or broken away to better illustrate the operative relation of the several parts shown.

The cam 264 is rotated in clockwise direction, as viewed in FIGURE 12, with a step by step action by an operating lever 268 attached at one end to a ratchet arm 270 freely rotatable on the shaft 265. The opposite end of the operating lever 268 is connected to a plunger 272 of a solenoid 273. The ratchet arm 270 has ratchet teeth 274 of conventional type affixed thereto and so arranged that upon energization of the solenoid 273 actuating the plunger 272 downwardly against the biasing force of a spring 275 there is effected a clockwise movement to the cam 264 by the action of the ratchet arm 270 and ratchet teeth 274 in cooperation with a driving pawl 276. The driving pawl 276 is pivotally mounted on the cam 264 at 278 and biased by a spring 279 in cooperative relation with the ratchet teeth 274 so as to effectively rotate the cam 264 and shaft 265 with a step by step movement in a clockwise direction as viewed in FIGURE 12. Subsequently de-energization of the solenoid 273 will cause spring 275 to effect a movement of the arm 270 in a counterclockwise direction freely on the shaft 265 so as to condition the arm 270 and ratchet 274 relative to the driving pawl 276 for a subsequent step movement upon re-energization of the solenoid 273. Thus, each time the solenoid 273 of FIGURE 12 is energized, there is effectively imparted a 40° rotary movement to the cam 264 through the action of the nine-tooth ratchet 274 and cooperating driving pawl 276.

Figure 14:
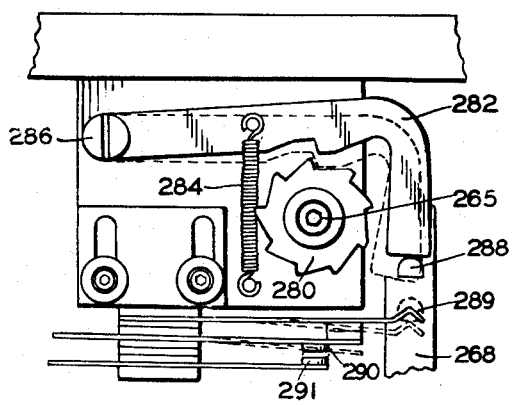
FIGURE 14 is a fragmentary side view of the overthrow loading mechanism of the assembly of FIGURE 13 viewed at the position indicated by the lines 14—14 of FIGURE 13 and looking in the direction of the arrows.

A second ratchet gear 280, as shown in FIGURE 14, is also affixed to the shaft 265 and operatively engaged by a ratchet arm 282 biased by a spring 284 about pivot 286 so as to serve to hold the ratchet gear 280 and thereby the cam 264 from overthrow in its step by step adjusted position upon energization of the solenoid 273, as indicated in the dotted lines of FIGURE 14. Upon de-energization of the solenoid 273, the operating rod 268 is actuated upwardly by the biasing force of spring 275 so as to cause an operating member 288 to contact an end portion of the ratchet arm 282 and bias the same out of engaging relation with the ratchet gear 280 so as to condition the ratchet gear 280 for the subsequent step movement thereof upon re-energization of the solenoid 173 whereupon the operating member 288 is actuated downwardly to permit the ratchet arm 282 to pivot about the pin 286 in a clockwise direction and into engaging relation with the next succeeding tooth of the ratchet gear 280. Furthermore the downward movement of the operating member 288 upon energization of the solenoid 273 actuates a switch control arm 289 so as to close switch contacts 290 and 291, as shown in FIGURES 12 and 14, for effecting a control function as explained hereinafter.

Figure 13:
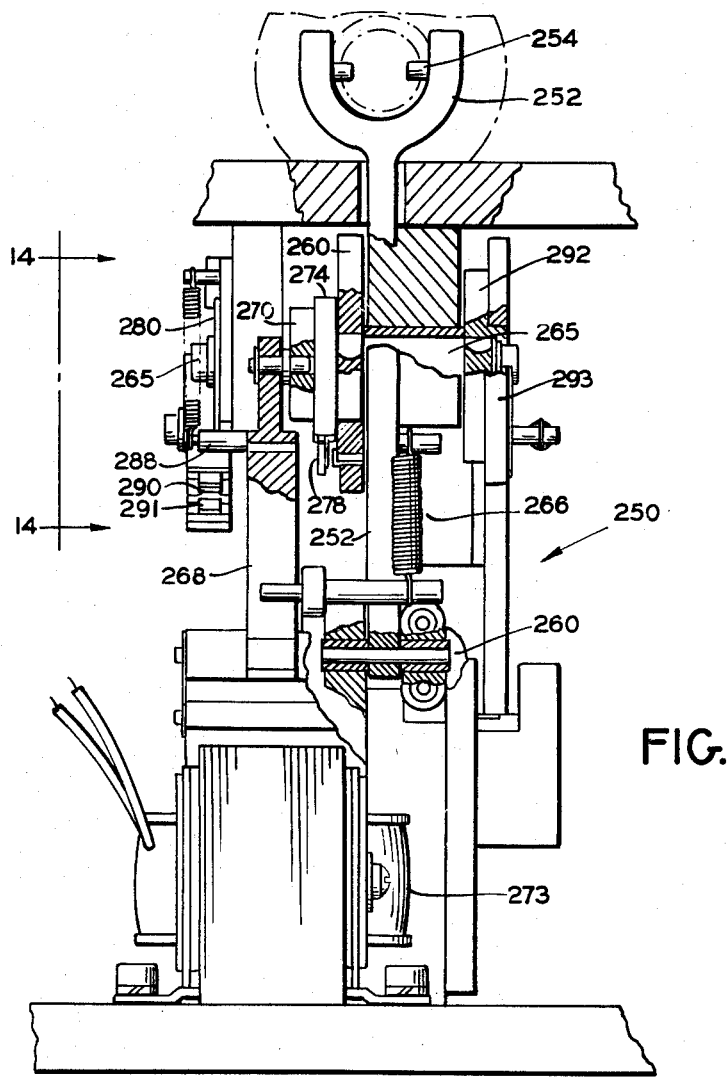
FIGURE 13 is an end view of the assembly of FIGURE 12.
Figure 15:
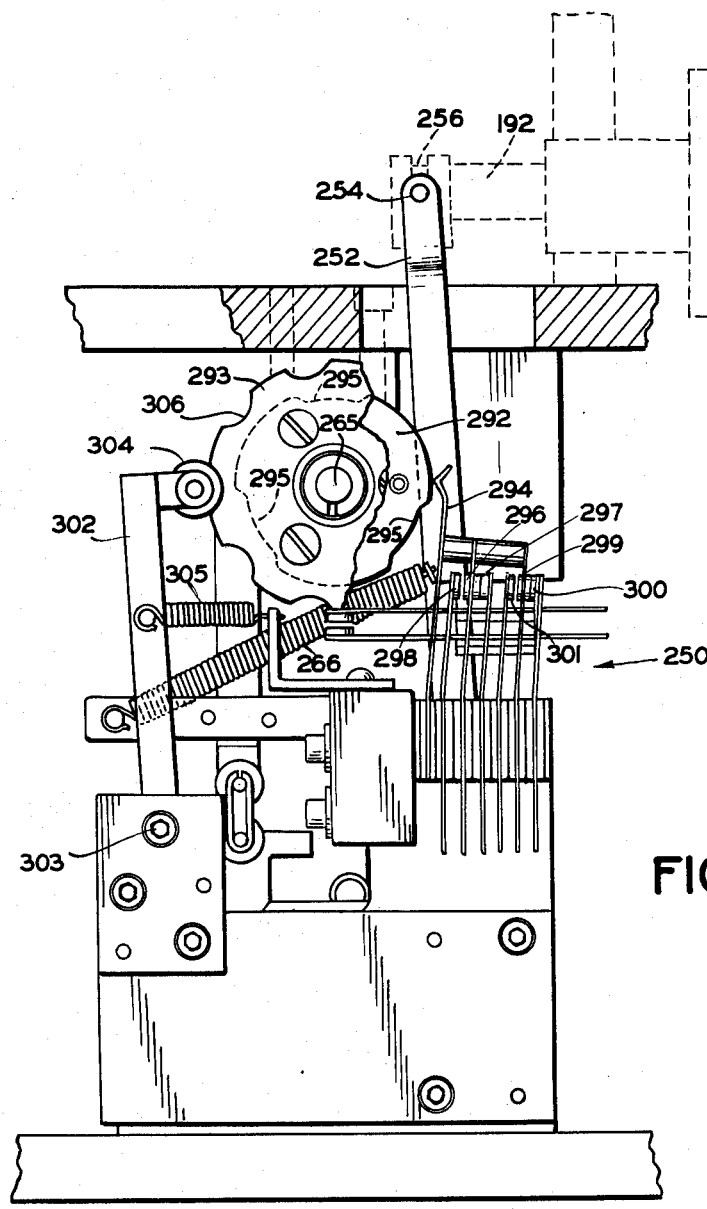
FIGURE 15 is a side view of the change gear yoke and cam assembly taken at the opposite side from that shown by FIGURE 12.
Figure 18:
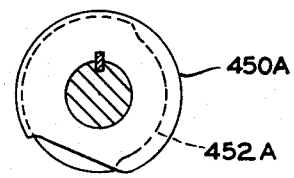
FIGURE 18 (drawing sheet 12) is a sectional view of FIGURE 17 taken along the lines 18—18 and looking in the direction of the arrows to show the structure of the control cams for the toggle lever assembly at the right hand side of the coil winding machine of FIGURE 1.

Further affixed to the shaft 265 is a switch control cam plate 292, as shown in FIGURES 13 and 15, to which there is in turn fastened a detent cam plate 293, as shown in FIGURE 15.

A resilient switch control arm 294 bears upon the peripheral surface of the cam plate 292 in cooperative relation therewith so that recessed portions 295 provided therein act to cause the switch control arm 294 to cause switch arm 296 to open contact 297 and close contact 298 and contact arm 299 to open contact 300 and close contact 301 in a predetermined relation to the operating condition of the machine, as explained hereinafter with reference to the wiring diagram of FIGURE 50.

Further, as shown in FIGURE 15, an arm pivoted at 303 and having a roller 304 is biased by a spring 305 to engage roller 304 in cooperating grooves 306 formed in the detent plate 293 so as to hold the cam 264 affixed to shaft 265 from misadjustment under the biasing force of spring 266 acting through lever 252 and roller 262 on cam 264. Thus the roller 304 cooperates in the grooves 306 of the detent plate 293 to retain the cam 264 accurately in its adjusted position relative to the shift yoke lever 252 during de-energization of the solenoid 273 and while the ratchet arm 282 of FIGURE 14 is out of engaging relation with the ratchet gear 280.

The shift yoke lever 252 is shown in FIGURE 12 in an initial 80° oscillation pitch position and with one step (40° rotation) this yoke lever 252 will in turn be moved by the adjusted position of cam 264 to the 160° oscillation pitch position while the next step movement imparted thereto will move the cam 264 so as to position the yoke lever 252 to the 120° pitch position. A further step movement of the cam 264 will in turn shift the yoke lever 252 back to the original 80° pitch oscillation position for the next cycle of operation.

In the 80° pitch oscillation position, the operating head 258 of the keyer shaft 192 is arranged to operatively position a switch mechanism 305, so as to close a circuit for effecting a control function as hereinafter explained with reference to the wiring diagram of FIGURE 50. In the other 160° and 120° pitch positions of the keyer head 258 the switch mechanism 305 is biased to an open circuit position by a spring 306.

In the proposed arrangement, three steps are required to wind one stator and since there are nine teeth in the ratchet 274, the arrangement is such as to provide for three stators to be wound with one revolution of the cam 264.

In initiating the winding operation, the shaft yoke lever 252 is in the position shown in FIGURES 12 and 15 with the stator nest assembly being indexed to a position relative to the oscillating stop rod 231 in which the stop projection 232 of FIGURE 11 may be readily inserted into the slot 235 through the slot opening CH, as shown in FIGURE 10A, so that the oscillating stop rod projection 232 is positioned in the slot 235 of the stator nest gear 214 directly above the slot opening CH and intermediate the points $BB_1$ and $BB_2$ so that upon energization of the solenoid 240 to initiate the winding operation, the portion 232 of the stop arm 230 is biased upwardly to a point adjacent the point $AA_1$ of the slot 235. The stop 232 is now in a position to limit the winding of the 80° pitch coils.

Figure 10B:
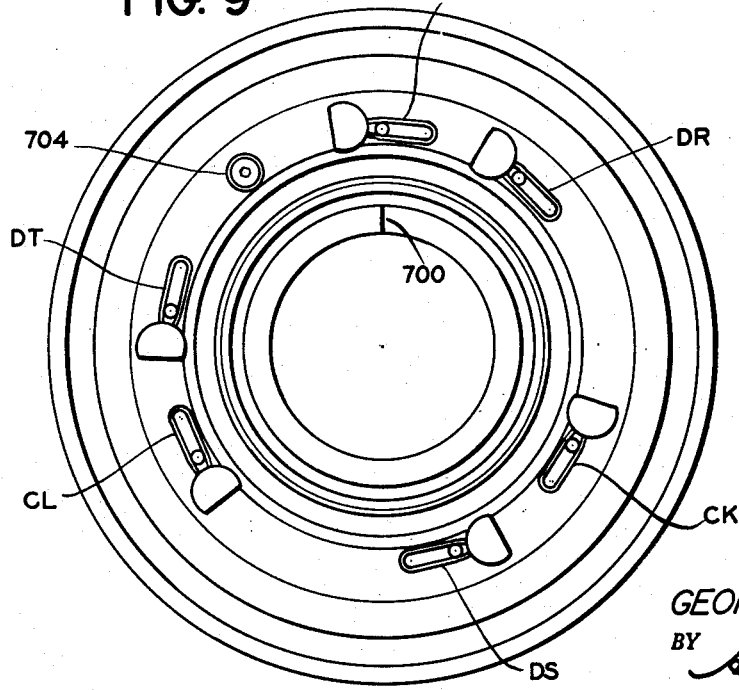
FIGURE 10B is a view of the opposite side of the stator nest assembly of FIGURE 9.

In the subsequent winding operation, as the main cam shaft 41 rotates, motion is imparted to lever 163 by the roller 161 following the surface of the track cam 158 so as to oscillate gear 169, which is in mesh with gear 187. Since the yoke lever 252 is adjusted by the position of the cam 264, shown in FIGURE 12, to an outward position, the key shaft 192 of FIGURE 8 is in turn adjusted to the extreme upward position so as to drivingly engage the gear 187 with the shaft 190 to provide the gear ratio necessary to oscillate through the energized magnetic clutch 202 the gear 212 and in turn the stator nest gear 214 through the pitch angle of 80° provided by the portion of the slot 235 between the points $AA_1$ and $AA_2$, shown in FIGURE 10. While winding the 80° pitch coils the oscillation of the stator nest gear 214 is thus limited by the stop projection 232 at the points $AA_1$ and $AA_2$ so as to allow exactly 80° oscillation.

After winding the necessary turns of the 80° pitch coil, the oscillation of the stator nest 216 is stopped with the stop projection 232 adjacent the point $AA_1$ of FIGURE 10A, thereafter the oscillating stop lever solenoid 240 is de-energized so as to cause the stop projection 232 to drop to the lower portion of the groove 235 between the points $BB_1$ and $BB_2$ and immediately below the point $AA_1$. The stator gear 214 is then rotated 40° in a counterclockwise direction relative to the projecting portion 232, as viewed in FIGURE 10A, by indexing means, to be described later, so as to bring the projecting portion 232 of the oscillating stop lever 230 into contacting relation with the point $BB_1$ of the groove 235. The stator nest assembly is then in position to wind the 160° pitch cross-over coils.

As the main cam shaft 41 is once again operably connected to the motor 19 through the clutch 23, motion is imparted to the lever 163 of FIGURE 7 so as to oscillate drive shaft 175 and thereby gear 171 in meshing relation with gear 185 of FIGURE 8 to provide the gear ratio necessary to oscillate the stator nest assembly through the pitch angle of 160°. Immediately prior to such oscillation, the yoke lever 252 is positioned by adjustment of the cam 264 upon energization of the solenoid 273 to the center or middle position so as to place the key shaft 192 of FIGURE 8 so that the key member 193 engages the gear 185 to drivingly connect the same to the shaft 190. Thus the stator nest assembly gear 214 is oscillated through the energized magnetic clutch 202 and gear 212 through an angle of 160°. Moreover while winding the 160° pitch coils the oscillation of the stator nest gear 214 is limited by the stop projection 232 at points $BB_1$ and $BB_2$ so as to allow exactly 160° oscillation.

After winding the necessary turns of 160° pitch coils the mechanism is stopped and the oscillating stop lever solenoid 240 of FIGURE 11 is energized, moving stop lever projection 232 into an upper portion of the groove 235 between the points CX and UU and adjacent the point CX of the gear 214. The stator nest is then rotated 40° in a counterclockwise direction so as to bring the point UU adjacent the projecting portion 232 of the stop lever 230 by indexing means to be described hereinafter. The shift yoke lever solenoid 273 of FIGURE 12 is then energized so as to position the cam 264 and thereby the shift yoke lever 252 to the third or inner position shown in FIGURE 8. The oscillating stop lever solenoid 240 of FIGURE 11 is then de-energized allowing the stop lever projection 232 to drop to the lower portion of the groove 235 between the points $T_1$ and $T_2$.

The projecting portion 232 of the oscillating stop lever 230 then limits the oscillation of the stator nest assembly at point $T_1$ and is now in a position to wind the 120° pitch coils, which are then wound, as previously described, with the keyer shaft 192 in the extreme inward position, shown in the drawing of FIGURE 8.

An important feature of the mechanism, as heretofore described, is the stop means used to limit the oscillation of the stator nest assembly and the means whereby the stop means may be automatically indexed. The stator nest assembly 216 within the limits of the stop means of FIGURES 10A and 11 and the rise of the track cam 158 of FIGURE 6 is such as to effect rotation of the stator nest assembly an appreciable amount greater than necessary when the aforenoted stop means is not provided. However since there is provided in the assemblage the magnetic clutch drive 202 so arranged as to permit slippage at each end of the oscillation stroke, the stop means provided allows the stator nest assembly to limit in its adjustment against the stop 232 cooperating in the groove 235 so as to give a perfect line-up of the stator slot openings and the shuttle cap to eliminate any indexing problems due to gear back-lash, resilience in the operating levers under load and to any other cause.

The 120° pitch coils are wound in an opposite direction to the 80° and 160° pitch coils and the direction of oscillation of the stator nest assembly 216 is changed by adding the intermediate gear 179 of FIGURE 8 to the gear train.

*Shuttle Reciprocation*

Figure 16:
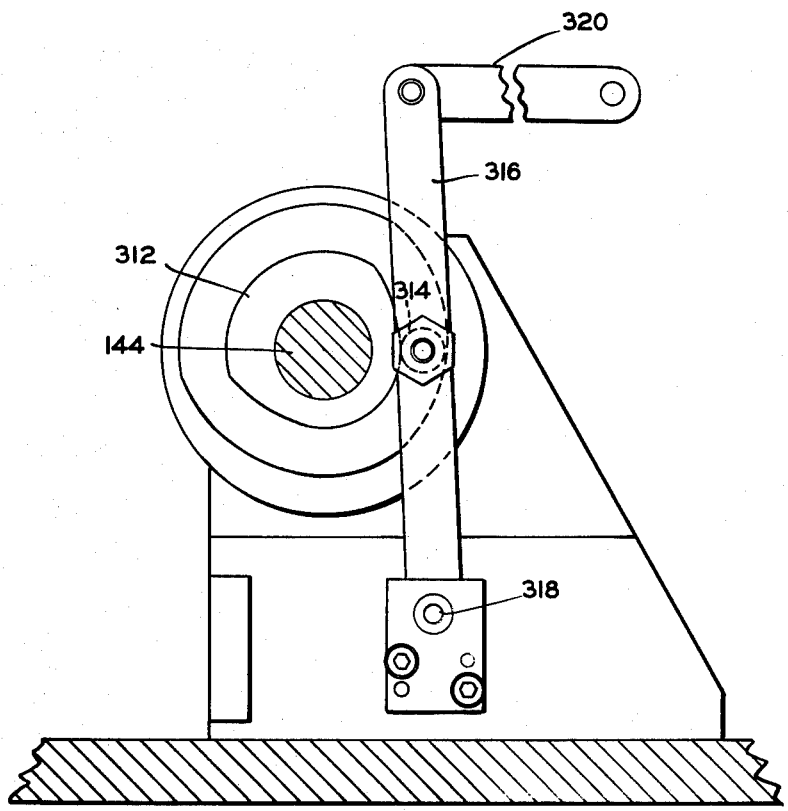
FIGURE 16 is a sectional view of the shuttle drive cam shaft assembly taken along the lines 16—16 of FIGURE 17 and looking in the direction of the arrows.
Figure 17:
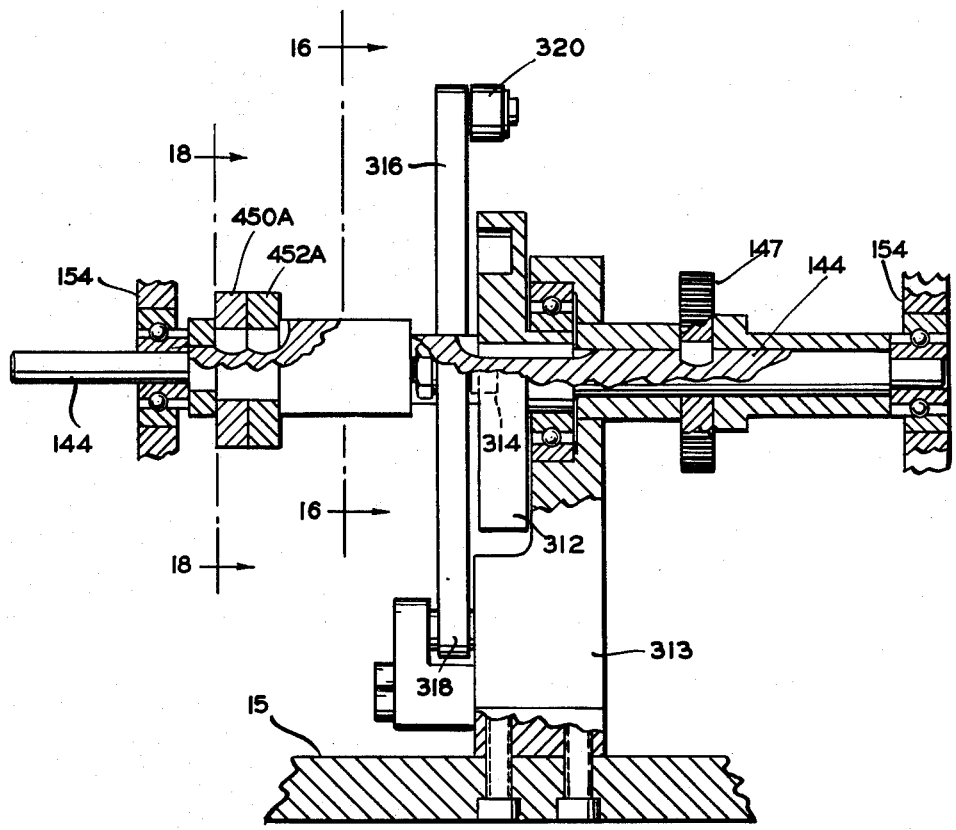
FIGURE 17 is a fragmentary view of the right hand cam shaft assembly of the coil winding machine of FIGURE 1 with certain parts broken away and shown in section to better illustrate the construction thereof.
Figure 19:
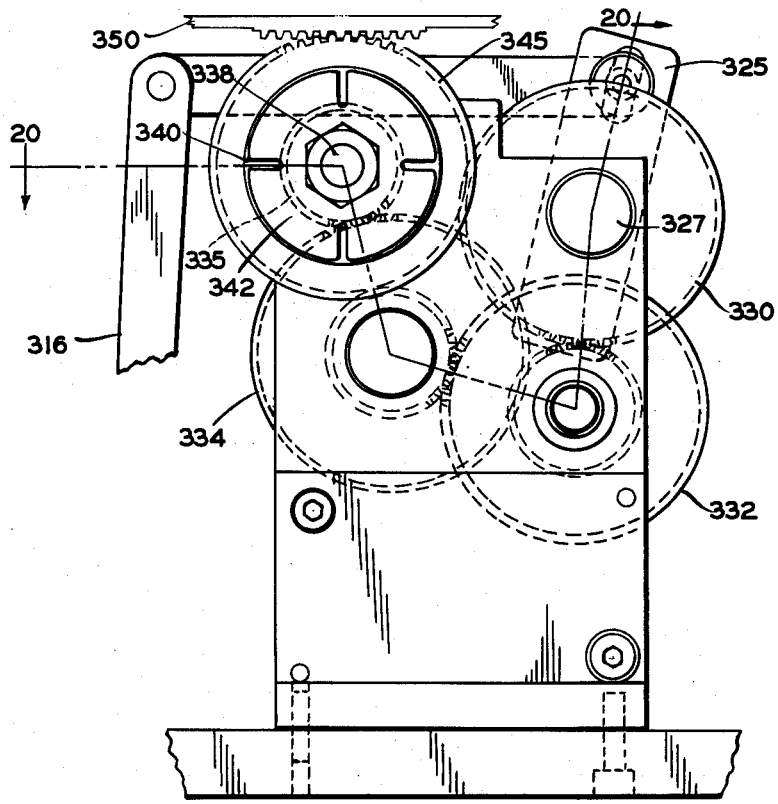
FIGURE 19 is a fragmentary side view of the shuttle drive gear assembly of the coil winding machine of FIGURE 1.
Figure 20:
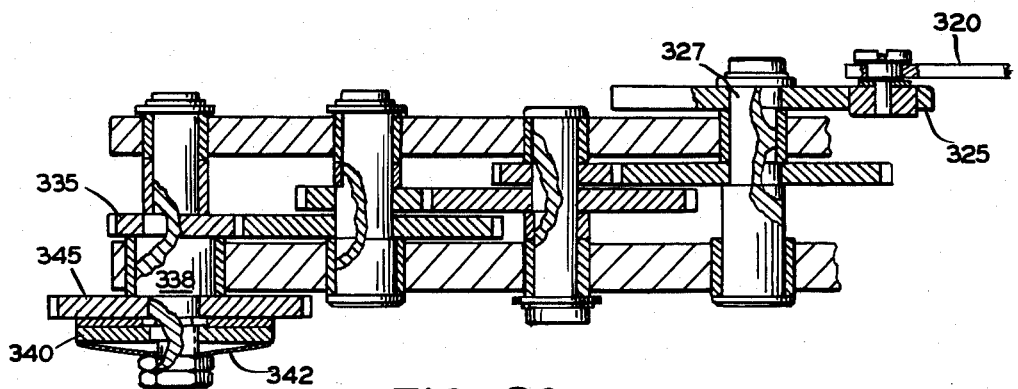
FIGURE 20 is an exploded sectional view of the shuttle drive gear assembly of FIGURE 19 taken along the lines 20—20 of FIGURE 19 and looking in the direction of the arrows.

Referring to the drawings of FIGURES 1, 16, 17, 18, 19, 20, and 21 the motion of a shuttle 310, shown in FIGURE 1, is affected by means of a track cam 312, shown in FIGURES 16 and 17, keyed to the shaft 144 and supported by roller bearings carried by a supporting member 313 affixed to the plate 15. The cam 312 contacts a roller 314 projecting from a lever 316 pivoted at 318 and connected by means of a link 320 to a crank arm 325 which is keyed to a shaft 327 as shown in FIGURES 19 and 20. The motion imparted to shaft 327 is transmitted through a step-up ratio gear train 330, 332, 334 and 335, as shown in FIGURES 19 and 20, through a shaft 338 and through a slip friction clutch 340 biased by a disc spring 342 into driving engagement with a suitable driving gear 345.

The gear train 330–335 thus increases the motion imparted by the track cam 312 the required amount and such increased motion is in turn transmitted to the shuttle gear 345 meshing with the rack 350 fastened to a shuttle 310. The gear rack 350, as shown in FIGURE 21, is attached at 354 to the shuttle 310 and is slidably mounted in a slot 355 provided in a bearing sleeve 356 so that the shuttle 310 may slip back and forth in the bearing sleeve 356 carried at one end by a supporting member 357 and carried at the opposite end by a supporting member 359. The supporting members 357 and 359 are affixed to the base plate 15 of FIGURE 1 and the arrangement is generally similar to the reciprocating shuttle support as explained in the aforenoted copending U.S. application Serial No. 746,437.

In the aforenoted arrangement, the friction clutch 340 of FIGURES 1, 19 and 20 provided on shaft 338 drives through gear 345 the shuttle 310 and any loss of motion due to back-lash in the gears, spring resilience in the operating levers under load and like causes is compensated for by designing a rise of the track cam 312 such as to provide movement greater than that required so that upon the shuttle 310, as viewed in FIGURE 21, being limited in its movement toward the left or right by the supporting members 357 and 359 the clutch 340 provides slippage between the driving and driven portions thereof at such stop positions.

At the inner end of the shuttle 310 there is provided a shuttle cap 360 having three holes 362 opening from the bore 364 in the shuttle 310. The shuttle cap 360 is attached to the inner end of the shuttle by means of screws 366. In operation three wires from three different pay-out reels are threaded through the center bore 364 of the shuttle 310 and then through the three holes 362 in the shuttle cap 360. The amount of wire tension is controlled to a certain degree by the size of the shuttle cap holes 362 and also by a novel wire tension adjusting assembly to be described in greater detail hereinafter. The track cam through connecting levers, gear train, friction clutch and the shuttle rack drives the shuttle 310 through the stator bore of the stator nest assembly in proper timing sequence, as hereinafter explained. This shuttle design is especially adaptable to winding of small bore stators since the size of the shuttle and the shuttle cap may be quite small in diameter.

*Tong-Type Wire Pick-Up Lever Assemblies*

Figure 22:
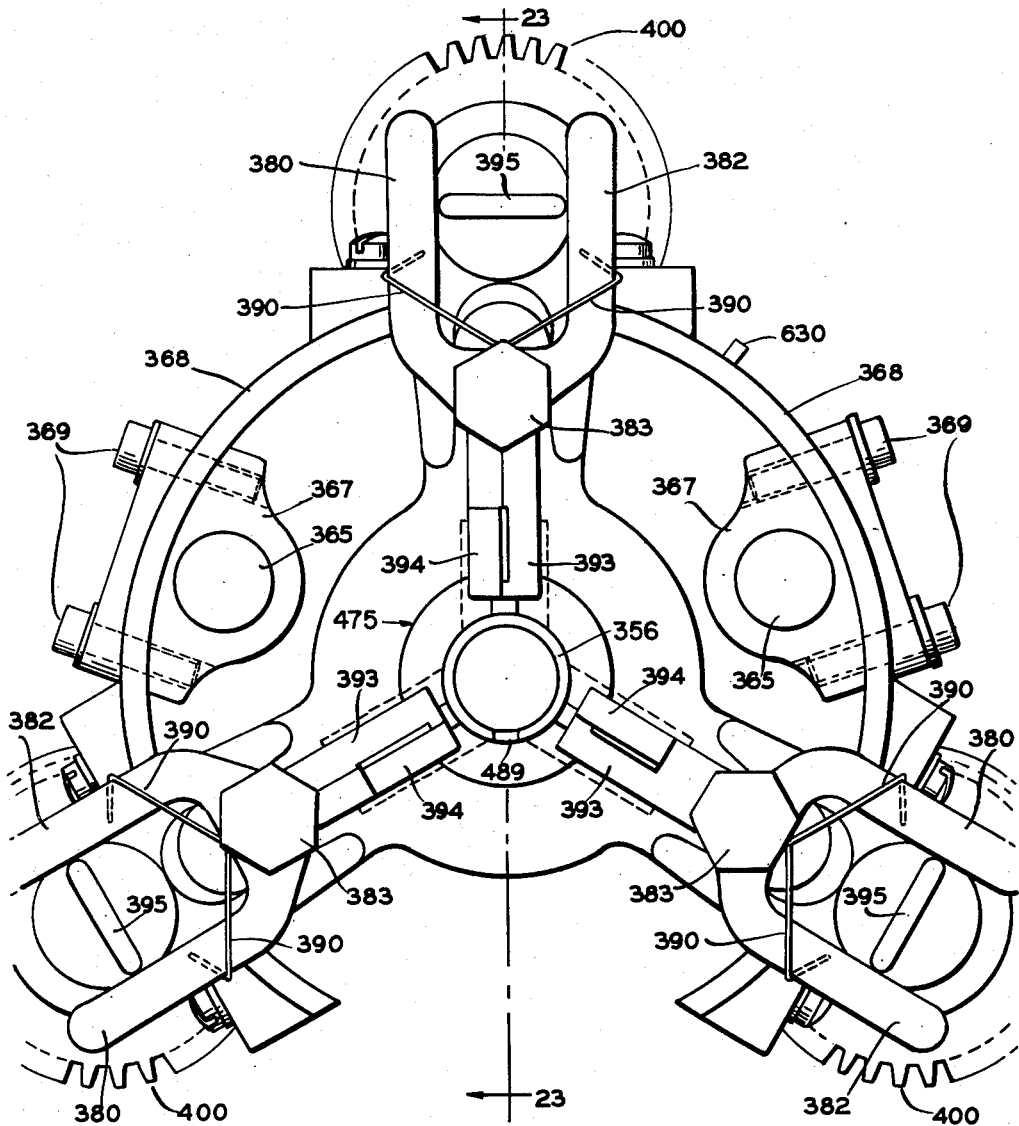
FIGURE 22 is an end view of the toggle lever assembly at the right hand side of the coil winding machine of FIGURE 1.
Figure 23:
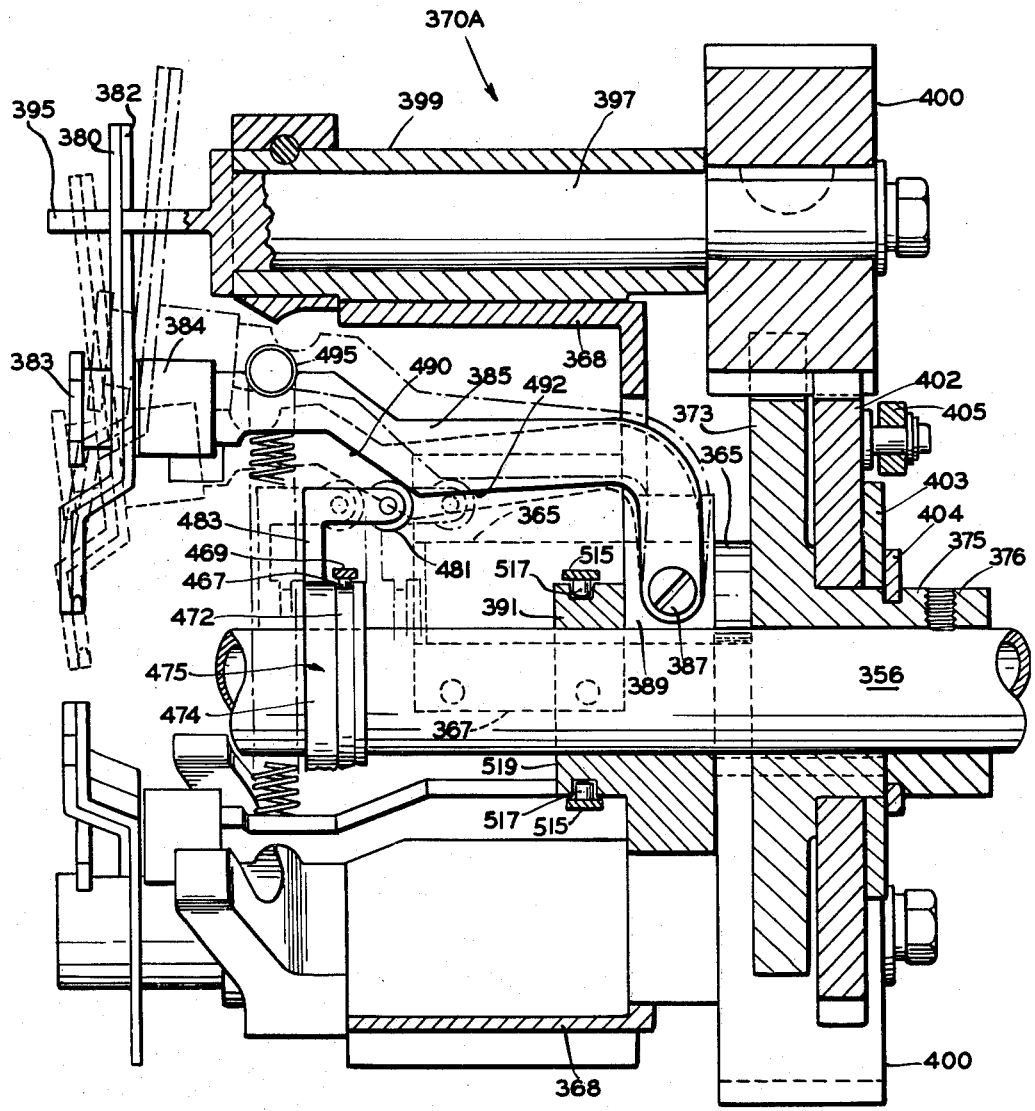
FIGURE 23 is a sectional view of the toggle lever assembly of FIGURE 22 taken along the lines 23—23 and looking in the direction of the arrows.

Positioned at opposite sides of the stator nest assembly 17 are novel tong-type wire pick-up lever assemblies 370 and 370A, which as shown in FIGURE 1, are mounted respectively on bearing members 377 and 356. The pick-up lever assemblies 370 and 370A are of identical structure and for convenience the structure of the assembly 370A is explained hereinafter with reference to FIGURES 22 and 23 in which the explanation thereof is equally applicable to the lever assembly 370 shown in FIGURE 1. Referring then to FIGURES 22–23 the pick-up lever assembly includes an end plate 373 having a bearing sleeve 375 secured by fastening bolt 376 to a bearing member 377 in the case of the lever assembly 370 shown in FIGURE 1 and a bearing member 356 in the case of the lever assembly 370A shown in FIGURE 1 and in FIGURE 23. As shown in FIGURE 1 bearing member 377 is carried by supporting members 379 and 381 while the bearing member 356 is similarly supported on the base member 15 by the supporting members 357 and 359, as heretofore explained. A pair of bearing pins 365 project from the end plate 373 so as to slidably support thereon bearing members 367 affixed to a housing member 368 by bolts 369, as shown in FIGURE 22.

The lever assembly includes three pairs of tong-type pick-up levers each pair having, as shown in FIGURE 22, levers 380 and 382 pivotally mounted on a pin 383 projecting from the outer end 384 of an arm 385, as shown in FIGURE 23, and pivotally connected at 387 to a flange 389 projecting axially from the housing member 368 and having affixed thereto a collar portion 391 slidably mounted on the bearing member 356.

Each assembly, as shown in FIGURE 22, includes three pairs of such tong-type pick-up levers pivoted at 383 and located 120° apart. The levers 380 and 382 are biased by a spring 390 acting on outer end portions of the levers 380 and 382 so as to bias inner end tong portions thereof 393 and 394 respectively to an open position. A rotatable cam portion 395 cooperates with the outer end portions of the levers 380 and 382 so as to bias the same to a closed position as shown in FIGURE 22. The cam portion 395, as shown in FIGURE 22, is affixed to an outer end of a shaft 397 rotatably mounted in a bearing member 399 affixed to the housing 368 to position the cam 395. Thus upon rotation of the cam portion 395 to a position parallel to the outer end portion of the levers 380 and 382, the levers are biased by the spring 390 to an inward position opening the opposite tong end portions 393 and 394. Rotation of each shaft 397 is effected by means of nylon gears 400 key connected to an end of the shaft 397 opposite from the cam 395 to cause rotary adjustment of the cam 395, as shown in FIGURE 22, so as to open and close the tong end portions 393 and 394 of the respective members 380 and 382.

Further, as shown in FIGURE 23, there is provided a main control gear 402 rotatably mounted on the bearing sleeve 375 by a washer 403 and lock ring 404. The main control gear 402 is arranged in toothed engagement with the nylon gears 400 so as to effect the simultaneous opening and closing of the tong and finger portions 393 and 394 in predetermined timed relation. There is connected to the main control gear 402 an operative link 405 effectively positioned as hereinafter explained.

There are three main operational functions performed by the tong-type levers during each cycle of operation of the winding machine. These functions include (1) opening and closing of the tong end portions 393 and 394 by the pivotal movement of the levers 380 and 382 about the pin 383, (2) the radial extension and contraction of the tong-type levers by the pivotal movement of the arms 385 about the pivotal point 387 by means to be hereinafter described and (3) the lateral motion of the complete housing assembly 368 on the bearing pins 365 and along the bearing member 377 or 356, as the case may be, to impart a movement to the tong-type levers 380 and 382 toward and away from the stator nest 17 by operational means to be later described.

*Means To Effect Movement of Tong Type Levers*

Figure 27:
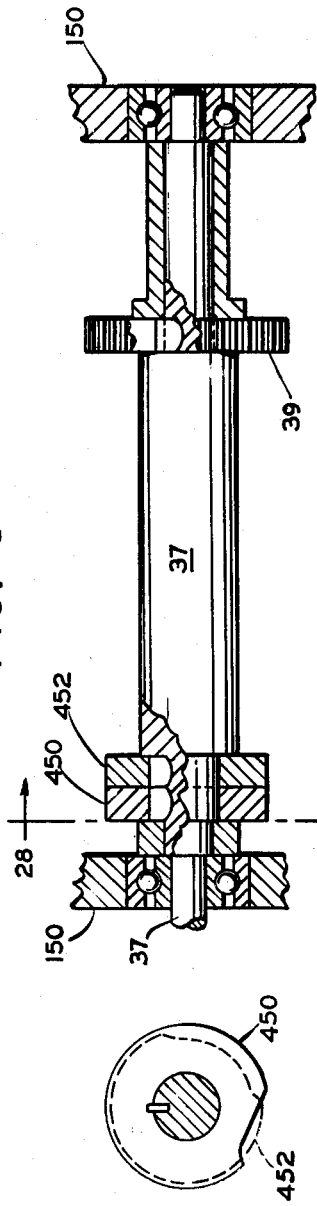
FIGURE 27 (drawing sheet 4) is a fragmentary view of the left hand cam shaft assembly of the coil winding machine of FIGURE 1 with certain parts broken away and shown in section to better illustrate the construction thereof.
Figure 28:
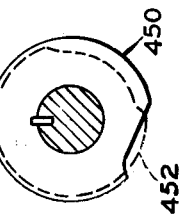
FIGURE 28 (drawing sheet 4) is a sectional view of FIGURE 27 taken along the lines 28—28 and looking in the direction of the arrows to show the structure of the control cams for the toggle lever assembly at the left hand side of the coil winding machine of FIGURE 1.

In order to effect the aforenoted lateral motions of the housing 368 of the lever assembly 370, there is securely fastened to the shaft 37, as shown by FIGURE 27, a cam 450 and to effect the radial extension and contraction of the levers of the assembly 370 there is provided a second cam 452, both of which cams are fastened in correct timing relation on the shaft 37. Similar cams 405A and 452A are fastened to the shaft 144, as shown in FIGURE 17, to effect a like operation with respect to the lever assembly 370A. In the tong type lever assembly 370 and 370A, a like operation is effected, and to simplify this description, the operation of the tong type lever assembly 370 at the left side of the machine of FIGURE 1 will be described.

Figures 29, 30:
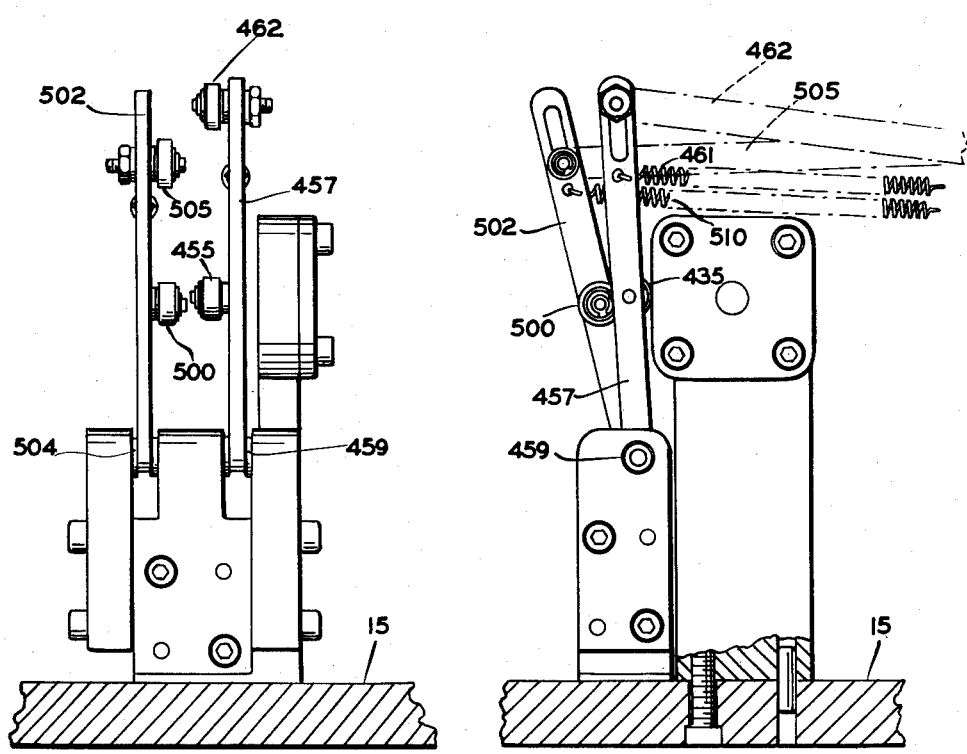
FIGURE 29 is a fragmentary end view of the cam follower assembly for controlling radial and lateral movement of the toggle levers at the left hand side of the coil winding machine of FIGURE 1.
FIGURE 30 is a side view of the cam follower assembly of FIGURE 29.

In contact with the aforenoted cam 450, there is provided a roller 455 carried by a lever 457, shown in FIGURE 29, and pivoted at point 459. Connected to the lever 457 is a connecting link 462 which is connected to yoke lever 464 of FIGURES 31 and 32. A spring 461 is secured at one end to a supporting bracket 463 is connected at the opposite end to the lever 457 so as to bias the lever and roller 455 into operating contacting relation with the cam 450. A similar spring 461A arrangement serves to bias a like arm 457A, shown in FIGURE 1, into contacting relation with a corresponding cam 450A, shown in FIGURE 17. The yoke lever 464 is pivoted at 465 and has a bifurcated upper end portion 467 and pins 469 adapted to engage in a groove 472 of a roller slide assembly 475 of FIGURES 23, 25 and 26 so as to move the entire roller assembly 475 on the bearing member 377 or 356, as the case may be, in a lateral direction within the lever assembly 370 or 370A in a predetermined timed relation as cams 450 or 450A are rotated. As shown in FIGURES 23, 25, and 26, the roller slide assembly 475 has three rollers 481 carried by arms 483 projecting from the collar 484 and having a guide pin 485 slidably mounted in guide groove 487 provided in the bearing 377, as shown in FIGURE 25, or in a like-guide groove 489 provided in the bearing sleeve 356, as shown in FIGURE 22, so as to locate the roller slide assembly 475 and the roller members 481 accurately in camming relation to the cam surface 490 of the arms 385, as shown in FIGURE 23. Thus, the roller slide assembly 475 may be adjusted axially on the bearing member 377 or 356, as the case may be, as the cam 450 or 450A rotates so that the three rollers 481 located 120° apart cooperate in contacting relation with the cam surfaces 490 or 492 of the arms 385 so as to serve to raise and lower the levers 385 to radially extend or contract the tong type levers 380 and 382 as the roller assembly 475 is moved axially on the bearing member. A coiled spring 495 encircles the arms 385 and tends to bias the arms 385 in a radial inward direction and the cam surfaces 490 or 492 thereof into contacting relation with the respective rollers 481 of the roller assembly 475.

Similarly, in contact with the cams 452 or 452A, as the case may be, is a roller 500 carried by lever 502 pivoted at 504, as shown in FIGURES 29 and 30. Connected to the lever 502 is a connecting link 505 which is connected to another yoke lever 507 pivoted at 508. A spring 510 connected at one end to a mounting bracket 512 and at the opposite end to the lever 502 so as to serve to bias the roller 500 into contacting relation with the cam 452 or 452A, as the case may be.

The yoke lever 507 has a bifurcated upper end portion 515 and pins 517 adapted to operatively engage, as shown by FIGURE 23, in a groove 519 provided in the slidable collar portion 391 of the tong lever housing 370 or 370A, as the case may be, and so arranged as to move the tong lever housing assembly 370 and 370A axially on the respective supporting bearings 377 or 356, as the cams 452 and 452A of FIGURES 27 and 17 are rotated, so as to serve to adjust the several tong type lever assemblies 370 and 370A laterally with respect to the stator nest assembly 17 in a predetermined time relation, as hereinafter explained, with reference to the operating timing chart of FIGURE 49.

There are further securely fastened in correct timing relation on the shaft 41, suitable cams 550 and 550A, shown in FIGURE 6, cooperating to effect the opening and closing of the respective tong type wire pick-up levers 380 and 382 of the assemblies 370 and 370A respectively. To effect the latter operation, there is provided a roller 551 carried by a lever 553 and arranged in contacting relation with the cam 550 or 550A, as the case may be. The lever 553 is pivoted at 555 and there is provided a spring 557 secured at one end to a supporting bracket 559 and connected at an opposite end to the lever 553 so as to bias the roller 551 into contacting relation with the cam 550, as shown in FIGURES 33 and 34, or 550A. The lever 553 is connected by a link 560 to another link 562 pivoted at 565. Attached to lever 562 by the link 405 is the main control gear 402 arranged in tooth engagement with the nylon gears 400, as shown in FIGURE 1. It would seem that rotation of the shaft 41 and the respective cams 550 and 550A carried thereby will effect an oscillatory movement to the main control gear 402 which meshes with the nylon gears 400 to rotate such gears, and thereby adjustably position the tong-type levers 380 and 382 in a predetermined timed relation, as hereinafter explained, with reference to the operational timing chart of FIGURE 49. Each of the nylon gears 400, as heretofore described, are rotatably attached through shafts 397 to the cam 395 so as to effect on rotation thereof the opening and closing of the tong portions 393 and 394 through operation of the respective levers 380 and 382 in predetermined timed relation with the several cooperating elements of the stator winding machine.

Stator Nest Indexing

In the present machine, as explained with reference to the stator nest oscillation, it is necessary to index or rotate the stator nest assembly 216 of FIGURE 10A twice during the winding of the three-phase nine-coil stator, once after winding the 80° pitch coils and once after winding the 120° pitch coils. Thus, the stator nest assembly 216 of FIGURE 10A is rotated 40° in a counterclockwise direction after the winding of the 80° pitch coils so as to bring the stop 232 of FIGURE 11 adjacent the point $BB_1$ of FIGURE 10A to effect the winding of the 160° pitch coils. Similarly, upon completion of the winding of the 160° pitch coils, it is then necessary to effect a 40° rotation of the stator nest 216 in a counterclockwise direction so as to move the stop from a position adjacent to a point CX to the point UU to thereafter condition the mechanism for the winding of the subsequent 120° pitch coil between the points $T_1$ and $T_2$ of the groove 235. The means for rotating or indexing the stator nest assembly 216 to effect the aforenoted indexing rotation of 40° includes an index solenoid relay shown in FIGURE 35 and including a solenoid 575 having an armature 577 operatively connected to the rod 228, shown in FIGURES 7 and 8, and which is in turn operatively connected to the part 224 of the magnetic clutch 222 of FIGURE 8 cooperatively arranged relative to the clutch part 220. The part 220 of the magnetic clutch 222 has in turn attached to it the gear 215 which meshes with gear 206 to rotate the stator nest assembly as previously described. The limit of rotation imparted to the stator nest assembly by the index solenoid relay of FIGURE 35 and through the rod 228, clutch 222 and gear 215 again is the groove limits $BB_1$ and CX—UU machined in the gear 214 of FIGURE 10A, as heretofore explained.

The indexing mechanism operates as follows: When winding a complete stator, after the winding of the first 80° pitch coils, the mechanism is stopped and the projection 232 of the oscillating stop arm of FIGURE 11 moves from a position adjacent the point $AA_1$ of the groove 235 of FIGURE 10A to a lower portion of the groove 235 intermediate the points $BB_1$ and $BB_2$ of FIGURE 10A. Energization of the solenoid 575 of FIGURE 35 then rotates the stator nest assembly 216 of FIGURE 10A in a counterclockwise direction so that the projection 232 is now limiting the stator nest at the limit of the groove 235 at a position adjacent $BB_1$ of FIGURE 10A. In order to rotate the stator nest assembly 216 of FIGURE 10A by means of the connecting rod 228 and indexing the magnetic clutch 222 of FIGURE 8, the clutch 222 is energized and the oscillating magnetic clutch 202 is de-energized at such time.

After the aforenoted indexing has been completed, the indexing magnetic clutch 222 is de-energized and the oscillating clutch 202 is re-energized and thereafter the winding of the 160° pitch coils is affected as heretofore explained. The winding operation of the 160° pitch coils is completed with the stop 232 at a position adjacent the point $BB_1$, whereupon the solenoid 240 of the oscillating stop assembly of FIGURE 11 is energized so as to move the stop 232 from a position adjacent the point $BB_1$ to the upper portion of the groove 235 adjacent the point CX. Thereafter the oscillating magnetic clutch 202 is de-energized while the indexing clutch 222 is energized together with the solenoid 575 of the indexing clutch assembly of FIGURE 35 so that the stator nest assembly 216 of FIGURE 10A is again rotated in a counterclockwise direction so that the stop 232 is now limiting the stator nest assembly 216 at a position adjacent the point UU of FIGURE 10A. The solenoid 240 of the oscillating stop assembly of FIGURE 11 is then de-energized so as to move the stop 232 to a position adjacent point $T_1$ preparatory to the winding of the 120° pitch coils and to effectively limit the rotation of the stator nest assembly 216 between the points $T_1$ and $T_2$.

Figure 35:
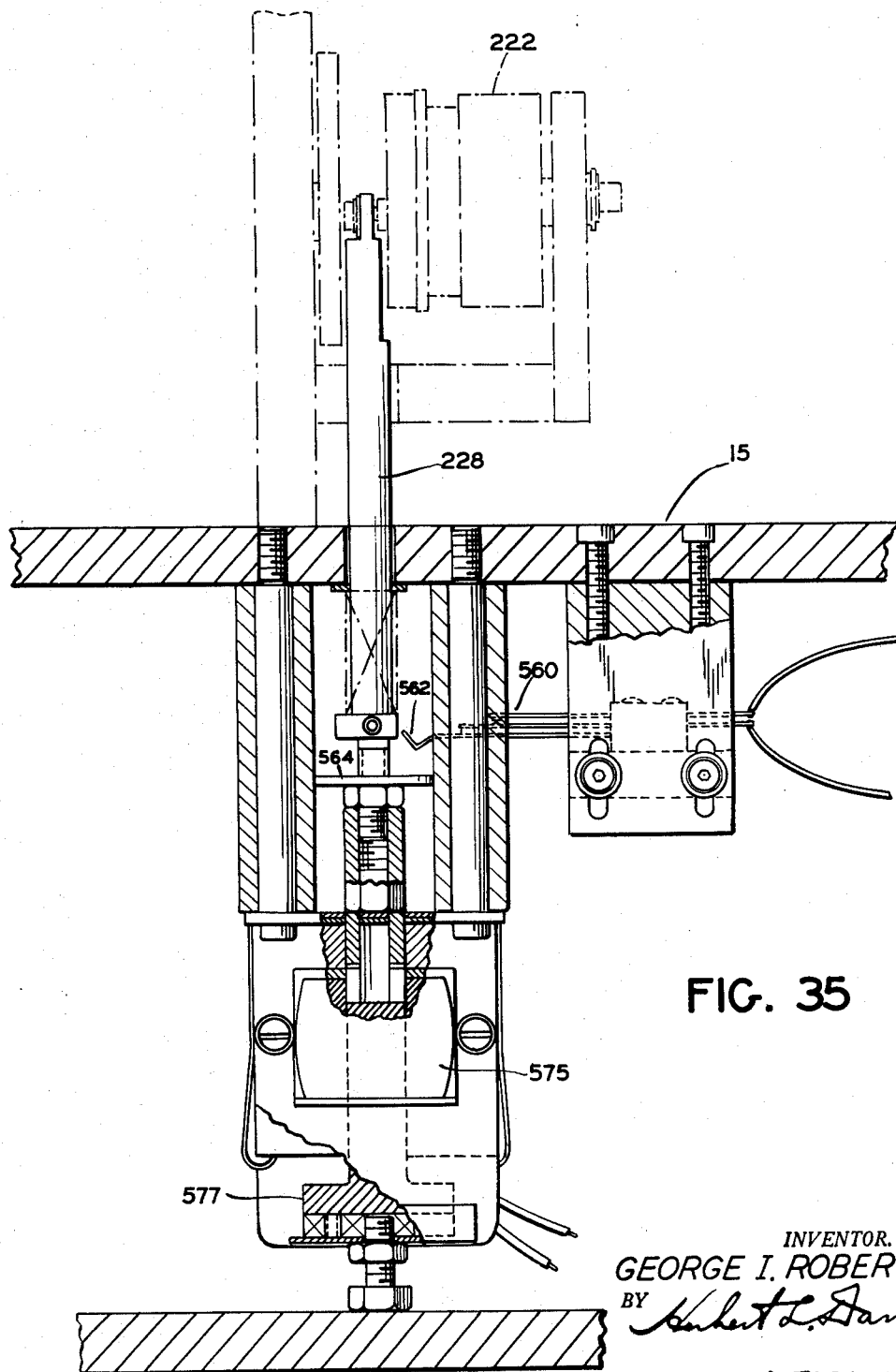
FIGURE 35 is a side view of the indexing clutch assembly for the stator nest assembly of the coil winding machine of FIGURE 1 with certain of the parts thereof broken away and shown in section to better illustrate the structure thereof.

In the last mentioned winding operation, the indexing clutch 222 is de-energized and the oscillating clutch 202 of FIGURE 8 is once again re-energized as well as the solenoid 575 of FIGURE 35 being de-energized. Further, energization of the index relay 575 effectively closes a pair of relay contacts 560 through an operating level 562 and actuating plate 564, as shown in FIGURE 35, for effecting a control function as explained with reference to the wiring diagram of FIGURE 50.

Lateral Motion Tong Lever Positioning Assembly

In the winding of the 120° pitch coils, as will be explained in greater detail hereinafter, it is necessary to laterally position the tong-type levers in assemblies 370 and 370A axially along the bearing member and into close proximity to the stator winding assembly 17 in order to effectively position the wire of the 120° pitch coils in the outer grooves of the end turn forming rings. In order to limit such lateral movement to a predetermined critical point, there is provided the mechanism 600, shown in detail in FIGURES 36 and 37, and including a solenoid 602 which upon energization biases the armature 604 to the position shown in FIGURES 36 and 37 against the biasing force of a spring 606, shown in FIGURE 36. Upon the de-energization of solenoid 602, the spring 606 biases the plunger 604 to the opposite position shown in FIGURE 36. The solenoid 602 is energized upon initiation of the winding operation for the 120° pitch coils and is de-energized during the other winding operations of the mechanism.

Figure 36:
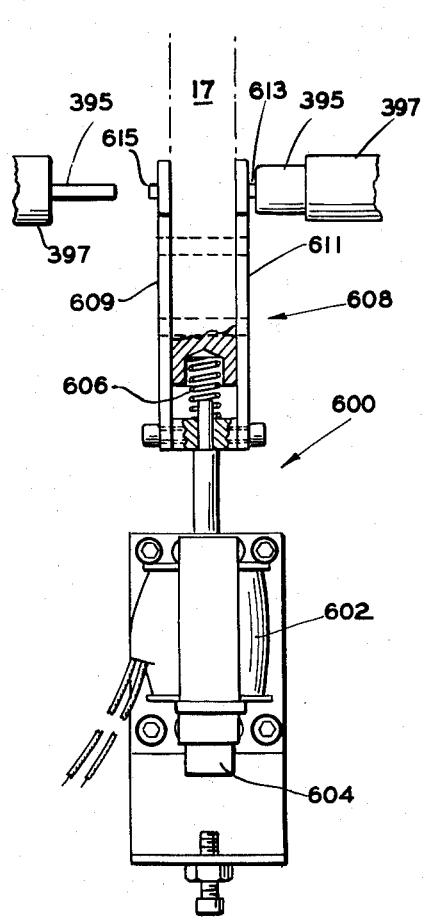
FIGURE 36 is a top plan view of the toggle lever assembly lateral motion limiting device of the coil winding machine of FIGURE 1 with certain parts thereof broken away and shown in section to better illustrate the structure thereof.
Figure 37:
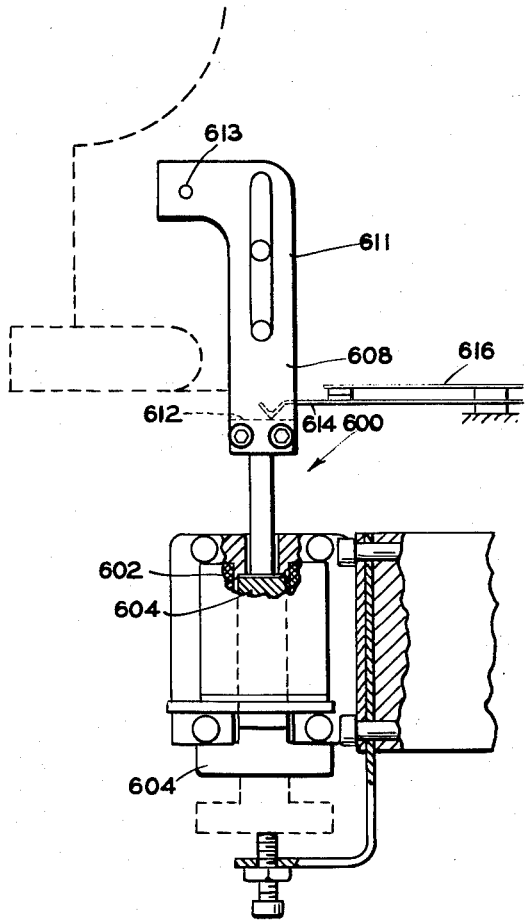
FIGURE 37 is a side view of the assembly of FIGURE 36 with certain other parts thereof broken away and shown in section to better illustrate the structure thereof.

The lateral motion position limiting assembly of FIGURES 36 and 37, includes a U-shaped sliding member 608 having arms 609 and 611 position at opposite sides of the stator nest assembly 17. The arms 609 and 611 are connected by a bracket portion 612 and have at the ends of the arms 609 and 611 bearing elements or buttons 613 and 615. The arrangement is such that upon energization of the solenoid 602, the arms 609 and 611 of the U-shaped member 608 are placed adjacent opposite faces of the stator assembly 17 and between the faces thereof and cooperating ends of the cam elements 395 of the respective lever positioning assemblies 370 and 370A so as to limit the lateral movement of the respective assemblies toward the stator winding assembly 17 to a predetermined critical position at which the wire of the 120° pitch coils may be effectively placed in the outer grooves of end turn forming rings by the subsequent action of the tong-type levers 380 and 382. Further upon energization of the solenoid 602 the bracket portion 612 biases a control element 614 of a switch mechanism 616 to close the switch 616 for completing a holding circuit for the solenoid 602 as shown in FIGURE 50. Upon de-energization of the solenoid 602 the switch 616 is biased to an open position. Means for energizing the solenoid 602 to actuate the lateral motion relay 600 at the correct time for winding the 120° pitch coils in the outer grooves of the end turn forming rings will be described hereinafter.

Description of Operation

In order to facilitate loading of the stator nest in the stator nest assembly 17 prior to initiation of the winding operation, there is provided, as shown in FIGURES 1 and 24, a spring loaded finger 620 of conventional type carried by a stub shaft 622 rotatable in the member 373 mounted on the bearing sleeve 356. The finger 620 has provided a slot 627 engaging a pin 630 projecting from the housing 370A, as shown in FIGURE 1 and so arranged that the pin 630 may be engaged in the slot 627 of the finger 620 so as to hold the right lever tong assembly 370A in an extreme position to the right, as shown in FIGURE 1, and away from the stator nest assembly 17 during the loading operation. When ready for the winding operation, this pin 630 may be released by the operator turning the knob 625 so as to cause the finger 620 to disengage the pin 630 whereupon the knob 625 may be biased outwardly from the member 373 by the action of a spring 632 acting on the stub shaft 622, as shown in FIGURE 24.

However, before initiating the operation of the winding machine 14, the unit to be wound is first rotated in the stator nest assembly 17 to a definite adjusted position, as explained in the aforenoted U.S. application Serial No. 746,437, in which for example, a given slot in the unit and designated VI is lined up with a scribed line 700 on one face of the stator nest assembly, as shown by FIGURE 10B and FIGURES 38, 39 and 40.

As shown in FIGURE 9, the stator or unit to be wound may be held in the bore of the stator nest assembly 216 by means of a spring loaded pin 702, sliding cam pin 704, and socket head screw 706. Tightening of screw 706 cams pin 704 into contact with an outer peripheral surface of the unit to hold the stator unit in position.

Further, two end-turn forming rings designated in FIGURE 41 as BC and BD, are assembled at opposite sides of the stator nest assembly 216. The rings BC and BD may be of a type disclosed in U.S. Patent No. 2,810,848, granted October 22, 1957, to George I. Roberts, and assigned to Bendix Aviation Corporation, and the rings BC and BD are assembled to the nest in a predetermined index position relative thereto so that the rings line up with the stator and stator nest, as shown in the drawing of FIGURE 41. In order to simplify the description of the winding operation, one cycle of machine operation in the winding of one wire will be described with reference to the drawings of FIGURES 41–48 and the timing chart of FIGURE 49, as applied for example to the winding of the 160° pitch coils of FIGURE 39.

Moreover, the numbers 1–A, 1–B, etc. appearing on the drawings of FIGURES 41–48 refer to the positions corresponding to like designations appearing on the timing chart of FIGURE 49 for the various functional elements during the winding of one turn (one revolution of the winding machine). The following description covers the winding of one turn of the 160° cross-over coil which is wound in slots VII—III of stator BE. After winding the three 80° pitch coils the stator BE is indexed so that slots VII and III are in the position shown on FIGURE 41. The wire is fed from a suitable pay-out reel and tension device to be later described and through the shuttle cap or nozzle of the structure heretofore described over right top tong lever toes BF ready for winding into slot VII. At the start of the cycle position 1–A, the shuttle (1) starts to move from right to left and at position 1–B, approximately the center of stator BE the tongs BF open up as indicated at 1–B of the chart of FIGURE 49 releasing the wire which has already entered the slot VII opening due to line up and radial positions of the stator, shuttle nozzle and tongs.

Just before the shuttle nozzle (1) completes its right to left stroke the left top tong lever FF with tongs in open position starts to drop. (See position 1–C on FIGURE 41 and the timing chart of FIGURE 49.) At position 1–D the right tong pick-up lever assembly BF as indicated on the timing chart of FIGURE 49 starts to move in a lateral direction away from the stator nest to the outer position where wire is picked up from the shuttle. After the left top tong lever FF has dropped to its lowest position (see position 1–E of FIGURES 41 and 49) the tongs FF stat to close around the wire to pick the wire up. Just before the tnngs completely close at position 1–F the tong lever starts to rise and before completing its rise back with the wire to position 1–C the entire left tong lever assembly with tong lever FF starts to move toward the stator nest assembly. (See position 1–G on the timing chart of FIGURE 49.)

Figure 42:
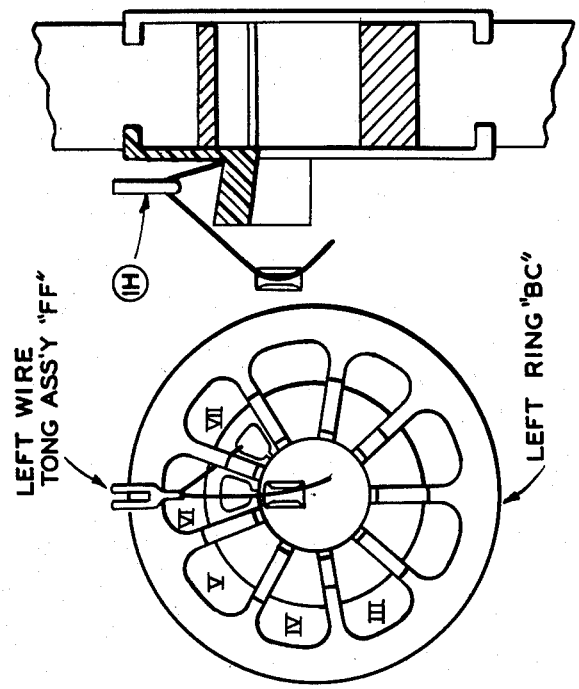

Shortly after the tong lever reaches the position closest to the stator nest assembly, the nest begins to rotate in a counterclockwise direction viewing it from the right side (see position 1–H of FIGURES 42 and 49). Rotation of the stator nest forms and places the end turn of wire in the groove of the end turn forming ring BC closest to the stator nest.

Figure 44:
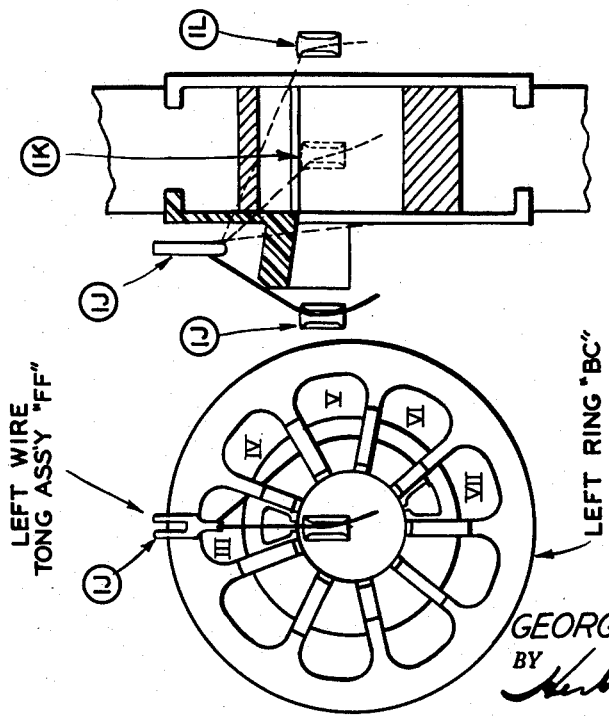

At the completion of rotation of the stator nest and with the shuttle shown in the position I—J of FIGURES 44 and 49 the shuttle starts to move from left to right and at position (1–K), approximately the center of stator BE, the tongs FF open up as indicated on the timing chart of FIGURE 49 releasing the wire which has already entered the slot III opening due to line-up and radial positions of the stator, shuttle nozzle and tongs.

Just before the shuttle nozzle completes its left to right stroke the right top tong lever BF with tongs in open position starts to drop. (See position 1–L of FIGURES 45 and 49.) At position 1–M, as indicated on the timing chart of FIGURE 49, the left tong pick-up lever assembly FF starts to move in a lateral direction away from the stator nest to the outer position 1–A preparatory to once again picking up the wire from the shuttle. After the right top tong lever has dropped to its lowest position (see position 1–N of FIGURES 45 and 49) the tongs BF start to close around the wire to pick the wire up. Just before the tongs completely close at position (1–P of FIGURE 49) the tong lever starts to rise and before completing its rise back with the wire the entire right tong lever assembly with tong lever BF starts to move toward the stator nest (see position 1–R of the timing chart of FIGURE 49).

Figure 47:
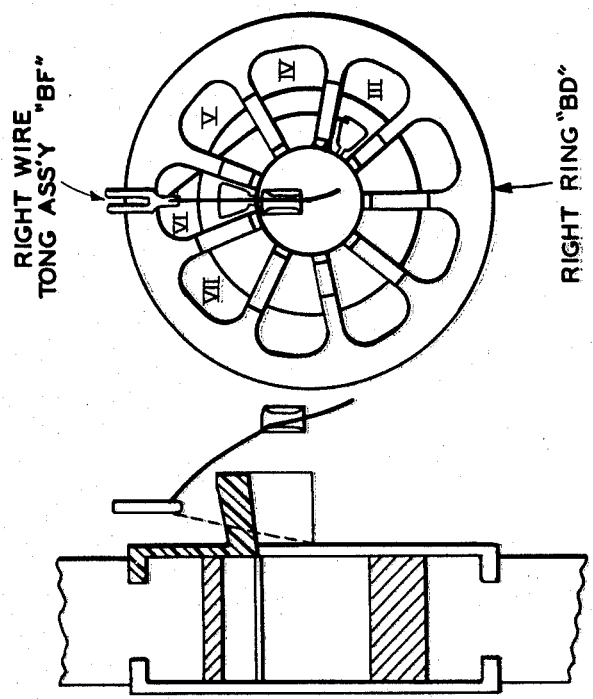
Figure 46:
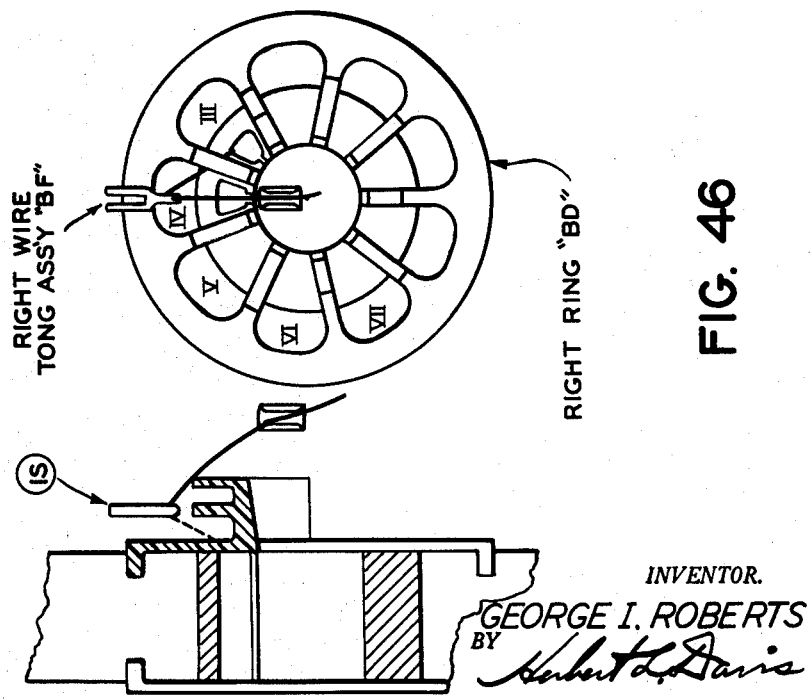

Shortly after the tong lever BF reaches the position closest to the stator nest, the nest begins to rotate in a clockwise direction, viewing it from the right side. (See posiion 1–S of FIGURES 46 and 49.) Rotation of the stator nest forms and places the end turn of wire in the groove of the end turn forming ring BD closest to the stator nest, as shown by FIGURES 47 and 49. Completion of the rotation of the stator nest completes the winding of one cross-over turn and at position (1–A of FIGURES 41 and 49) the machine is ready to start the winding of the next turn.

The balance of turns specified in this coil are wound in stator slots III and VII in exactly the same manner as the first turn previously described.

The machine herein described is arranged so as to wind three of these coils at one time, winding 160° coils in the slots III—VII, I—VI, and IV—IX. At the cross-over points between slots III and IV, VI and VII, and I and IX the arrangement is such that each turn of one coil will lap over each turn of the other coil on each side of the stator as the stator nest assembly is oscillated from 0° to 160° and return.

The 160° pitch coils are particularly difficult to wind since the wires of each of the coils cross over the wires of the other of the three coils. However, the structural arrangement of the stator winding machine in cooperation with the end forming rings is such as to make the satisfactory machine winding of these coils possible.

In the automatic machine winding of a three phase, variable pitch 9 coil stator such as shown in FIGURE 40, the stator and left and right end turn forming rings are indexed and held in indexed position as previously described. The stator nest is then mounted in a lower position of the split bearing 17 and indexed so that slot CH in gear 214 of FIGURE 10A engages oscillating stop 232 of FIGURE 11. Gears 212 and 214 of FIGURE 9 now are in proper mesh position. The cap of split bearing 17 is now clamped over ball-bearings 218 of stator nest assembly by means of a clamp and thumb nut. When loading the stator nest assembly the right tong pick-up lever assembly 370A is held in a lateral position furthest away from the stator by means of detent lever assembly 620, as shown in FIGURE 1.

Three wires protruding from the shuttle cap 360 preparatory to the winding operation are then fastened to the stator nest as follows: The top wire is fastened under clip CJ, the rear wire is fastened to a clip CK and the front wire is fastened to clip CL of the stator nest assembly of FIGURE 10B. Detent lever assembly 620 is now operated to release the right tong pick-up lever assembly 370A which due to spring tension moves to a position closest to the stator nest assembly. Having loaded the stator in the nest assembly the machine is now ready to machine wind the stator.

The winding mechanism of FIGURE 1 and wiring diagram of FIGURE 50 includes three counters of conventional type indicated in FIGURE 1 by numerals 801, 802 and 803 respectively. The counters may be electrically operated by means of stepping relays having actuating windings indicated in FIGURE 50 by numerals 805, 807 and 809. The counters may be set manually in a conventional manner so as to effect energization of suitable servo relays by the closing of the control switches 811, 813 and 815, respectively upon a predetermined number of winding turns being registered by the respective step relays. Thus for example when winding the subject number of 86 turns per phase stator, the counter 801 may be so set to cause step relay winding 805 to close a control switch 811 on the tenth turn, the counter 802 may be set to cause step relay winding 807 to close a control switch 813 on the 56th turn and the counter relay 803 may be set to cause the step relay winding 809 to effectively close a control switch 815 on the 86th turn.

There are further provided the relays 817, 819 and 821 mounted on a counter panel 823 as shown in FIGURE 1 and operatively controlled by the aforenoted step relays 805, 807 and 809. Thus the relay winding 817 is energized by the step relay 805 closing the switch 811, the relay winding 819 is energized by the step relay 807 closing the switch 813 and the relay winding 821 is energized by the relay winding 809 closing the switch 815. These relay windings 817, 819 and 821 operate suitable switching mechanism as will be described hereinafter to provide initial signals for the automatic operations completed after the winding of the specified coil or coils.

The wiring diagram of FIGURE 50 shows electrical equipment and connections necessary to automatically machine wind the subject 86 turn, three phase stator. In the latter arrangement there is provided a master step relay 820 of conventional type shown diagrammatically in FIGURE 50 and structurally in FIGURES 51 and 52 and including a ratchet 822 driven by a driving pawl under the biasing force of suitable spring mechanism not shown and conditioned for operation by energization of an electromagnet 824 of conventional type. The arrangement is such that the driving pawl actuates the ratchet 822 with a step action upon de-energization of electromagnet 824 and in turn drives through the ratchet 822 a series of cams 823 to in turn operate a bank of switch mechanisms indicated generally in the drawings of FIGURES 51 and 52 by numerals 825 and 827 and shown diagrammatically in FIGURE 50 by the numerals 831, 832, 832A, 833, 834, 834A, 835, 835A, 836, 837 and 838. In FIGURE 50 the several positions taken by the switches are shown immediately opposite respective Roman numerals I, II, III, IV, V and VI in the six positions thereof during the corresponding adjusted positions of the operating cams 823, as indicated thereon, and in response to the step by step operation of the master step relay 820, as will be explained in greater detail hereinafter. There is further provided a suitable supply of A.C. power (110 volts) indicated by the numeral 840 which is ocnnected through main control switch 842 to the winding machine and control circuits therefore through suitable switches to operate the driving motor and various solenoid relays. D.C. rectifiers 844, 846 and 848 connected to the power source 840 through the main control switch 842 also provide a D.C. supply to magnetic clutches and various relays in the operation of the winding machine, as explained hereinafter.

*Manually Operable Mechanical Locking Means for Master Step Relay*

As shown in FIGURES 51–53 there is provided a manually operable mechanism 852 to mechanically lock the master step relay 820 when the main power switch 842 is opened. This locking mechanism must be in the locked position when power to the winding machine is switched to the "off" position by the opening of the main switch 842, otherwise upon the main step relay winding 824 being thereby de-energized the step relay 820 would step and disrupt the order of sequence or programming. After closing the main switch 842 ("on" position) the operating knob 852, as shown in FIGURE 53, may be rotated by the operator in a clockwise direction to the "on" position so as to unlock the step relay 820 which is in a position ready to step when deenergized.

As shown in FIGURES 51–53, the knob 852 is mounted on a panel 853 at one side thereof and operatively connected through the panel by a shaft 855 to a cam 857, as shown by FIGURE 51, having a projecting portion 859 operably engaging in a slot 861 provided in a locking arm 863. As shown in FIGURE 51, the locking arm 863 is pivotally mounted at 865 on the panel 853 and biased by a spring 867 into engagement with the cam portion 859. A free end portion 869 of the locking arm 863 has teeth arranged for engagement with teeth of the ratchet 822 upon the knob 852 being in the "off" position, as shown in FIGURES 51–53, and the cam 857 being adjusted thereby to the position shown by FIGURE 51 for locking the ratchet 822 from rotation.

Moreover, in order to provide visual means for readily detecting a disruption in the order of sequence or program of operation of the master step relay 820, there is provided a window 870 of a clear plastic material in the control panel 853 (FIGURE 53) through which the operator of the machine may readily observe a face of the ratchet gear 822 having provided thereon an indicator line 870A which under normal conditions takes the position shown in FIGURE 53 upon completion of a normal cycle of operation of the winding machine and prior to the operator initiating operation of the winding machine for a succeeding cycle of operation. However, should the indicator line 870A immediately prior to the operator preparing to initiate operation of the winding machine be in a position to one side or the other of the normal position, as shown in FIGURE 53, this would be an immediate indication to the operator that there had been a disruption in the order of sequence or program of operation of the master step relay 820 serving as a warning to the operator not to initiate the operation of the winding machine until such condition had been repaired. With the indicator line 870A in the normal position, the operator may initiate operation of the winding machine by first closing the main switch 842, second turning knob 852 to the "on" position and thereafter closing an impulse switch 875.

Upon the manually operable knob 852 (FIGURE 53) being adjusted in a clockwise direction from the "off" position to the "on" position after closure of the main power control switch 842, as heretofore explained, the cam 857 and the projecting portion 859 are moved from the position shown by FIGURE 51 in a counterclockwise direction so as to permit spring 867 to bias the locking arm 863 in a clockwise direction so as to release the locking arm 863 from locking relation with ratchet 822 and cause a second projecting portion 871 to actuate a switch mechanism 872 to a circuit closing position for energizing an electrical indicator lamp 874 shown in FIGURES 51–53 and diagrammatically in FIGURE 50.

The machine is now set up and ready to wind the stator. The stator nest including stator and end-turn forming rings is loaded in the machine as previously described. Closure of the impulse switch 875 by the operator starts the operation of the winding machine.

Electrical Control Circuit

When impulse switch 875 is momentarily closed there are pulse circuits set up to operate first the shift relay 273 and thereafter the clutch relay 44. These circuits are as follows:

Referring to the wiring diagram of FIGURE 50, there is a closed circuit from one side of the A.C. line through switch 875, shift relay 273 (FIGURE 12) to the other side of the A.C. line. Energization of relay 273 closes switch contacts 290—291 and shifts the change gears as previously described to close switch 305 (FIGURE 8). In order to assure that this shift has operated satisfactorily, switch 305 is inserted in series with the clutch relay 44 energizing circuit. Closure of the switch 305 denotes satisfactory shift and the clutch relay 44 (FIGURES 3 and 4) is then in condition to start machine operation. In this shift operation the keyer shaft 192 (FIGURE 8) is moved so as to position the key member 193 from engagement with the 120° pitch gear 181 into engagement with gear 187 preparatory to the winding of the 80° pitch coils.

Moreover upon closure of switch 305 there is completed an electrical circuit from one side of the A.C. line through switch 875, closed switch 305, clutch release relay 44 (FIGURES 3 and 4) to the other side of the A.C. line. Energization of the clutch relay 44 releases the clutch element 32 (FIGURE 3) for tooth engagement with clutch element 31. When the relay 44 is energized it is locked in the energized position by a locking circuit from one side of the A.C. line through closed switch 882 of the servo relay 817 controlled by the counter step relay 805, closed switch contacts 299 and 300 of the shift relay cam 292 (FIGURE 15), closed switch 56 (FIGURE 4) of relay 44 through relay winding 44 to other side of the A.C. line. There is also a multiple intermittent circuit from one side of the A.C. line through the closed switch 100 operated by a cam 77 on the main shaft 41, the operation of which will be described later.

Energization of the shift relay 273 rotates cam 292 (FIGURE 15) to operate contacts 296—297 and 298 in addition to contacts 299, 300 and 301 to set up the various electrical circuits as required. The cam 264 (FIGURE 12) is rotated through an angle of 40° each time relay 273 is energized to position keyer shaft 192. Contacts 296 and 298, 299 and 301 are closed only in the 160° pitch position.

At the start, position I of step switch relay 820, a pilot light 885 (FIGURE 53) is effectively energized to show that the winding machine is ready to operate. This light will be "on" in position I only. The energizing circuit may be traced on FIGURE 50 from one side of A.C. line through closed switch 835 of the cam 4, at position I of relay 820, through pilot lamp 885 to the other side of A.C. line.

At the start before switch 875 is closed the counter controlled relay 817 switches 881 and 882 are closed, shift relay cam 292 contacts 296 and 297, 299 and 300 are closed. The step relay 820 is energized since contacts 69 and 70 (FIGURE 5) are closed energizing a time delay relay winding 880 closing contacts 886 and 888 and opening a contact 887 after a predetermined delay period so as to complete a circuit from one side of the D.C. rectifier 844 through closed contacts 886 and 888, closed switch 835A on cam 4 of the step relay 820 which is in position I, and through the step relay winding 824 to the other side of the rectifier line.

The index magnetic clutch 222 (FIGURE 8) is also energized before starting operation of the winding machine since contacts 66 and 68 (FIGURE 5) of clutch 23 are closed. The closed circuit through the index magnetic clutch 222 may be traced from the clutch D.C. rectifier 848, through closed contacts 66 and 68 of clutch 23, through indexing magnetic clutch 222 to the other side of the rectifier line.

Operation of the impulse switch 875 to operate the shift relay 273 and the clutch relay 44 has been previously described.

The engagement of teeth of clutch 23 due to energization of the clutch relay 44 opens contacts 70 and 69 de-energizing the time delay relay winding 880 causing contacts 886 and 888 to open and contacts 886 and 887 to close. When contacts 886 and 888 open the step relay winding 824 is de-energized whereupon the step relay 820 steps to position II where it is again energized in position for the next step due to completion of a circuit from one side of the D.C. rectifier 844, through closed contacts 886 and 887 of relay 880, switch 834A of cam 3 of step relay switch 820 through step relay winding 824 to the other side of the rectifier line.

Engagement of the clutch teeth of clutch 23 also opens the contacts 66 and 68 and closes the contacts 66 and 67 de-energizing the index magnetic clutch 222 and energizing the stator oscillating magnetic clutch 202 (FIGURE 8). This closed circuit through stator oscillating magnetic clutch 202 may be traced from one side of the clutch D.C. rectifier 848, through closed contacts 66 and 67 of clutch 23, through stator oscillating magnetic clutch 202 to the other side of the rectifier line. Energization of the oscillating magnetic clutch 202 provides means for driving or oscillating the stator nest 216 (FIGURE 9) when winding, as heretofore explained.

With the step relay 820 in position II there is a closed circuit from one side of the A.C. line, through closed switch 834 of cam 3 position II of step relay switch 820, closed switch 881 of counter controlled relay 817, closed contacts 296 and 297 of the shift relay cam 292 (FIGURE 15), through motor 19 and Variac 43 to the other side of the A.C. line. There is a toggle switch 890 in series with this circuit which when opened allows manual operation of the machine. There is also a parallel intermittent circuit through switch 90 operated from a cam 75 on the shaft 41 of the machine, through motor 19 and Variac 43, the operation of which will be described later.

Thus, closing of the switch 834 of cam 3, position II of step switch relay 820, completes a circuit to the motor 19 for winding a specified number of turns of the 80° pitch coils. The mechanical operations required to wind the wire in the proper slots have been previously described with reference to FIGURE 1 and the timing chart of FIGURE 49.

As the winding machine operates the counter stepper relays 805, 807, and 809 are electrically operated through a circuit from one side of the A.C. line, closed switch 101 operated from a cam 79 on the rear shaft of machine, through the counter step relay windings 805, 807, and 809 to the other side of the A.C. line. The cam 79 is so arranged as to momentarily close the switch 101 at approximately 90 degrees after the start of each revolution of the shaft 41 and to thereafter maintain the switch 101 open. The counters are connected in multiple and step a count of one in response to the closing of the switch 101 for each revolution (equivalent to one turn of wire) of the main shaft 41. Shortly after the machine starts the 10th turn, since 10 turns of the 80° pitch are specified for this particular stator, the servo relay 817 is energized by the step relay 805 of the counter 801 closing contacts 811, whereupon the servo relay 817 is effective to open the switches 881 and 882. Opening of the switch 881 conditions one leg of the multiple circuit through the motor 19 to be opened although actually the motor circuit is not open until switch 90 controlled by cam 75 opens some time during the 10th revolution. The cam 75 is so designed as to open the switch 90 at approximately 90° after the start of the 10th revolution of the shaft 41 and to maintain the switch 90 closed at between approximately 10° and 90° after the start of each revolution of the shaft 41. Switch 90 is provided in order to adjust the motor cut-off position more accurately. When both switches 90 and switch 881 are open the circuit to the motor 19 is opened and the motor slows down. (The motor 19, however, never comes to a complete stop due to its inertia.) The counter step relay 805 is arranged to hold the switch 811 closed and thereby the servo relay 817 energized and the switches 881 and 882 open after operation thereof on the 10th count.

Just before the main shaft 41 completes the 10th revolution (start of the last revolution of the clutch shaft) contacts 100 are opened by the action of cam 77 and since contacts of switch 882 of the servo relay 817 are open the clutch relay 44 is de-energized due to the locking circuit therefor being open. De-energization of the clutch relay 44 allows the clutch lever 53 (FIGURE 3) to engage the cam portion 55 of clutch 23 disengaging the teeth. This arrangement provides accurate means for stopping the operation of the winding machine 14 at the same precise position each time after winding a set of coils. In the present machine three 10 turn coils with 80° pitch have now been wound in slots VI—IV, III—I, and IX—VII, as shown by the drawing of FIGURE 38. The machine is now in the correct position for the automatic switching operations necessary to wind the three forty-six turn 160° pitch coils.

The aforenoted disengagement of the clutch 23 now closes contacts 69 and 70 energizing the time delay relay winding 880 which after a period of approximately one second opens the step relay 820 circuit through contacts 886 and 887 de-energizing the step relay winding 824 to step the controlled switch mechanism 831-838 of FIGURE 50 to position III. In position III, the step relay winding 824 is again energized by closing a circuit, as shown thereby, through contacts 886 and 888 and the step relay 820 is in condition for the next step.

Disengagement of clutch 23 opens contacts 66 and 67 and closes contacts 66 and 68 de-energizing the oscillating magnetic clutch 202 and energizing the index magnetic clutch 222 of FIGURE 8.

With the step relay switch 820 in position III, shown diagrammatically in FIGURE 50, switch 836 of cam 5 is open and oscillating stop relay winding 239 (FIGURE 11) is de-energized allowing oscillating stop portion 232 to be biased to a lower portion of the groove 235 in the stator nest 216 of FIGURE 10A and intermediate the points BB₁ and BB₂. This is preparatory to a positioning of the stop 232 so as to effectively limit the oscillation of the stator nest 216 in the winding of the three 160° pitch coils.

When contacts 243 and 244 of oscillating stop relay 239 (FIGURE 11) close due to de-energization of the relay winding 239 a circuit is closed from one side of the A.C. line through closed switch 832 of cam 2 of step relay switch 820 closed contacts 243 and 244 of the oscillating stop relay 239, closed switch 891 of counter 807 controlled servo relay 819, and through index relay winding 575 (FIGURE 35) to the other side of A.C. line. Closing of this circuit energizes the index relay winding 575 which in turn rotates the stator nest 216 through 40° to the correct position for winding the three 160° pitch coils. In this position the portion 232 of the oscillating stop 230 limits one end of the oscillation stroke at the point BB₁ in the groove 235 of the stator nest 216 (FIGURE 10A).

As armature 577 of the index relay 575 of FIGURE 35 reaches the end of its stroke switch 560 is closed to complete a circuit from one side of the A.C. line through switch 832 of cam 2 of the step relay switch 820, as shown by FIGURE 50, closed switch 560 of relay 575 and through oscillating shift relay winding 273 (FIGURE 12) to the other side of the A.C. line. Closing of this circuit energizes the shift relay winding 273 which in turn rotates the cam 292 for 40° to a position where control arm 294 moves into cam dwell 295 to close contacts 296 and 298 and contacts 299 and 301 to complete motor 19 and clutch relay 44 locking circuits when step relay switch 820 is stepped to position IV, shown by FIGURE 50.

Energization of relay windings 273 also moves the keyer shaft 192 of FIGURE 8 to a position to engage the proper set of gears 185 for winding the 160° pitch coils. (Keyer shaft is moved to intermediate position.) In addition, energization of relay winding 273 closes contacts 290 and 291 to form a circuit from one side of the A.C. line, through the closed switch 833 of cam 2 of the step relay switch 820, through contacts 290—291 of relay 273, through clutch relay 44 to the other side of the A.C. line. Closing of this circuit energizes clutch relay winding 44 allowing the teeth of clutch 23 to re-engage.

As clutch 23 re-engages contacts 66 and 68 open and contacts 66 and 67 close, de-energizing index magnetic clutch 222 and energizing oscillating magnetic clutch 202 which is energized before index relay winding 575 is de-energized to hold the stator nest 216 in the new indexed position. Also as clutch 23 re-engages, contacts 69 and 70 are opened, opening the circuit through the time delay relay 880, opening contacts 888 and 886 and closing contacts 886 and 887 in the step relay winding 824 circuit. Opening of contacts 886 and 888 de-energizes step relay winding 824 causing the relay 820 to step the relay to position IV, as shown diagrammatically in FIGURE 50. When the step relay switch 820 is in position IV and contacts 886 and 887 of the time delay relay 880 are closed the step relay winding 824 is again energized to condition the step relay 820 for the next switch step.

At step relay position IV, switch 836 of cam 4 is still open and the oscillating stop relay winding 239 (FIGURE 11) remains de-energized positioning the portion 232 of the oscillating stop 230 in the outer groove 235 of the stator nest 216 as previously described. Switches 832 and 833 of cam 2 are also open so that windings of functional relays 273 and 575 are de-energized. Clutch relay 44 remains energized due to the locking circuit from one side of the A.C. line, through switch 893 of counter 807 controlled relay 819, closed contacts 299 and 301 of shift relay cam 292 (FIGURE 15), closed switch 56 of clutch relay 44 and through relay winding 44 to the other side of the A.C. line.

Also, at step relay switch position IV there is a closed circuit from one side of the A.C. line through switch 834 cam 3 of the step relay switch 820, closed switch 894—895 of the counter 807 controlled relay 819, closed contacts 296 and 298 of the shift relay cam 292 through motor 19 and Variac 43 to the other side of the A.C. line. Thus closing of the switch 834 of cam 3 of the step relay switch 820 completes a circuit to operate the motor 19 for winding specified number of turns of the 160° pitch coils.

The mechanical operations required to wind the wire in the proper slots have been previously described with reference to FIGURE 1 and the timing chart of FIGURE 49. As the machine winds the 160° pitch coils the counter step relays 805, 807 and 809 count the number of turns, as previously described. Shortly after the machine starts the 56th turn (46 turns of the 160° pitch coils there being 46 turns of the 160° pitch coils specified for this particular stator) the counter step relay 807 closes the switch 813 and retains the switch 813 closed in the remaining winding operation to thereby energize the servo relay winding 819 to effectively open switches 891, 893 and switch contacts 894—895 and close a switch 896 controlled thereby and cause switch contact 894 to close a second switch contact 898.

Opening of the contacts 894 and 895 opens one leg of the multiple circuit through the motor 19 and when switch 90 is opened the motor circuit is opened slowing down the speed of the motor as previously described. Just before the shaft 41 completes the 56th revolution (start of the last revolution of the clutch shaft), switch 100 operated by cam 77 driven by shaft 41 as shown in FIGURE 1, is opened and since the switch 893 of the servo relay 819 is open, the clutch relay 44 is de-energized due to the locking circuit being open. De-energization of the clutch relay 44 allows the clutch lever 53 to engage the cam portion 55 of the clutch 23 disengaging the teeth and stopping the machine 14 in the same position as previously described.

The cam 77 is so designed as to open the switch 100 at approximately 36° before the end of each revolution and to maintain the switch 100 open until approximately 10° of the next revolution and between 10° and 324° maintaining the switch 100 closed.

Switch 896 closed by the counter step relay 807 operated servo relay 819 is connected in the circuit for the lateral motion relay 600 (FIGURE 36) and is so closed in order to effect energization of the relay 602 later on in the operation of the winding machine when switch 81 operated from a cam 73 on the shaft 41 is closed.

Switch 891 is opened upon energization of the servo relay 819 and is therefore effective to open the circuit to index relay 575 to eliminate operation of this relay at this time. Contacts 894 and 898 are closed upon energization of the relay 819 to provide a circuit for the operation of the motor 19 when step relay 820 is stepped to position VI, shown diagrammatically in FIGURE 50.

In addition to the three-ten turn 80° pitch coils previously wound we have now wound three forty-six turn coils with 160° pitch in slots VII—III, IV—XI, and I—VI as shown by FIGURE 39. The machine is now in the correct position for the automatic switching operations necessary to wind the three-thirty turn 120° pitch coils.

Disengagement of clutch 23 now closes contacts 69 and 70 energizing the time delay relay 880 which, after a period of approximately one second, opens contacts 886 and 887 de-energizing the step relay 820 to step the switch to position V. In position V the step relay is again energized by closing circuit through contacts 886 and 888 and the step relay 820 is thereby conditioned for the next step.

Disengagement of clutch 23 again opens contacts 66 and 67 and closes contacts 66 and 68 de-energizing the oscillating magnetic clutch 202 and energizing the index magnetic clutch 222.

With the step switch relay 820 in position V switch 836 of cam 5 is closed and the oscillating stop relay 239 (FIGURE 11) is energized moving oscillating stop portion 232 to an inner portion of the groove 235 of the stator nest 216 (FIGURE 10A) so that when indexed the stator nest 216 may be rotated 40° from point CX to point UU at which point the rotation is limited by stop portion 232. When contacts 243 and 245 of relay 239 (FIGURE 11) close due to the energization of relay winding 239 a circuit is completed (FIGURE 50) from one side of the A.C. line through closed switch 832 of cam 2 of step relay switch 820, closed contacts 243 and 245 of relay 239, closed switch 831 of cam 1 of step relay switch 820 and through index relay winding 575 to the other side of the A.C. line.

Closing of this circuit energizes index relay winding 575 of FIGURE 35 which in turn rotates the stator nest 216, through 40° to the correct radial position for winding of the three 120° pitch coils. In this position the portion 232 of the oscillating stop 230 (FIGURE 11) is in position ready to be biased by spring 241 into the outer portion of the groove 235 between points $T_1$ and $T_2$ of the stator nest 216 when relay winding 239 is de-energized.

As index relay armature 577 (FIGURE 35) reaches the end of its stroke switch 560 is closed to complete a circuit from one side of the A.C. line, through closed switch 832 of cam 2 of the step relay switch 820, closed switch 560 of the relay 575 and through oscillating shift relay winding 273 (FIGURE 12) to the other side of the A.C. line. Closing of this circuit energizes the shift relay winding 273 which in turn rotates cam 292 for 40° to a position where contacts 296 and 297 and contacts 299 and 300 are closed to complete motor 19 and clutch relay 44 locking circuits when step relay switch 820 is stepped to position VI.

Energization of the relay winding 273 also moves the keyer shaft 192 (FIGURE 8) and thereby positions the key member 193 so as to engage the proper gear 181 for winding the 120° pitch coils. (Keyer shaft 192 is moved to extreme inner position.) In addition, energization of relay winding 273 closes contacts 290—291 (FIGURE 12) to complete a circuit from one side of the A.C. line through closed switch 833 of cam 2 of the step relay switch 820 in position V, through contacts 290—291 of relay 273, through clutch relay 44 to the other side of the A.C. line. Closing of this circuit energizes clutch relay 44 allowing the teeth of clutch 23 to re-engage.

As clutch 23 re-engages contacts 66 and 68 open and contacts 66 and 67 close, de-energizing index magnetic clutch 222 and energizing oscillating magnetic clutch 202 (FIGURE 8) which is energized before index relay 575 is de-energized to hold the stator nest in the new indexed position. Also as clutch 23 re-engages contacts 70 and 69 are opened, opening the circuit through the time delay relay 880, opening contacts 888 and 886 and closing contacts 886 and 887 in the step relay winding 824 circuit causing the relay 820 to step to position VI (FIGURE 50). When the step relay switch 824 is in position VI and contacts 886 and 887 are closed the step relay winding 824 is again energized to condition the step relay 820 for the next switch step.

At step relay switch position VI, switch 836 of cam 5 is open and the oscillating stop relay winding 239 is de-energized so that the portion 232 of the oscillating stop 230 is biased by spring 241 into a position between the points $T_1$ and $T_2$ preparatory to the winding of the three 120° pitch coils. The portion 232 of the oscillating stop 230 now rests against $T_1$ of FIGURE 10A so that the stop portion 232 may limit oscillation of the stator nest 216 between the points $T_1$ and $T_2$. Switch 831 of cam 1, as well as switches 832 and 833 of cam 2 are also open so that the functional relays 273 and 575 are de-energized. Clutch relay 44 remains energized due to the locking circuit from one side of the A.C. line, through closed switch 838 of cam 6, closed switch 900 of the relay 821, closed contacts 299 and 300 of shift relay cam 292, closed switch 56 of clutch relay 44 and through clutch relay winding 44 to the other side of the A.C. line.

Also at step relay position VI there is a closed circuit from one side of the A.C. line through closed switch 834 of cam 3 of the step relay switch 820, closed contacts 894 and 898 of energized relay 819, closed switch 902 of de-energized relay 821, closed contacts 296 and 297 of the shift relay cam 292 through motor 19 and Variac 43 to the other side of the A.C. line. Thus closing of the contacts 834 of cam 3 of the step relay switch 820 completes a circuit to operate the motor 19 for winding the specified number of turns for the 120° pitch coils.

Just after the motor 19 starts to wind the first turn of the 120° pitch coils, when both tong-lever pick-up lever assemblies 370 and 370A of FIGURE 1 are in their outward positions away from the stator nest assembly 216, contacts 81 operated by the cam 73 on the shaft 41 are closed completing a circuit to energize winding 602 and effect operation of the lateral motion relay 600 of FIGURES 1 and 36. The cam 73 is so designed as to close the switch 81 at approximately 75° after the start of each rotation of the shaft 41 and to maintain the switch 81 closed until approximately 95° and to then open the switch 81 and maintain the switch 81 open until at approximately 75° from the start of next cycle of rotation of the shaft 41 at which time the switch 81 is once again closed as before. The circuit for energizing winding 602 may be traced on FIGURE 50 from one side of the A.C. line through switch 896 closed by the energized relay 819, closed switch 81 through the lateral motion relay winding 602 to the other side of the A.C. line. Closing of this circuit actuates lateral motion relay 600 which positions stop arms 609 and 611 (FIGURES 36 and 37) between split bearing face 17, and ends of cam portions 395 of the pick-up lever assemblies 370 and 370A of FIGURE 1 so that the wire of the 120° pitch coils may not be placed in the inner grooves as in the case of the preceding 80° and 160° coils, but rather in the outer grooves of the end turn forming rings BC and BD, shown by FIGURES 41 and 43. In position VI a locking circuit is provided from one side of the A.C. line through closed switch 837 of cam 6, closed switch 616 of lateral motion relay 600 and through relay winding 602 to other side of the A.C. line. This closed circuit energizes the lateral motion relay winding 602 to provide the aforenoted stop action while winding the 120° pitch coils.

The mechanical operations required to wind the wire in the proper slots have been previously described, with reference to FIGURE 1 and the timing chart of FIGURE 49. As the machine winds the 120° pitch coils the counters 801, 802 and 803 count the number of turns as previously described. Shortly after the machine starts the 86th turn (30 turns of the 120° pitch coils, there being 30 turns of the 120° pitch coils specified for this particular stator) as the counter step relay 809 operates for the 86th count, the relay 809 closes switch 815 to energize the servo relay winding 821 to in turn open switches 900 and 902.

Opening of the switch 902 opens one leg of the multiple circuit through the motor 19 and when switch 90 is opened by the action of cam 75 driven by shaft 41, the motor circuit is opened. Just before the rear shaft 41 completes the 86th revolution (start of the last revolution of the clutch shaft) switch 100 operated by cam 77 driven by shaft 41 is opened and since switch 900 of the counter 809 controlled relay 821 has already been opened the clutch relay 44 is de-energized as the locking circuit is opened. De-energization of the clutch relay 44 allows the clutch lever 53 to engage the cam portion 55 of the clutch 23 disengaging the clutch teeth and stopping the winding machine in the same position as previously described. In this position, since the stator winding has been completed, slot DE of the stator nest 216 of FIGURE 10A then lines up with the stop portion 232 of the oscillating stop 230 (FIGURE 11) to facilitate removal of nest 216 from the mounting 17.

Disengagement of the clutch 23 in position VI now closes contacts 69 and 70 energizing the time delay relay 880 which after a predetermined delay period of approximately one second, opens the energizing circuit for the step relay switch 820 by opening contacts 886 and 887 and thereby de-energizing the step relay winding 824 to cause the master step relay switch to return to the position No. 1, shown in FIGURE 50. In position I the step switch relay winding 820 is again energized by closing an energizing circuit therefor through contacts 886 and 888, through switch 835A of cam 4 of step relay switch 820 and the step relay is again in condition for effecting the next step upon the operator once again initiating the operation of the winding machine by closure of the impulse switch 875.

The stator nest with the stator completely wound is now removed from the machine of FIGURE 1 by the loosening of a thumb nut 910 and rotating a clamp 912 away from a bearing cap 914, then swinging bearing cap 914 back and lifting up stator nest 216. The three remaining wires are then cut and fastened to hooks or holders DR, DS, DT of FIGURE 10B which are assembled on the stator nest.

Figure 43:
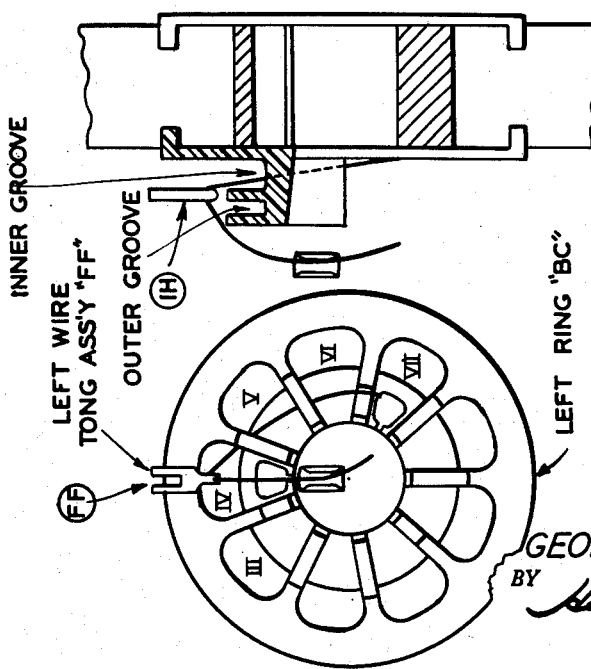
Figure 48:
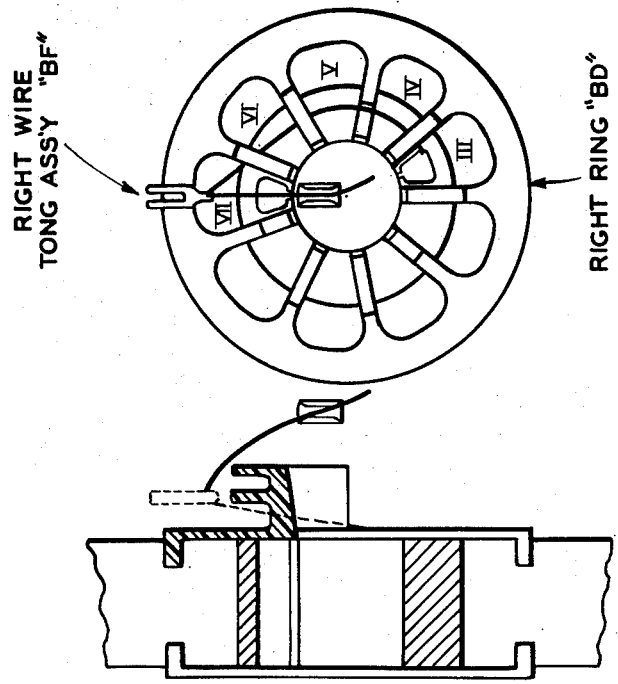

The end turn rings BC and BD of FIGURES 41 and 43 may then be broken up in an impact press as described in a copending U.S. application Serial No. 506,564, filed May 6, 1955, by George I. Roberts, and assigned to Bendix Aviation Corporation. The coils are then wedged in the stator slots and the stator is removed from the stator nest by loosening the clamp screw 706 on the stator nest. The stator is now ready for connecting and subsequent operations.

*Wire Tension Adjusting Assembly*

As shown in FIGURE 1, the winding machine 14 includes wire tension adjusting means actuated by a cam 915 affixed to the right hand drive shaft 144 so as to balance the friction or tension of the wire 916 applied through the shuttle 310 during the stroke of the shuttle 310 in either direction. In contact with the surface of the cam 915 is a roller 917 carried by a lever 919 pivoted at 921 and spring-loaded by means of spring 923. Connected to lever 919 is a link 925 the other end of which connects to a lever 927 affixed to one end of a stub shaft 929 pivotally supported in a bracket arm 931 fastened to the supporting member 357. Fastened to the other end of the stub shaft 929 is a lever 934 carrying at the free end thereof a pulley 936. Projecting from the base plate 15 is an arm 938 carrying a second pulley 940 while a third pulley 942 is carried by a bracket member 944 affixed to the outer end of the shuttle 310.

The operation of this tension device is as follows: Wires 916 from three (3) reels of wire which have individual adjustable tension devices mounted on the pay-out reel mounting brackets are fed over the pulley 940, under the pulley 936 and over the pulley 942 through bore 364 of the shuttle 310 (FIGURE 21) and then through the three nozzles 362 in shuttle cap 360, as previously described. When the shuttle 310 is in the right position which is the same as the stop position of the machine the cam 915 is positioned so that the roller 917 is at the maximum stroke ready to follow a sharp drop in the effective cam surface of cam 915 which is rotated in a clockwise direction, as viewed in FIGURE 1. At this point there is a preformed loop in the three wires 916 formed in the shape of a U since pulley 936 is in a lower position between pulleys 940 and 942. The sharp drop in the effective cam surface of cam 915 is designed to operate the lever system and pulley 936 so that the motion of the pulley 936 precedes the right to left motion of the shuttle 310 by a predetermined amount. Therefore, during the right to left motion of the shuttle 310 there is no wire 916 drawn from the three wire reels. The only tension or friction on the wires is that created by the wires passing through the three shuttle cap nozzles 362.

The cam 915 is designed so that cam roller 917 contacts the lower surface of the cam 915 until shuttle 310 is ready for the return stroke, left to right, at which time the cam roller 917 follows a rise provided in the effective cam surface of the cam 915 to produce a new loop by rotating the lever system and adjusting the pulley 936 to its lower position. Again the only tension or friction on the wires is that created by the wires passing through the three shuttle nozzles.

The pulley 936 now remains in its lower position until the shuttle starts its next right to left stroke. The wire tension or friction is therefore the same during the shuttle stroke regardless of the direction so as to effectively adjust or correct for friction or tension forces which might otherwise be applied to the wires 916.

The described coil winding machine is automatic in operation and is not limited to the use of expendable end turn forming rings such as BC and BD of FIGURE 41, as such end turn forming rings may form a part of the stator unit in which case there may be eliminated the step of wedging the coils in the slots of the stator unit and the further step of removal of the end turn forming rings by the use of an impact press and elimination of end turn final forming.

Further, the winding apparatus is not limited to the particular winding pattern, number of coils, or pitch of the coils described, but the apparatus may be modified to meet the requirements of the winding pattern of any type of stator or rotor unit within practical limits.

While the present apparatus includes mechanism applicable for the winding of a straight slot stator or rotor unit, it will be readily apparent that by changing the relative motion of the shuttle 310 and providing the stator nest assembly 216 with the required rotative and lateral motion by appropriate modification of the control cam mechanisms the coil winding machine may be readily applied to the winding of such a unit having skew slots.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A winding mechanism for a slotted unit of an electrical apparatus by which coils comprising a plurality of loops of winding wire are automatically wound in selected slots opening from a bore in the unit, said mechanism comprising a rotatably mounted support member adapted to hold and rotate the slotted unit back and forth during the winding thereof, a shuttle disposed in an operative relation to said unit for movement through said bore, first actuating means for moving said shuttle back and forth relative to said unit and through said bore, a threading nozzle carried by said shuttle and through which the winding wire is threaded into a selected slot of the unit during the movement of said shuttle, a pair of tong type lever members, operating means to cause said lever members to releasably grip the wire therebetween, said lever members being operable by said operating means in cooperative relation with said rotatably mounted support member and said threading nozzle to guide the wire into the selected slot of the unit and thereafter release the wire therein, rotating means for imparting an oscillatory movement to said support member, stop means for limiting said oscillatory movement of said support member to between predetermined limits of angular movement, second actuating means by which said lever members may be moved laterally relative to the unit carried by said support member, and control mechanism for said operating means, first actuating means, rotating means and second actuating means by which said lever members, shuttle and support member are operated in a predetermined sequence with respect to each other to automatically wind the wire in selected slots of the unit to provide a coil winding pattern of a predetermined pitch.

2. The combination defined by claim 1 in which the operating means for said pair of lever members includes cam means for imparting a pivotal motion to said pair of lever members in one sense, and spring means for biasing said lever members in an opposite sense, and means for operating said cam means so that said lever members may be actuated thereby in a predetermined timed relation with said support member and threading nozzle to effectively guide the wire into the selected slots of the unit and release the wire therein.

3. The combination defined by claim 1 in which the rotating means for imparting angular movement to said support member includes cam means in an operative relation with said support member for imparting an oscillatory motion to said support member, and said stop means includes operable means for changing the predetermined limits of angular movement of the support member effecting a coil winding pattern of a different predetermined pitch.

4. The combination defined by claim 3 with said stop means being selectively operable for limiting the oscillatory movement of said support member to a first predetermined limited range of angular movement and to a second predetermined limited range of angular movement, automatically operable means for shifting the stop means out of one operative relation with said support member into another operative relation with said support member to change the predetermined limits of angular movement of the support member from said first range to said second range so as to effect a predetermined winding pattern of coils of different pitch.

5. The combination defined by claim 2 including another lever for pivotally supporting said pair of lever members at a free end thereof, said other lever having a cam surface thereon, an actuating member bearing upon the cam surface of said other lever for raising and lowering said pair of lever members relative to said slotted unit, and other spring means for biasing said other lever and the cam surface thereof into contacting relation with said actuating member.

6. A winding mechanism for a slotted unit of an electrical apparatus; said mechanism comprising a rotatably mounted support member adapted to hold the slotted unit, means for oscillating the support member and thereby the slotted unit back and forth during the winding thereof, a reciprocating shuttle including means to carry the winding wire back and forth through a bore of the slotted unit, finger means at opposite ends of the support member and slotted unit, said finger means for picking up the wire from the reciprocating shuttle and depositing the wire in a slot of the unit, said support member including channel means provided therein having limiting end portions, a stop member cooperating in said channel means with a first set of said end portions to limit angular movement imparted to said support member by said oscillating means to a first predetermined range, and means to shift said stop member from cooperative relation with said first set of said end portions to a second set of said end portions to change said range of oscillatory movement to a second predetermined range.

7. The combination defined by claim 6 in which said stop member includes a pin slidably mounted in the channel means provided in said support member, motor means to actuate said stop member from a first to a second position to shift said pin from cooperative relation with the first set of the end portions of said channel means into cooperative relation with the second set of said end portions to thereby change the limited range of oscillatory movement of the support member from the first to the second predetermined range.

8. The combination defined by claim 7 including means to count the back and forth movement of said shuttle through the bore of the slotted unit and thereby the number of winding turns of the wire, control means operative by said counting means after a predetermined number of turns of said wire to render said motor means effective to actuate said stop member from said first to said second position to change the limited range of oscillatory movement of the support member from the first to the second predetermined range.

9. A winding mechanism for a slotted unit of an electrical apparatus by which coils comprising a plurality of loops of winding wire are automatically wound into selected pairs of slots in said unit, said mechanism comprising an open ended rotatably mounted cylindrical member including means to secure the slotted unit therein, the cylindrical member being adapted to oscillate the slotted unit back and forth during winding thereof, a shuttle movably mounted adjacent said cylindrical member for back and forth movement of said shuttle through said cylindrical member and a bore of the unit held therein, a threading nozzle carried by said shuttle through which winding wire is threaded into a pair of slots in the unit, movable finger means to releasably grip and pick up the winding wire in cooperation with said threading nozzle for guiding the winding wire into the pair of slots in the unit being wound during the back and forth movement of said shuttle through said cylindrical member and the bore of said unit, first actuating means by which said back and forth movement is imparted to said shuttle, second actuating means by which said finger means is moved axially back and forth between selected predetermined positions relative to said unit held in said cylindrical member, third actuating means by which said cylindrical member and thereby said unit is alternately oscillated back and forth, stop means to limit the oscillatory movement imparted to said cylindrical member by said third actuating means to within a first predetermined range so as to thereby bring first one slot of the pair of slots being wound and then the other slot of said pair of slots into register with said finger means for winding a coil of a predetermined pattern, means to shift said stop means so as to change the limit of oscillatory movement imparted to said cylindrical member by said third actuating means to within a second predetermined range so as to bring another pair of selected slots of the unit into register with said finger means for winding a coil of another predetermined pattern, and driving mechanism for said first, second and third actuating means by means of which said shuttle, cylindrical member and said finger means are actuated in predetermined sequence with respect to each other whereby the oscillation of said cylindrical member by said third actuating means to bring the aforesaid selected slots of said unit into register with said finger means occurs in predetermined timed relation with the movement of said shuttle and finger means by said first and second actuating means.

10. A winding mechanism for a slotted unit of an electrical apparatus by which coils comprising a plurality of loops of winding wire are automatically wound into selected pairs of slots in said unit, said mechanism comprising an open ended rotatably mounted cylindrical member including means to secure the slotted unit therein, the cylindrical member being adapted to oscillate the slotted unit back and forth during winding thereof, a shuttle movably mounted adjacent said cylindrical member for back and forth movement of said shuttle through said cylindrical member and a bore of the unit held therein, a threading nozzle carried by said shuttle through which winding wire is threaded into a pair of slots in the unit, movable finger means cooperating with said threading nozzle for placing the winding wire into the pair of slots in the unit being wound during the back and forth movement of said shuttle through said cylindrical member and the bore of said unit, first actuating means by which said back and forth movement is imparted to said shuttle, second actuating means by which said finger means is moved back and forth between selected predetermined positions relative to said unit held in said cylindrical member, third actuating means by which said cylindrical member and thereby said unit is alternately oscillated back and forth, stop means to limit the oscillatory movement imparted to said cylindrical member by said third actuating means to within a first predetermined range so as to thereby bring first one slot of the pair of slots being wound and then the other slot of said pair of slots into register with said finger means for winding a coil of a first predetermined pattern, means to shift said stop means so as to change the limit of oscillatory movement imparted to said cylindrical member by said third actuating means to within a second predetermined range so as to bring another pair of selected slots of the unit into register with said finger means for winding a coil of a second predetermined pattern, end turn forming means mounted at opposite ends of the cylindrical member, said end turn forming means having inner and outer grooves, said finger means cooperating with said end turn forming means and said threading nozzle so as to releasably pick up the winding wire from the threading nozzle, fourth actuating means to selectively operate the finger means in one sense to effectively deposit winding wire of the coil of the first predetermined pattern in the inner grooves and in another sense to effectively deposit winding wire of the coil of the second predetermined pattern in the outer grooves of the end turn forming means during the oscillating movement of the cylindrical member to effect wire end turns at opposite ends of the stator of the first and second predetermined patterns respectively, and driving mechanism for said first, second, third and fourth actuating means whereby said shuttle, finger means and cylindrical member are actuated in predetermined sequence with respect to each other and said selective operation of said finger means may be effected, and whereby the oscillation of said cylindrical member by said third actuating means to effect said wire end turns and to bring the aforesaid selected slots of said unit into register with said finger means occurs in predetermined timed relation with the movement of said shuttle and finger means by said first and second actuating means.

11. The combination defined by claim 10 including counting means operable by said driving mechanism for rendering said shift means effective to change the limit of oscillatory movement imparted to said cylindrical member by said third actuating means to within said second predetermined range after a predetermined number of turns of said wire of said first pattern, and said counting means operable by the driving mechanism for rendering said fourth actuating means effective to selectively operate the finger means in said other sense after the deposit of the predetermined number of turns of wire of said first pattern.

12. A wire pick-up assembly comprising a housing, a bearing element, an inner bearing collar affixed to said housing for slidably supporting the housing on the bearing element, a lever member pivotally connected to said housing, a pair of tong-like finger members pivotally mounted at a free end of said lever member, said lever member having an inner cam surface, a cam follower slidably mounted on said bearing collar and contacting said cam surface, spring means biasing the lever member into contacting relation with said cam follower at said cam surface, other cam means rotatably supported by the housing to effect the closing and opening of said finger members so as to selectively pick up and release the wire, operative means connected to said cam follower for slidably positioning the cam follower on said inner bearing collar to adjust the cam follower in relation to the cam surface to effect a pivotal movement of the lever member relative to the housing so as to selectively raise and lower the finger members relative to the housing, and other means operably connected to the inner bearing collar to axially move the housing and thereby the finger members along the bearing element.

13. A winding mechanism for a slotted unit of an electrical apparatus by which coils comprising a plurality of loops of winding wire are automatically wound into selected pairs of slots in said unit, said mechanism comprising an open ended rotatably mounted cylindrical member including means to secure the slotted unit therein, the cylindrical member being adapted to oscillate the slotted unit back and forth during winding thereof, a shuttle movably mounted adjacent said cylindrical member for back and forth movement of said shuttle through said cylindrical member and a bore of the unit held therein, a threading nozzle carried by said shuttle through which winding wire is threaded into a pair of slots in the unit, movable finger means cooperating with said threading nozzle, for placing the winding wire into the pair of slots in the unit being wound during the back and forth movement of said shuttle through said cylindrical member and the bore of said unit, first actuating means by which said back and forth movement is imparted to said shuttle, second actuating means by which said finger means is moved back and forth between selected predetermined positions relative to said unit held in said cylindrical member, third actuating means by which said cylindrical member and thereby said unit is alternately oscillated back and forth, stop means to limit the oscillatory movement imparted to said cylindrical member by said third actuating means to within a first predetermined range so as to thereby bring first one slot of the pair of slots being wound and then the other slot of said pair of slots into register with said finger means for winding a coil of a first predetermined pattern, means to shift said stop means so as to change the limit of oscillatory movement imparted to said cylindrical member by said third actuating means to within a second predetermined range so as to bring another pair of selected slots of the unit into register with said finger means for winding a coil of a second predetermined pattern, end turn forming means mounted at opposite ends of the cylindrical member, said end turn forming means having inner and outer grooves, said finger means cooperating with said end turn forming means and said threading nozzle so as to releasably pick up the winding wire from the threading nozzle, second stop means, fourth actuating means for selectively shifting said second stop means to a first position out of limiting relation and to a second position effective to limit the movement of said finger means relative to said unit held in said cylindrical member, means for operating said second stop means in cooperative relation with the shift means for the oscillatory movement stop means so as to render said finger means effective with the second stop means in said first position to deposit the wire end turns of the coil of the first predetermined pattern in said inner grooves of the end turn forming means, said second stop means being rendered effective in said second position to so limit the movement of said finger means relative to said unit as to cause said finger means to deposit the wire end turns of the coil of the second predetermined pattern in said outer grooves of the end turn forming means, and driving mechanism for said first, second and third actuating means whereby said shuttle, finger means and cylindrical member are actuated in predetermined sequence with respect to each other and whereby the oscillation of said cylindrical member by said third actuating means to effect said wire end turns and to bring the aforesaid selected slots of said unit into register with said finger means occurs in predetermined timed relation with the movement of said shuttle and finger means by said first and second actuating means.

14. A winding mechanism for a slotted unit of an electrical apparatus by which coils comprising a plurality of loops of winding wire are automatically wound into selected pairs of slots in said unit, said mechanism comprising a rotatably mounted member including means to secure the slotted unit therein, the member being adapted to oscillate the slotted unit back and forth during winding thereof, a shuttle movably mounted adjacent said member for back and forth movement of said shuttle through said member and a bore of the unit held therein, a threading nozzle carried by said shuttle through which winding wire is threaded into a pair of slots in the unit, movable finger means cooperating with said threading nozzle for placing the winding wire into the pair of slots in the unit being wound during the back and forth movement of said shuttle through said member and the bore of said unit, first actuating means by which said back and forth movement is imparted to said shuttle, second actuating means by which said finger means is moved back and forth between selected predetermined positions relative to said unit held in said member, third actuating means by which said member and thereby said unit is alternately oscillated back and forth, stop means to limit the oscillatory movement imparted to said member by said third actuating means to within a first predetermined range so as to thereby bring first one slot of the pair of slots being wound and then the other slot of said pair of slots into register with said finger means for winding a coil of a first predetermined pattern, means to shift said stop means so as to change the limit of oscillatory movement imparted to said member by said third actuating means to within a second predetermined range so as to bring another pair of selected slots of the unit into register with said finger means for winding a coil of a second predetermined pattern, end turn forming means mounted at opposite ends of the member, said end turn forming means having inner and outer grooves, said finger means cooperating with said end turn forming means and said threading nozzle so as to releasably pick up the winding wire from the threading nozzle, fourth actuating means for selectively shifting said finger means to first and second positions relative to said unit held in said member, means for operating said fourth actuating means in cooperative relation with the shift means for the oscillatory movement stop means so as to render said finger means effective in said first position to deposit the wire end turns of the coil of the first predetermined pattern in said inner grooves of the end turn forming means and effective in said second position to cause said finger means to deposit the wire end turns of the coil of the second predetermined pattern in said outer grooves of the end turn forming means, and driving mechanism for said first, second and third actuating means whereby said shuttle, finger means and member are actuated in predetermined sequence with respect to each other and whereby the oscillation of said member by said third actuating means to effect said wire end turns and to bring the aforesaid selected slots of said unit into register with said finger means occurs in predetermined timed relation with the movement of said shuttle and finger means by said first and second actuating means.

15. A winding mechanism for a slotted unit of an electrical apparatus by which coils comprising a plurality of loops of winding wire are automatically wound into selected slots opening from a bore in the unit, said mechanism comprising a rotatably mounted support member adapted to hold and oscillate the slotted unit back and forth during the winding thereof, a winding element disposed in an operative relation to said support member for back and forth motion through said bore, means including said element and a pair of fingers for guiding the winding wire into the slots in said unit during the movement of said element, first operating means for effecting movement of said pair of fingers relative one to the other to grip and release said wire, second operating means to impart axial movement to the fingers relative to said rotatably mounted supporting member, actuating means by which said element is moved back and forth between predetermined limits of movement at opposite ends of the unit, rotating means for imparting an oscillatory movement to said support member, stop means for limiting said oscillatory movement of the support member between predetermined limits of angular movement, said stop means including means for adjusting said stop means and thereby said limits of angular movement so as to provide coil windings of different pitch, and control mechnism including means for operatively connecting said first and second operating means, said actuating means and said rotating means so that said fingers, winding element and support member are actuated in predetermined sequence with respect to each other to effect predetermined coil winding patterns on said unit.

References Cited in the file of this patent

UNITED STATES PATENTS

| | | |
|---|---|---|
| 2,594,707 | Allen | Apr. 29, 1952 |
| 2,624,518 | Scofield et al. | Jan. 6, 1953 |